(12) United States Patent
Finnan et al.

(10) Patent No.: US 10,102,366 B2
(45) Date of Patent: Oct. 16, 2018

(54) FRAUD RESISTANT PASSCODE ENTRY SYSTEM

(71) Applicants: Brian G. Finnan, Athens, GA (US);
Frank P. Brice, Tallahassee, FL (US);
William Brooks Brown, Cornelia, GA (US)

(72) Inventors: Brian G. Finnan, Athens, GA (US);
Frank P. Brice, Tallahassee, FL (US);
William Brooks Brown, Cornelia, GA (US)

(73) Assignee: Arcanum Technology LLC, Athens, GA (US)

(*) Notice: Subject to any disclaimer, the term of this patent is extended or adjusted under 35 U.S.C. 154(b) by 0 days.

(21) Appl. No.: 15/215,671

(22) Filed: Jul. 21, 2016

(65) Prior Publication Data
US 2016/0328552 A1   Nov. 10, 2016

Related U.S. Application Data

(63) Continuation of application No. 13/869,443, filed on Apr. 24, 2013.
(Continued)

(51) Int. Cl.
*G06F 21/36* (2013.01)
*G06F 21/31* (2013.01)
(Continued)

(52) U.S. Cl.
CPC ........... *G06F 21/36* (2013.01); *G06F 3/0482* (2013.01); *G06F 21/31* (2013.01); *G06F 21/602* (2013.01);
(Continued)

(58) Field of Classification Search
CPC ..................................................... G06F 21/36
See application file for complete search history.

(56) References Cited

U.S. PATENT DOCUMENTS

| | | |
|---|---|---|
| 5,025,255 A | 6/1991 | Mould |
| 5,949,348 A | 9/1999 | Kapp et al. |

(Continued)

FOREIGN PATENT DOCUMENTS

WO    2006064241 A2    6/2006

OTHER PUBLICATIONS

Tetsuji Takada, fakePointer : A User Authorization Scheme that makes Peeping Attack with a Video Camera hard, National Institute of Advanced Industrial Science and Technology Jan. 18, 2013, Sotokanda, Chiyoda-ku, 101-0021, Tokyo, Japan, 2 pages.
(Continued)

*Primary Examiner* — Kambiz Zand
*Assistant Examiner* — Thanh Le
(74) *Attorney, Agent, or Firm* — Merchant & Gould P.C.

(57) ABSTRACT

A method for user passcode authentication. The method includes accessing a user information database with predefined user input option parameters and generating a random arrangement of input options from the predefined user input option parameters. The method includes manifesting the random arrangement of input options on an interactive display interface and receiving a selection of the interactive display interface input options. The method also includes comparing the received selection of interactive display interface options to the predefined user input option parameters.

14 Claims, 56 Drawing Sheets

Related U.S. Application Data

(60) Provisional application No. 61/638,223, filed on Apr. 25, 2012.

(51) Int. Cl.
*G06F 3/0482* (2013.01)
*G06F 21/60* (2013.01)
*G06Q 20/40* (2012.01)

(52) U.S. Cl.
CPC ... *G06Q 20/4014* (2013.01); *G06F 2221/031* (2013.01)

(56) References Cited

U.S. PATENT DOCUMENTS

| | | | |
|---|---|---|---|
| 6,434,702 | B1 | 8/2002 | Maddalozzo et al. |
| 6,549,194 | B1 | 4/2003 | McIntyre et al. |
| 6,720,860 | B1 | 4/2004 | Narayanaswami |
| 6,934,860 | B1 | 8/2005 | Goldstein |
| 7,484,173 | B2 | 1/2009 | Gao et al. |
| 7,734,930 | B2 | 6/2010 | Kirovski et al. |
| 7,844,825 | B1 | 11/2010 | Neginsky |
| 7,849,321 | B2 | 12/2010 | Mizrah |
| 7,992,007 | B2 | 8/2011 | Lazzaro et al. |
| 8,001,613 | B2 | 8/2011 | Duncan |
| 2004/0257238 | A1 | 12/2004 | De Jongh |
| 2005/0251752 | A1 | 11/2005 | Tan et al. |
| 2006/0005039 | A1 | 1/2006 | Hsieh |
| 2006/0156026 | A1* | 7/2006 | Utin .................. G06F 21/31 713/183 |
| 2007/0250920 | A1 | 10/2007 | Lindsay |
| 2009/0313694 | A1* | 12/2009 | Mates .................. G06F 21/36 726/21 |
| 2010/0043062 | A1 | 2/2010 | Alexander et al. |
| 2010/0100725 | A1 | 4/2010 | Ozzie et al. |
| 2010/0318807 | A1* | 12/2010 | Wang .................. G06F 21/31 713/184 |
| 2011/0016520 | A1* | 1/2011 | Cohen .................. G06F 21/36 726/19 |
| 2011/0162066 | A1 | 6/2011 | Kim et al. |
| 2012/0110663 | A1* | 5/2012 | Kim .................. G06F 21/36 726/19 |
| 2013/0291096 | A1 | 10/2013 | Finnan |

OTHER PUBLICATIONS

Supplementary European Search Report dated Nov. 13, 2015 in European Patent Application No. EP13781105, 7 pages.

Hchgao, Xyliu, Analysis and Evaluation of the ColorLogin Graphical Password Scheme, Software Engineering Institute, Xidian University 710071, P.R. China, (ICIG 2009, 5th Conf.) 6 pages.

Alexander De Luca, Katja Hertzschuch, Heinrich Hussmann, ColorPIN—Securing Pin Entry through Indirect Input, Media Informatics Group, Univerisity of Munich, Amalienstr. 17, 80333, Munich, Germany, (Apr. 10, 2010); 4 pages.

Volker Roth, Kai Richter, How to Fend off Shoulder Surfing, OGM Labratory LLC, Zentrum fur Graphische Datenverarbeitung e. V. Fraunhoferstr. 5, 64283, Dramstadt, Germany, (May 21, 2006) 29 pages.

Bogdan Hoanca, Kenrick Mock, Screen oriented technique for reducing the incidence of shoulder surfing, Computer Science, University of Alaska Anchorage, Ancorage, AK, (Apr. 14, 2005) 7 pages.

Desney S. Tan, Pedram Keyani, Mary Czerwinski, Spy-Resistant Keyboard : Towards More Secure Password Entry on Publicity Observable Touch Screens, Microsoft Research, Redmond WA, (Jan. 1, 2005) 4 pages.

* cited by examiner

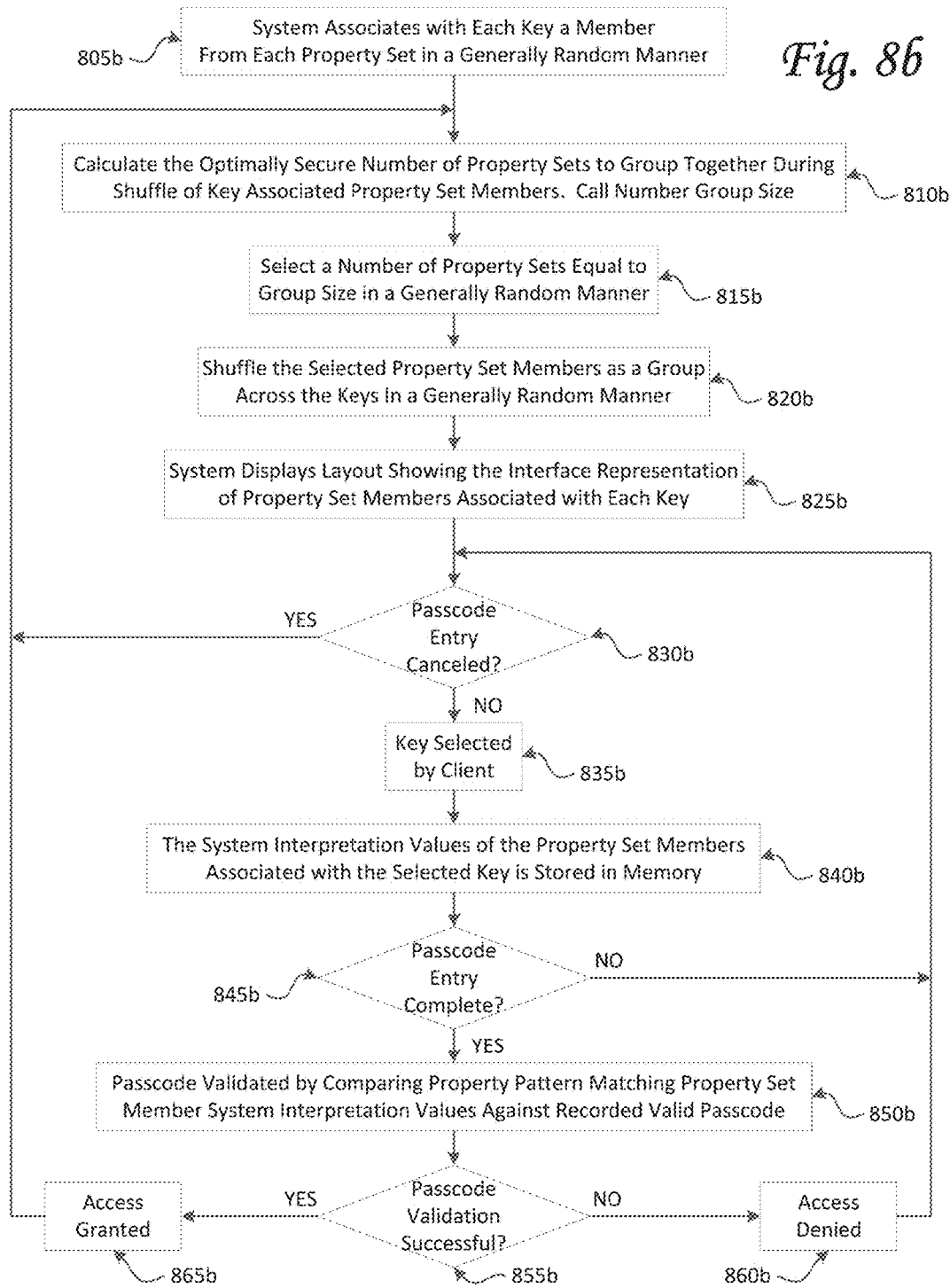

Property Dispersion

Property Dispersion

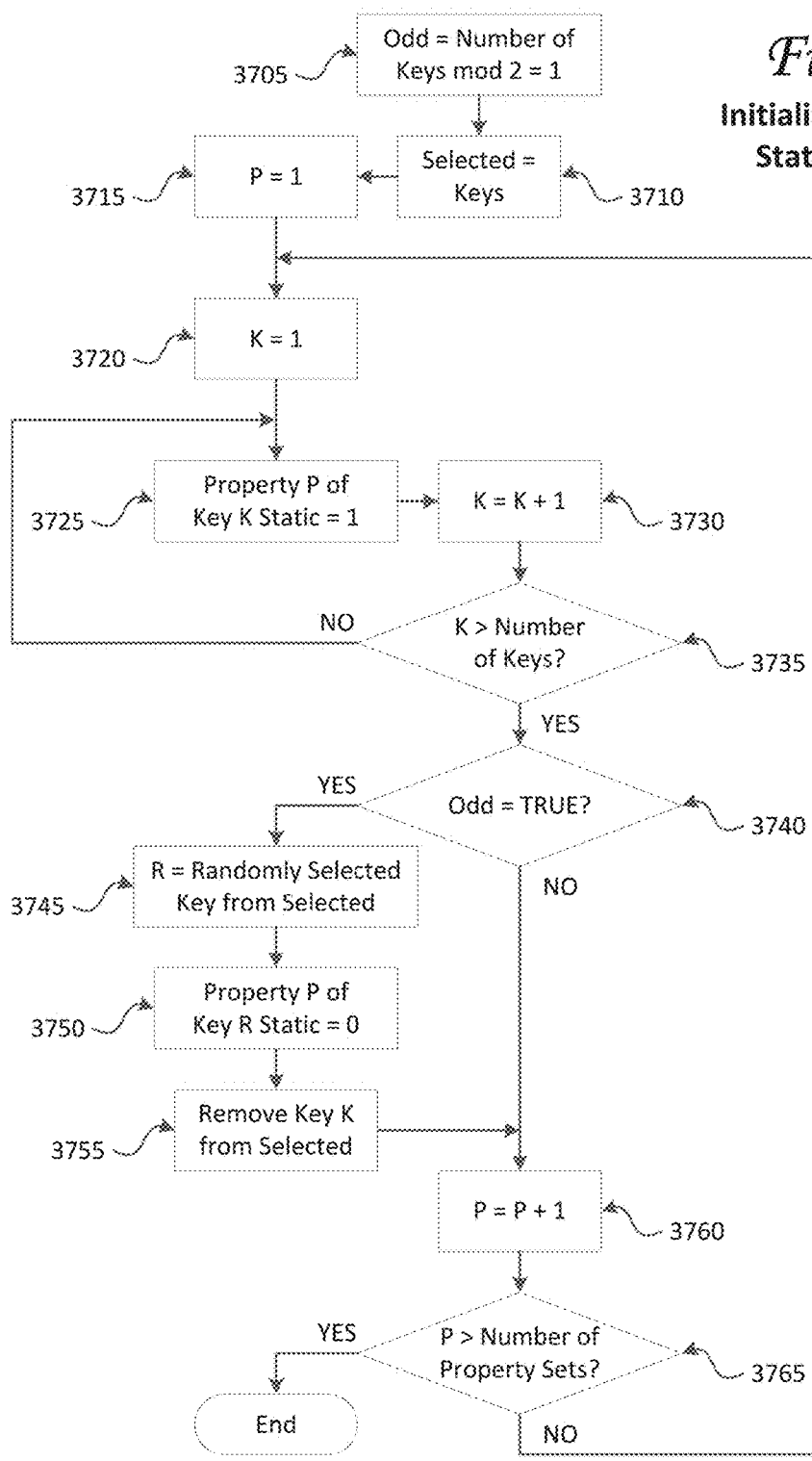

Get Key Non-Static Properties

Get Selected Keys

Get Maximum Key
Non-Static Properties

Get Keys

Swap Key Properties

| Set Name | Set Identifier (Decimal) | Set Size | Set Member Size (bytes) | Member Name / Property Interface Representation / System Interpretation Value in Hexadecimal (Decimal) — Set Members | | | | | | | | | |
|---|---|---|---|---|---|---|---|---|---|---|---|---|---|
| Shape | 1 | 10 | 1 | Triangle ▲ A (10) | Square ■ B (11) | Pentagon ⬠ C (12) | Hexagon ⬡ D (13) | Circle ● E (14) | Heart ♥ F (15) | Club ♣ 10 (16) | Diamond ♦ 11 (17) | Spade ♠ 12 (18) | Star ★ 13 (19) |
| Number | 2 | 10 | 1 | 1 / One / 14 (20) | 2 / Two / 15 (21) | 3 / Three / 16 (22) | 4 / Four / 17 (23) | 5 / Five / 18 (24) | 6 / Six / 19 (25) | 7 / Seven / 1A (26) | 8 / Eight / 1B (27) | 9 / Nine / 1C (28) | 0 / Zero / 1D (29) |
| Alpha A | 3 | 10 | 1 | Latin A / A / 1E (30) | Latin B / B / 1F (31) | Latin C / C / 20 (32) | Latin D / D / 21 (33) | Latin E / E / 22 (34) | Latin F / F / 23 (35) | Latin G / G / 24 (36) | Latin H / H / 25 (37) | Latin Q / Q / 26 (38) | Exclamation / ! / 27 (39) |
| Alpha I | 4 | 10 | 1 | Latin I / I / 28 (40) | Latin J / J / 29 (41) | Latin K / K / 2A (42) | Latin L / L / 2B (43) | Latin M / M / 2C (44) | Latin N / N / 2D (45) | Latin O / O / 2E (46) | Latin P / P / 2F (47) | Latin Q / Q / 30 (48) | Dollar / $ / 31 (49) |
| Alpha R | 5 | 10 | 1 | Latin R / R / 32 (50) | Latin S / S / 33 (51) | Latin T / T / 34 (52) | Latin U / U / 35 (53) | Latin V / V / 36 (54) | Latin W / W / 37 (55) | Latin X / X / 38 (56) | Latin Y / Y / 39 (57) | Latin Z / Z / 3A (58) | Ampersand / & / 3B (59) |
| Color | 6 | 10 | 1 | Yellow / 3C (60) | Green / 3D (61) | Blue / 3E (62) | Orange / 3F (63) | Black / 40 (64) | Purple / 41 (65) | Brown / 42 (66) | Grey / 43 (67) | Red / 44 (68) | White / 45 (69) |
| Position | 7 | 10 | 1 | 0,0 / 46 (70) | 0,1 / 47 (71) | 0,2 / 48 (72) | 1,0 / 49 (73) | 1,1 / 4A (74) | 1,2 / 4B (75) | 2,0 / 4C (76) | 2,1 / 4D (77) | 2,2 / 4E (78) | 3,1 / 4F (79) |

*Fig. 44*

FRAUD RESISTANT PASSCODE ENTRY SYSTEM

CROSS-REFERENCE TO RELATED APPLICATIONS

This application is a continuation of U.S. patent application Ser. No. 13/869,443, filed Apr. 24, 2013, which claims the priority benefit of U.S. Provisional Patent Application No. 61/638,223, filed on Apr. 25, 2012, now expired, which are hereby incorporated herein by reference.

BACKGROUND

In the modern world, computerized systems are responsible for collecting, transmitting, and storing an ever-increasing amount of information. These systems are necessary as the need to quickly and accurately access information has become critical in everyday operations upon which business and economy are dependent. While technological advances have helped protect sensitive data from unauthorized access during transmission and storage, little has changed in the means by which data is entered and accessed by authorized individuals.

Through advances in encryption and more powerful computer systems, data storage and transmission have reached a level of security never before known by human civilization. Once data is gathered by a system, it can be stored and shared among other systems with little or no chance of unauthorized disclosure. Even highly technical methods for acquiring stored or transmitted data which has been properly protected through unauthorized means are impractical at best, and pose no significant threat to data security.

There exist a number of weaknesses in the methods commonly used for secure data entry and improperly secured transmission, all of which have been exploited to gain access to secure information. These exploitations range from the use of multiple electronic devices to simple observation. The weakest points in data security management are typically the individuals themselves and the human-machine interfaces (HMI) through which data is accessed and stored.

Individuals should always guard any sensitive information to prevent the acquisition of the information by others. Such measures include: refraining from discussion of sensitive information while in unsecure settings, restricting any conveyance of information to secure methods, avoiding documentation practices such as recording information using unsecure methods through writing or storage on personal computers, protecting identification devices such as badges and cards from being lost or stolen, and other methods considered by most to be common-sense practices.

Many HMI's are designed with measures in place to help prevent unplanned disclosure of secure information. Unfortunately, many of these measures have proven to be insufficient as these interfaces have become increasingly prolific in society. One such practice is to obscure values, once entered, by masking them with a generic character, such as an asterisk. While this actively hides the final data provided to the system from onlookers, it does nothing to conceal the action of selecting the individual values as the data is entered. Another less common practice is the repositioning of virtual keys on graphical display devices between uses. This design helps to ensure that observance of data entry from a distance will not disclose the entered information through the movements of the individual using the interface. Once again, however, this provides no protection from close observation.

One of the most common uses of secure data access in society today is focused around the use of automated teller machines (ATMs) and debit card transactions. Despite methods to protect financial account access, billions of dollars are stolen annually in the United States alone through debit and credit card fraud. In the case of ATM and debit transactions, the only pieces of information required to gain account access are an account number and its associated personal identification number (PIN). Of these two, only the PIN is kept secret and is controlled by the individual owning the account.

The PIN, a four digit number, only allows for ten thousand possible combinations. Additionally, some PIN combinations are statistically preferred over others due to their ease of being remembered, their association with physical patterns on the numeric keypad used during PIN entry, and the association of numbers with groups of letters, allowing the PIN to be translated in to words. These commonly used PINs can be exploited to increase the probability of correctly guessing a PIN to match a given account.

Several methods may be used to obtain an account number and the associated PIN. Shoulder surfing is the act of observing an individual while entering their PIN with the goal of gaining the individual's PIN for future use. A similar scheme involves the use of a skimming device, which is attached over the card entry location and is designed to appear as part of the ATM, in conjunction with a strategically placed camera. When an individual inserts their card into the ATM, the skimming device also reads the account number encoded on the card. The camera then records the PIN as the individual provides it to the system, thereby collecting both the account number and the associated PIN.

Debit transactions occurring at a point of sale are in many cases stored on local systems, then processed as a group periodically or at the end of the business day. Such storage of account numbers and PINs can be a target in an attempt to acquire the information, especially since they are stored in large quantities.

Other common points of weakness are, data line monitoring, data center breaches, and lost, stolen, or fraudulent cards. Data line monitoring can be a security weakness if the data is not encrypted properly before transmission or if the encryption is compromised; however, proper implementation and maintenance can prevent this being an issue. Lost, stolen, or fraudulent cards and data center breaches only put at risk the account numbers, not their associated PINs.

The present invention addresses all of these weaknesses, as well as offers improved measures of protection to areas which are not considered immediate risks.

Accordingly, it can be seen that there exists a need for a better way for preventing passcode fraud. It is to the provision of solutions to this and other problems that the present invention is primarily directed.

SUMMARY OF THE INVENTION

In accordance with an embodiment of the present invention, a method is provided for entering and verifying a passcode. The general method for passcode entry includes: presenting to a client a predetermined interface layout; entry of a passcode by the client via the selection of keys associated with properties corresponding to those required for successful passcode verification; verification of the entered passcode upon completion of passcode entry; either allowing or denying the desired access depending upon the verification results of the passcode.

In another aspect, the invention relates to a method for user passcode authentication. The method includes accessing a user information database with predefined user input option parameters and generating a random arrangement of input options from the predefined user input option parameters. The method includes manifesting the random arrangement of input options on an interactive display interface and receiving a selection of the interactive display interface input options. The method also includes comparing the received selection of interactive display interface options to the predefined user input option parameters.

In another aspect, the invention relates to a method for user passcode creation. The method includes receiving a selected passcode with an arrangement of inputs having two or more different properties from a group comprising numbers, characters, symbols, colors, patterns, sounds, textures, topology, location, orientation, or relative position with respect to the interface. The passcode is received on a user interface. The method also includes storing the selected passcode in a user database.

In another aspect, the invention relates to a system for passcode validation. The system includes a user interface display with a plurality of keys. Each key has at least two different dynamic property options. The system has a database in communication with the user interface. The database is configured to receive selected property option information from the user interface display. The database is configured to send variable property option information to the user interface display.

In accordance with a more particular embodiment of the present invention, the predetermined interface layout used during passcode entry includes a plurality of virtual keys manifested in a defined configuration via a device.

In accordance with a more particular embodiment of the present invention, the device used during passcode entry can partially include a graphical interface.

In accordance with a more particular aspect of the present invention, each of the virtual keys presented during passcode entry are associated with a plurality of properties, a property being a combination of an interface representation and an interpretation value. The interface representation is the manifestation of the property via the device providing the human interface. The interpretation value is the identity of the property by which it is identified by the system.

In accordance with another aspect of the present invention, the properties associated with the virtual keys are defined in property sets (a property set being a group of properties). During passcode entry, each virtual key is associated with a single property from each of the plurality of property sets.

In accordance with another aspect of the present invention, upon completion of passcode entry, the interpretation values of the properties associated with the selected virtual keys are compared with the interpretation values of the passcode previously recorded as valid during the passcode creation process.

In accordance with another more particular embodiment of the present invention, upon completion of passcode entry, the property sets from which the properties associated with the selected virtual keys originated are compared with the property sets of the passcode previously recorded as valid during the passcode creation process.

In accordance with another aspect of the present invention, the property associations with each of the virtual keys are re-assigned in a generally random manner upon each use of the passcode entry interface.

In accordance with a more particular aspect of the present invention, the process by which the property associations with each of the virtual keys includes: a) the calculation of a number being the optimally secure number of property sets to group together; b) selecting in a generally random manner a number of property sets equal to the previously calculated value; c) re-associating the properties within the selected property sets collectively as a group across the plurality of virtual keys in a generally random manner; d) manifestation of the updated interface via the device.

In accordance with a more particular embodiment of the present invention, one of the property sets used during passcode entry can be static, thereby being excluded from the generally random property re-assignment.

In accordance with another embodiment of the present invention, a method is provided for passcode creation. The general method for passcode creation includes: a) presenting to a client a predetermined interface layout; b) entry of desired passcode by the client via the selection of virtual keys which are associated with properties; c) indication by the client that passcode entry is complete; d) recording of the entered passcode by the system for future use in attempting access.

In accordance with a more particular embodiment of the present invention, the predetermined interface layout used during passcode creation is composed of a plurality of virtual keys manifested in a defined configuration via a device.

In accordance with a more particular embodiment of the present invention, the device used during passcode creation can partially include of a graphical interface.

In accordance with a more particular embodiment of the present invention, the virtual keys presented during passcode creation are each associated with a single property, the property being a combination of an interface representation and an interpretation value. The interface representation is the manifestation of the property via the device providing the human interface. The interpretation value is the identity of the property by which it is identified by the system.

In accordance with another particular embodiment of the present invention, the virtual keys presented during passcode creation are each associated with a plurality of properties, a property being a combination of an interface representation and an interpretation value. The interface representation is the manifestation of the property via the device providing the human interface. The interpretation value is the identity of the property by which it is identified by the system.

In accordance with another aspect of the particular embodiment of the present invention, the selection of a virtual key causes the manifestation of a plurality of virtual keys equal to the number of properties associated to the selected virtual key, each of the manifested virtual keys being associated with one of the properties associated with the selected virtual key. The desired property to be included in passcode creation is then chosen by selecting the manifested virtual key associated with the desired property.

In accordance with another aspect of the present invention, upon completion of passcode creation, the interpretation values of the properties associated with the selected virtual keys are recorded for future use in attempting access via the passcode entry process.

In accordance with another more particular embodiment of the present invention, upon completion of passcode creation, the property set from which each of the properties has been chosen is recorded as a property pattern in addition to the recording of the interpretation values.

In accordance with another embodiment of the present invention, a method is provided for secure passcode creation. The general method for secure passcode creation includes: presenting to a client a predetermined interface layout; entry of desired passcode by the client via the selection of virtual keys which are associated with properties; indication by the client that passcode entry is complete; re-associating the properties within the selected property sets across the plurality of virtual keys in a generally random manner through the use of a property dispersion algorithm which ensures that properties initially associated as a group with any given virtual key are not associated as a group with any virtual key following the re-association; manifestation of the updated interface via the device; re-entry of desired passcode as confirmation by the client via the selection of virtual keys which have been re-associated with properties; verification that initial passcode entry and passcode confirmation entry share in common the same properties for each position within the desired passcode; recording of the entered passcode by the system for future use in attempting access.

In accordance with another more particular embodiment of the present invention, methods are described for conversion of passcodes into traditional PINs for both passcode creation and account access entry to be used with current banking systems.

One advantage of the present invention is that passcode disclosure through any means of observation requires multiple observations of the passcode entry process for the same passcode. Multiple observations do not guarantee passcode disclosure, as the probability of the property re-association process between passcode entry attempts is generally random. The probability of passcode disclosure is inversely proportional to the number of property sets utilized, the number of virtual keys defined for the interface configuration, the number of unique properties defined in each of the property sets, and the length of the passcode.

Another advantage of the present invention is that all existing password/PIN schemes are inherently supported without requiring existing passwords/PINs to be disposed of and/or reset. Still further advantages and benefits of the present invention will become apparent to those of ordinary skill in the art upon reading and understanding this specification.

BRIEF DESCRIPTION OF THE DRAWINGS

The present invention may take form in various components and arrangements of components, and/or in various steps and arrangements of steps. The drawings are only for purposes of illustrating preferred embodiments and are not to be construed as limiting the invention.

FIG. 8b illustrates an alternative high-level logical process flow diagram to that shown in FIG. 8, showing the entry and verification of a passcode for an embodiment allowing a device utilized for passcode validation to have knowledge of a property pattern associated with a valid passcode.

FIG. 36b illustrates the remainder of the high-level logical process flow diagram example of a property dispersion algorithm started in FIG. 36a.

FIG. 37 illustrates a high-level logical process flow diagram example of a property static value initialization routine to be executed as a subroutine in conjunction with the property dispersion algorithm depicted in FIG. 36a and FIG. 36b.

FIG. 44 illustrates an example of property sets configured to be utilized in passcode system embodiments integrating with current banking systems as described in FIG. 45 and FIG. 46. These property sets are also used in FIG. 48 and FIG. 49 to depict an example of an embodiment implementing a secure passcode creation method.

DETAILED DESCRIPTION

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

The following is intended to provide a detailed description of examples of the invention and should not be taken to be limiting of the invention itself. Rather, any number of variations may fall within the scope of the invention, which is defined in the claims following the description.

Figure 1:
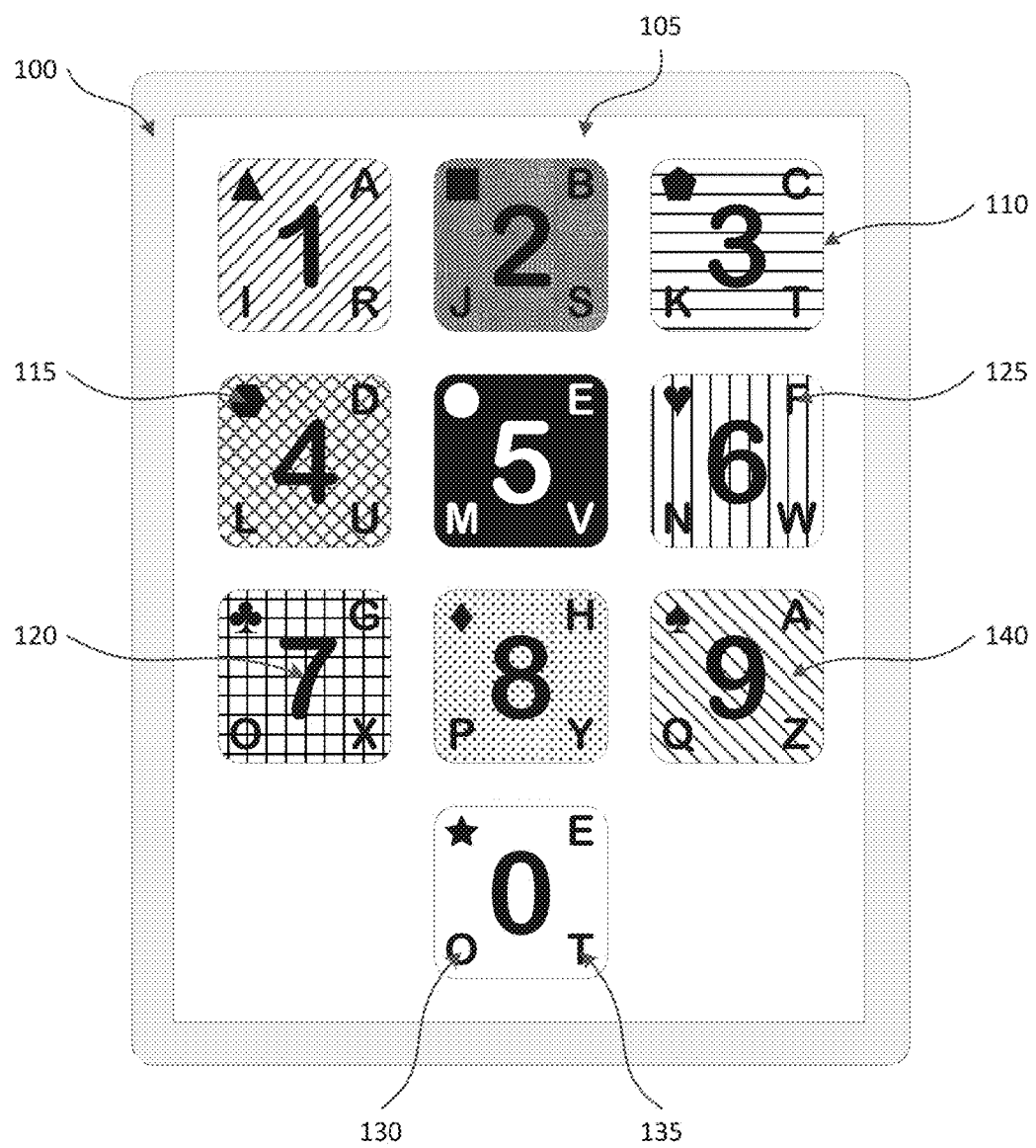
FIG. 1 illustrates an exemplary embodiment of a virtual key arrangement utilizing property sets for use during the process of passcode entry and verification having similarities to commonly-used numeric keypads.

FIG. 1 is an exemplary embodiment of the present invention for the purpose of passcode entry. The example depicts a device 100 having the capabilities to manifest an arrangement of virtual keys 110, in this case via a graphical interface 105. For purposes of this invention, a device may be any computer, system, or attached peripheral capable of dynamically altering its interface and presenting to users of the system different interface configurations through which the users may provide a passcode. Examples of such a device include, but are not limited to: handheld devices used during data collection, cellular phones and smart devices, ATM machines, personal computers, credit/debit systems used at gas pumps and checkout lines, physical security access terminals, etc. Each of the virtual keys 110 in this embodiment is associated with six property sets; however any plurality of property sets may be employed. The property sets used in the example shown in FIG. 1 are: shape 115, number 120, Latin characters A through H 125, Latin characters I through Q 130, Latin characters R through Z 135, and color 140 (represented as a pattern). Property sets can include groups of any properties allowing one virtual key 110 to be distinguishable from another within the capabilities of the device 100. As is readily apparent by FIG. 1, each property set includes a plurality of distinguishable properties, generally less than or equal to the number of virtual keys 110 utilized by the interface. Each property is defined as a combination of an interface 105 representation, which is manifested via the device 100, and an interpretation value, which is used in identification of the property by the system.

It is possible for a property to be associated with more than one virtual key. For example, the virtual keys associated with the number properties "1" and "9" in FIG. 1 share an association to the Latin character property "A". Also, the virtual key associated with the number property "0" shares an association to the Latin character properties "E", "O", and "T" with a number of other virtual keys. In this particular embodiment, these four properties are repeated because they are the most commonly used letters in the English language. To prevent confusion by users of the system, any shared property interface representation also share the same interpretation value.

Figure 31:
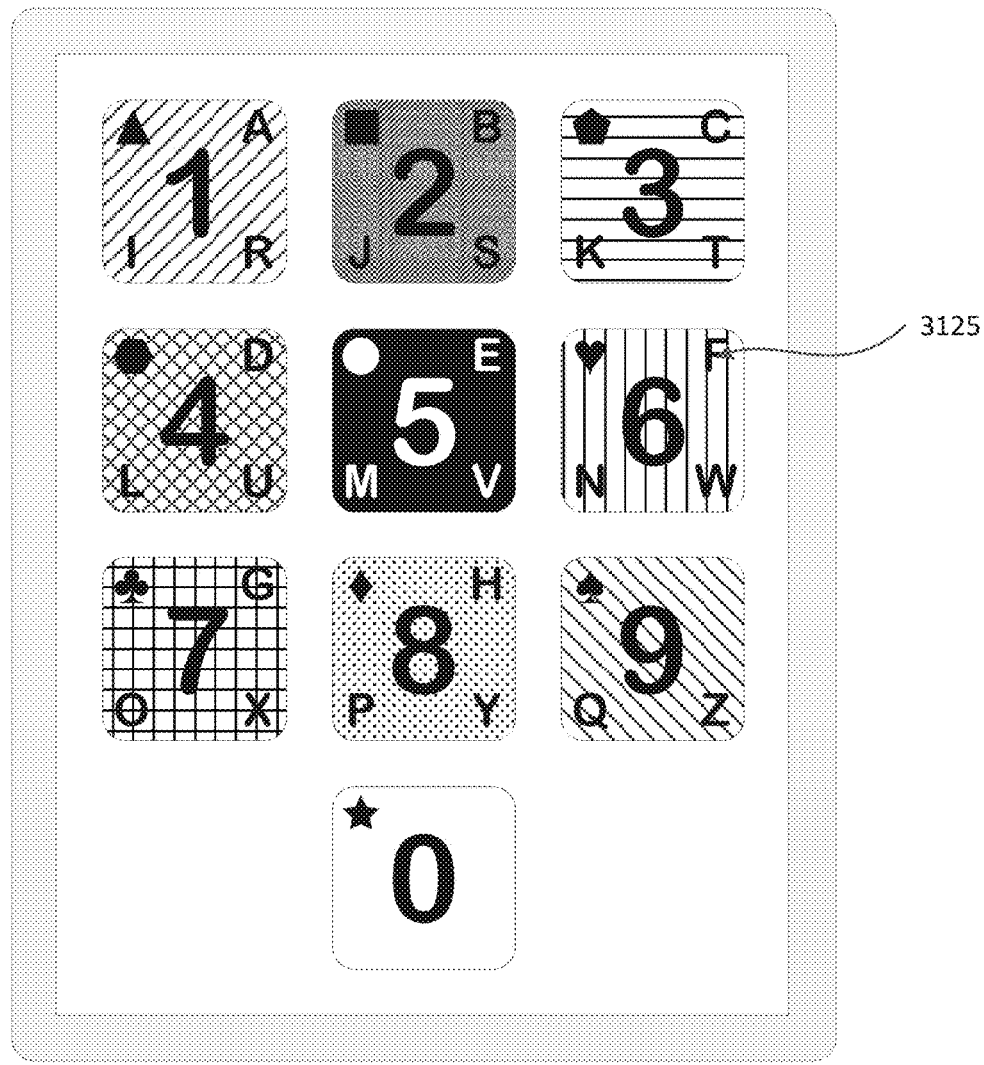
FIG. 31 illustrates a twenty-third alternative exemplary embodiment of a virtual key arrangement utilizing property sets for use during the process of passcode entry and verification, having property sets with empty properties.

It is also possible for a property set to contain fewer properties than the number of virtual keys utilized by the interface configuration, as is demonstrated in the embodiment depicted in FIG. 31. Notice that the upper right corner of the virtual key associated with the number property "9" does not show a property where the property set of Latin characters A through H 3125 would otherwise be located. Also, the virtual key associated with the number property "0" is not associated with any of the three Latin character property sets. Upon shuffling the associated properties among the virtual keys, these empty property values are treated in an identical manner as they are contained an interface representation. However, when a virtual key is chosen during passcode entry, any missing properties are omitted from the recorded selection.

Figure 7:
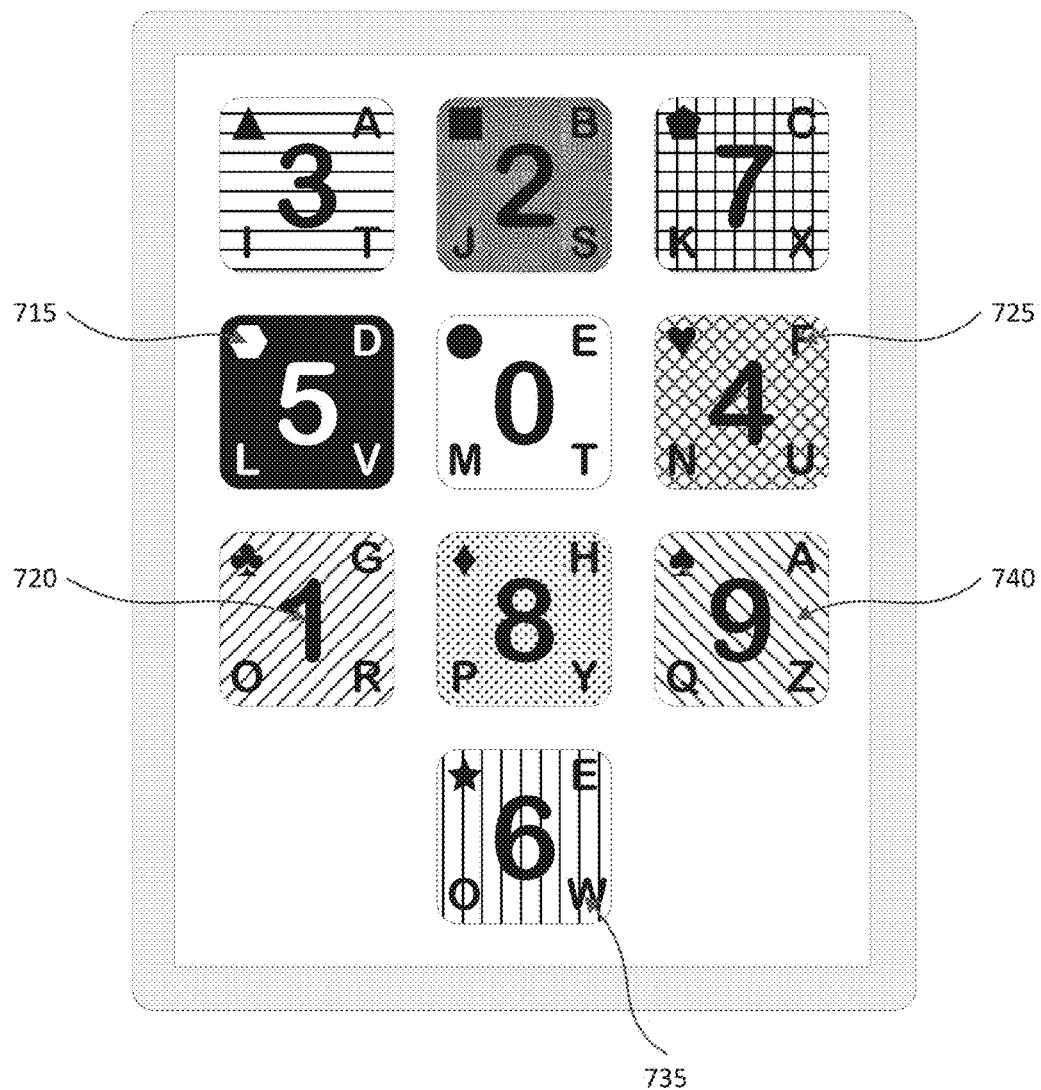
FIG. 7 illustrates an example of the virtual key arrangement utilizing property sets for use during the process of passcode entry following a re-association of the properties to the virtual keys shown in FIG. 1.
Figure 8:
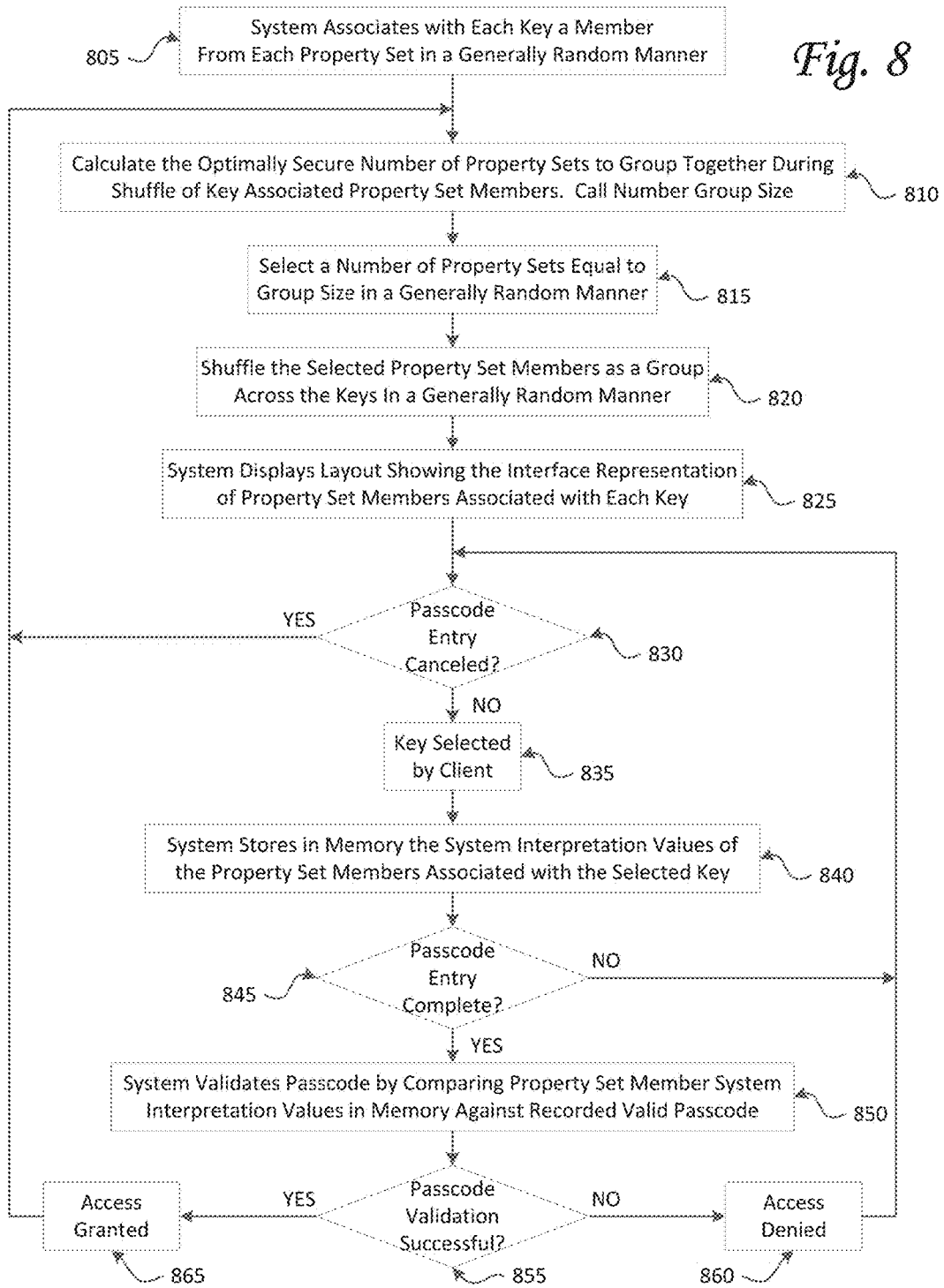
FIG. 8 illustrates a fourth example high-level logical process flow diagram for the entry and verification of a passcode.
Figure 32:
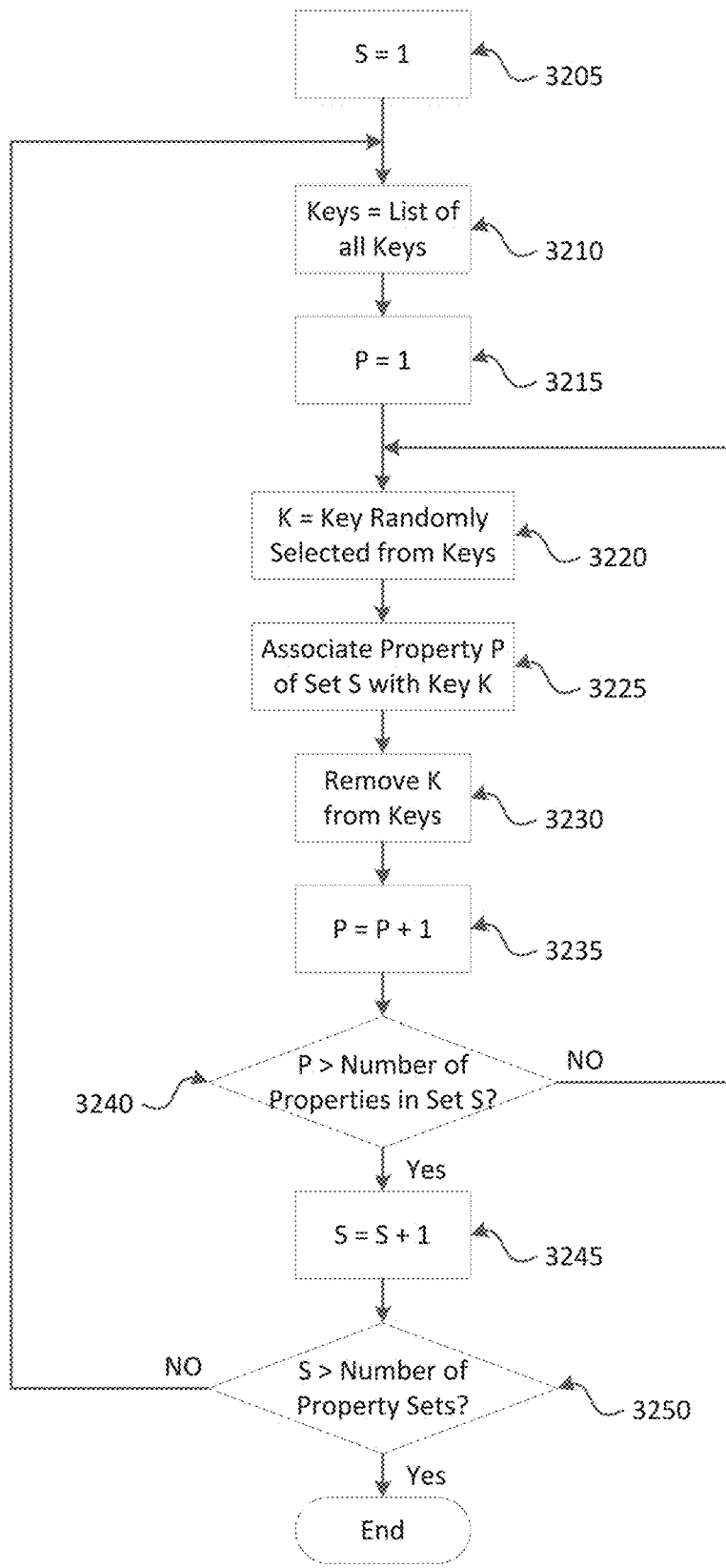
FIG. 32 illustrates a high-level logical process flow diagram as an example which may be used in the association of properties to virtual keys step shown in steps 805, 805a, and 805b of FIGS. 8, 8a, and 8b, respectively.
Figure 33:
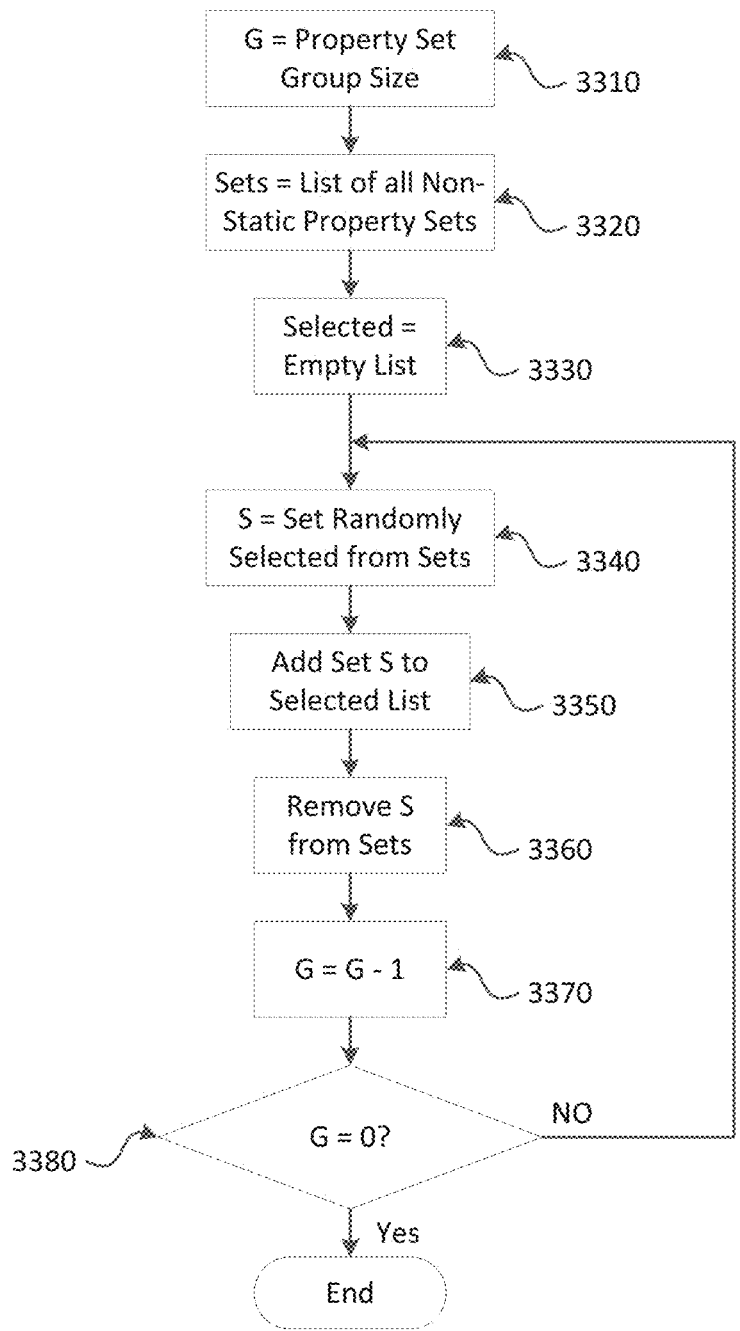
FIG. 33 illustrates a high-level logical process flow diagram as an example which may be used in the selection of property sets to group during property shuffling step shown in steps 815, 815a, and 815b of FIGS. 8, 8a, and 8b, respectively.
Figure 34:
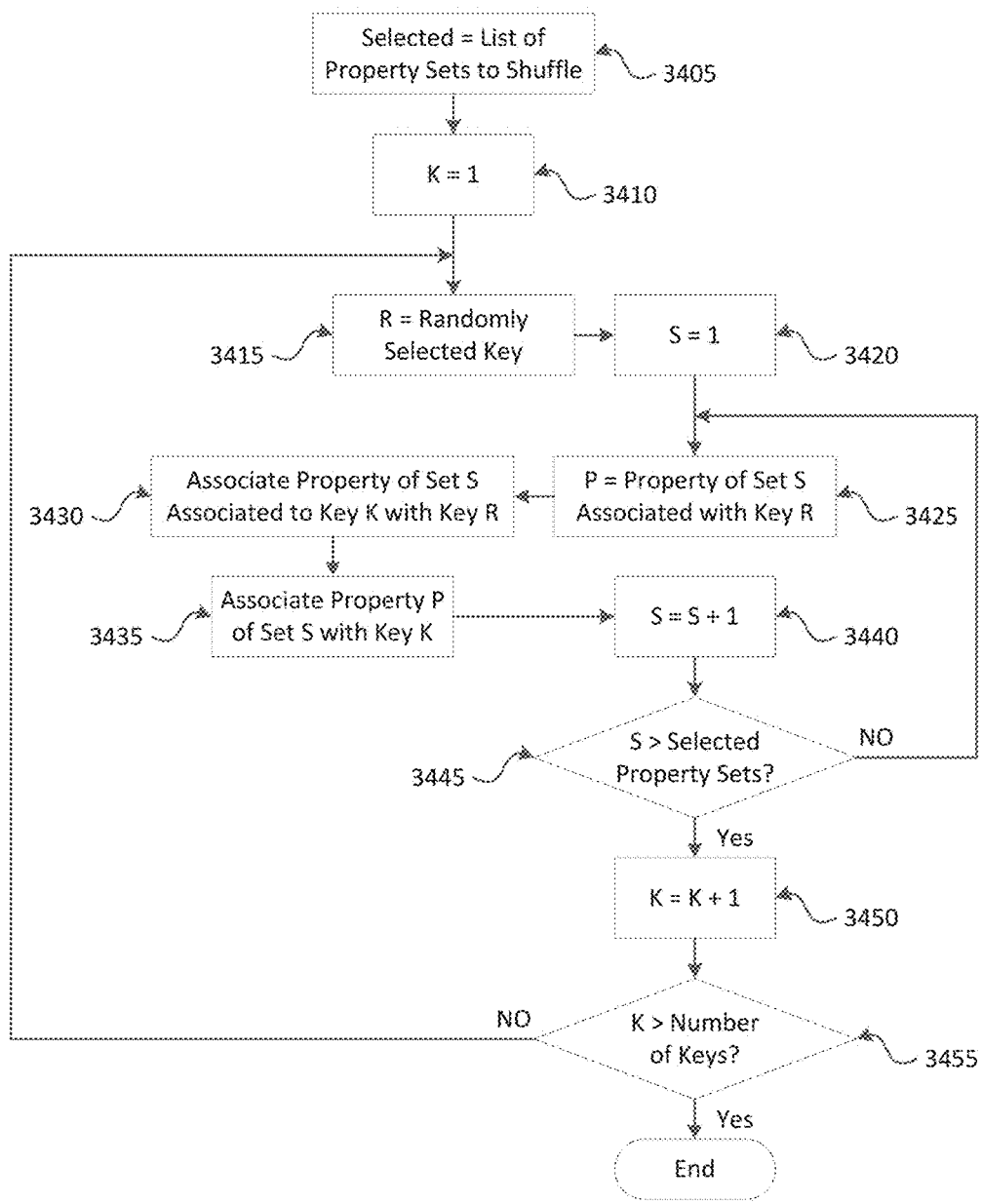
FIG. 34 illustrates a high-level logical process flow diagram as an example which may be used in the shuffling of properties across virtual keys step shown in steps 820, 820a, and 820b of FIGS. 8, 8a, and 8b, respectively.
Figure 35:
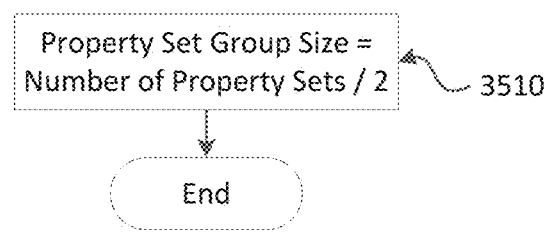
FIG. 35 illustrates a high-level logical process flow diagram as an example which may be used in the calculation of the number of property sets to utilize during the shuffling of the property associations to the keys. This process is a more detailed look at steps 810, 810a, and 810b in FIGS. 8, 8a, and 8b, respectively.

When passcode entry is used, the properties associated with the virtual keys are shuffled in a generally random process depicted in FIG. 8. This process begins with the arrangement depicted in FIG. 1 and can result in the arrangement depicted in FIG. 7. The system associates 805 a member from each property set with each virtual key in a generally random manner, for which an example is depicted in FIG. 32, resulting in the arrangement depicted in FIG. 1. Then, an optimally secure number of property sets to group together is calculated 810, for which an example is depicted in FIG. 35, based on the number of property sets utilized. In the case of this example having six property sets, the calculated number is three. Then, a number of property sets equal to the previously-calculated value are selected 815 in a generally random manner for which an example is depicted in FIG. 33. The property sets number 120 and 720, Latin characters R through Z 135 and 735, and color 140 and 740 are selected in the present example. Then, the properties within the selected property sets are re-associated collectively 820 as a group across the plurality of virtual keys in a generally random manner for which an example is depicted in FIG. 34. Finally, the device manifests 825 the updated interface shown in FIG. 7.

Figure 9:
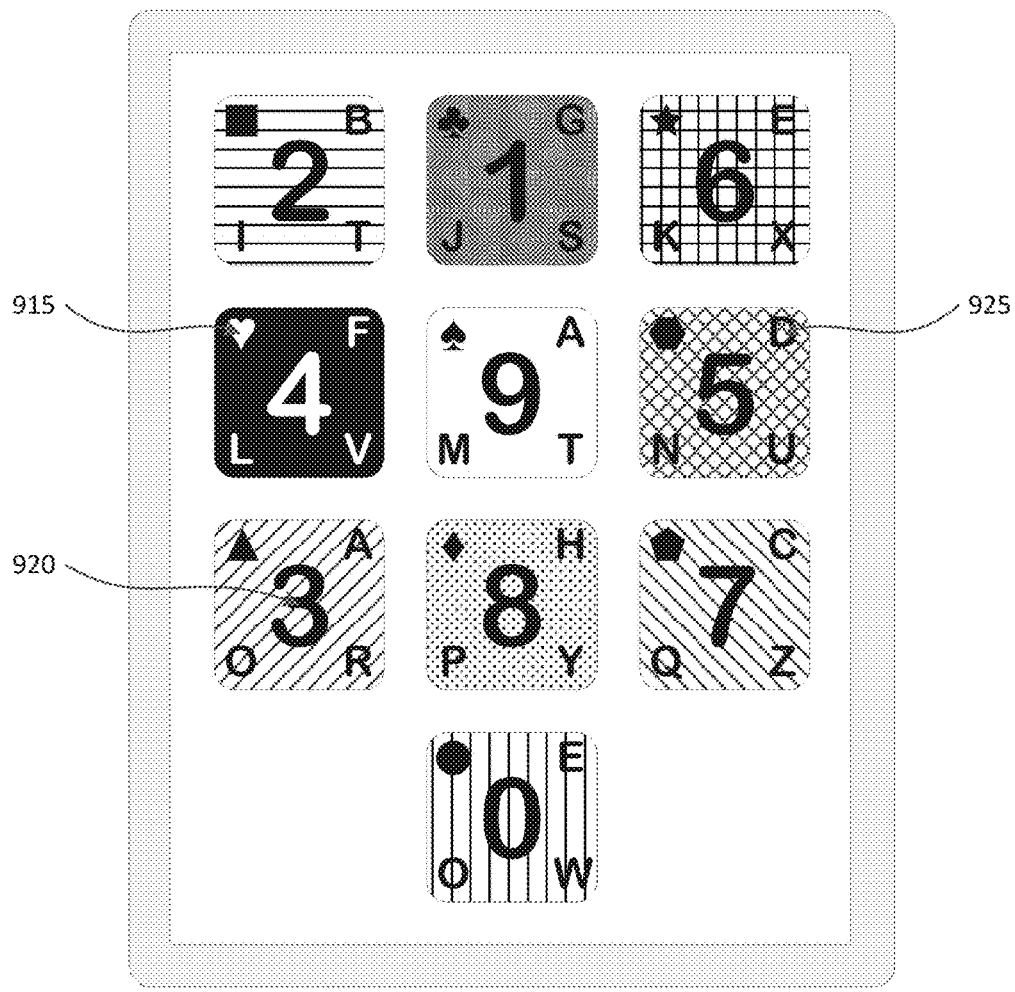
FIG. 9 illustrates a first alternative example of a virtual key arrangement following a second re-association of the properties to the virtual keys shown in FIG. 1, utilizing property sets for use during the process of passcode entry.

The arrangement depicted in FIG. 9 depicts the results of this process having been executed once again using the arrangement depicted in FIG. 7 as the starting point. In the case of the arrangement depicted in FIG. 9, the randomly selected property sets are shape 715 and 915, number 720 and 920, and Latin characters A through H 725 and 925.

A passcode entry process is also described in FIG. 8. At any point during passcode entry, a user can choose to cancel 830 the process, thereby clearing any previously selected properties and beginning the process anew. Upon the selection 835 of one of the virtual keys by a user, it is not obvious to an observer which of the properties is being chosen, as it may be any one of the plurality of properties associated with the selected virtual key. At this time, the system records or stores 840 all of the interpretation values of the properties associated with the selected virtual key for the present position in the passcode. This process is repeated until passcode entry is complete 845, at which time the system performs a comparison 850 between a valid passcode which was previously created and the passcode provided by the user. This comparison determines 855 if the validation is a successful match. If the entered passcode does not match the valid passcode, access to the system is denied 860. If the comparison is equal, any access which the system is designed to grant is provided to the user 865.

Figure 10:
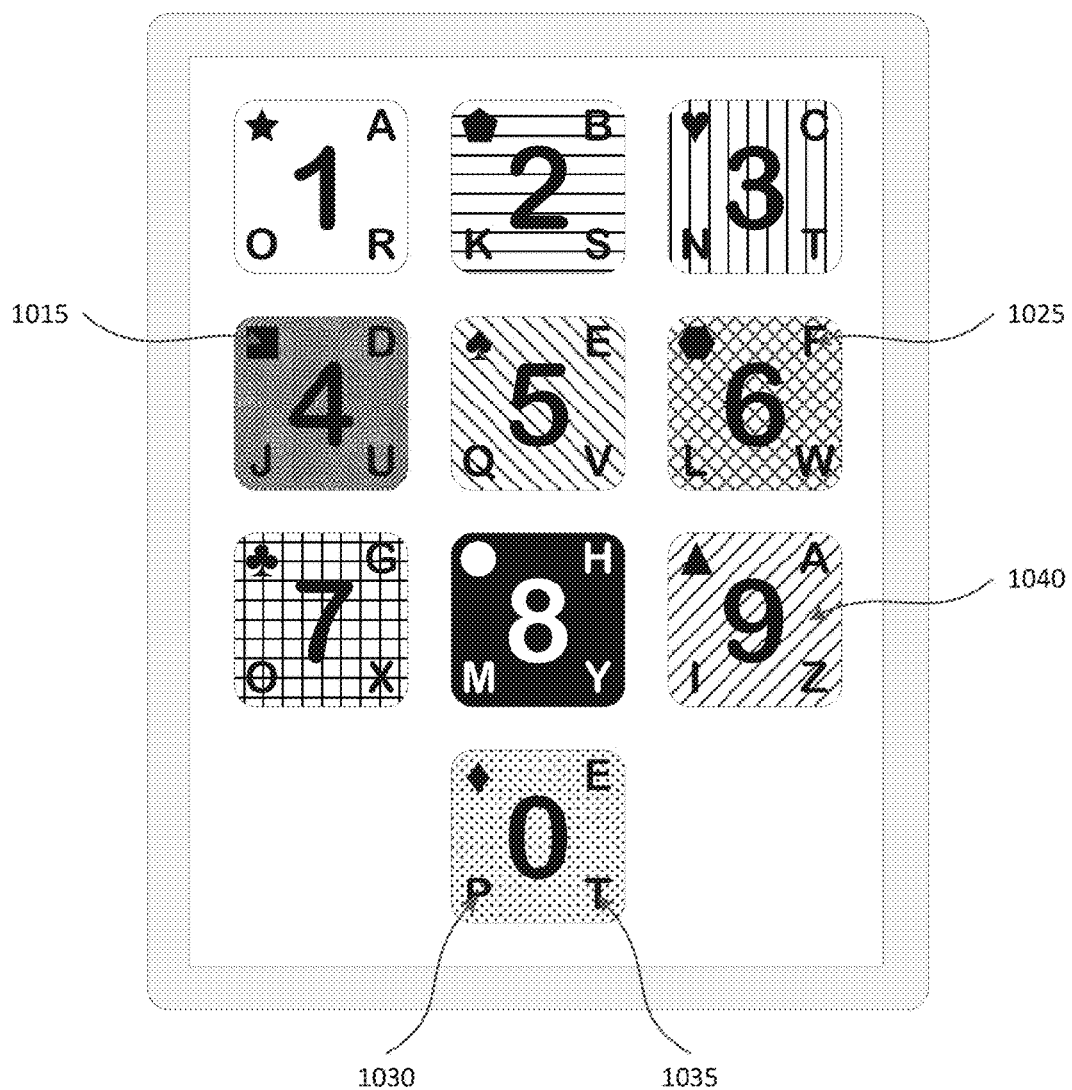
FIG. 10 illustrates a second alternative example of a virtual key arrangement following a re-association of the properties to the virtual keys shown in FIG. 1, utilizing property sets for use during the process of passcode entry, having the numbers property set frozen.

Another exemplary embodiment of the invention allows one of the property sets to be made static, in which case the property set is excluded from the random selection of property sets to re-associate. FIG. 10 shows an example of such an embodiment following the shuffling process beginning with the arrangement depicted in FIG. 1. The chosen properties to shuffle are shape 115 and 1015, Latin characters I through Q 130 and 1030, and color 140 and 1040.

Figure 11:
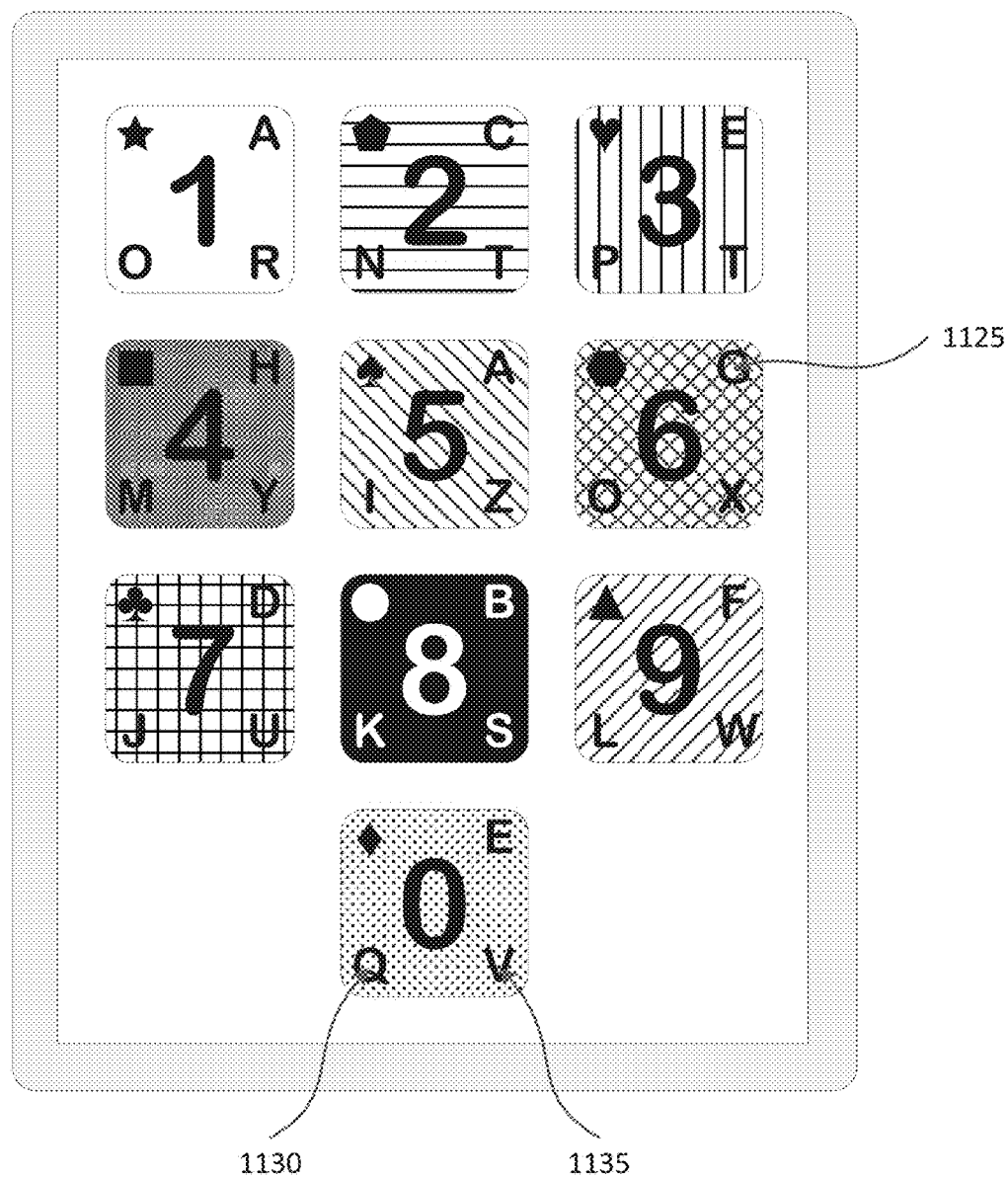
FIG. 11 illustrates a third alternative example of a virtual key arrangement following a second re-association of the properties to the virtual keys shown in FIG. 1, utilizing property sets for use during the process of passcode entry, having the numbers property set frozen.

FIG. 11 depicts the results of this shuffling process having been executed once again using the arrangement depicted in FIG. 10 as the starting point. In the case of FIG. 11, the randomly selected property sets are Latin characters A through H 1025 and 1125, Latin characters I through Q 1030 and 1130, and Latin characters R through Z 1035 and 1135.

Figure 2:
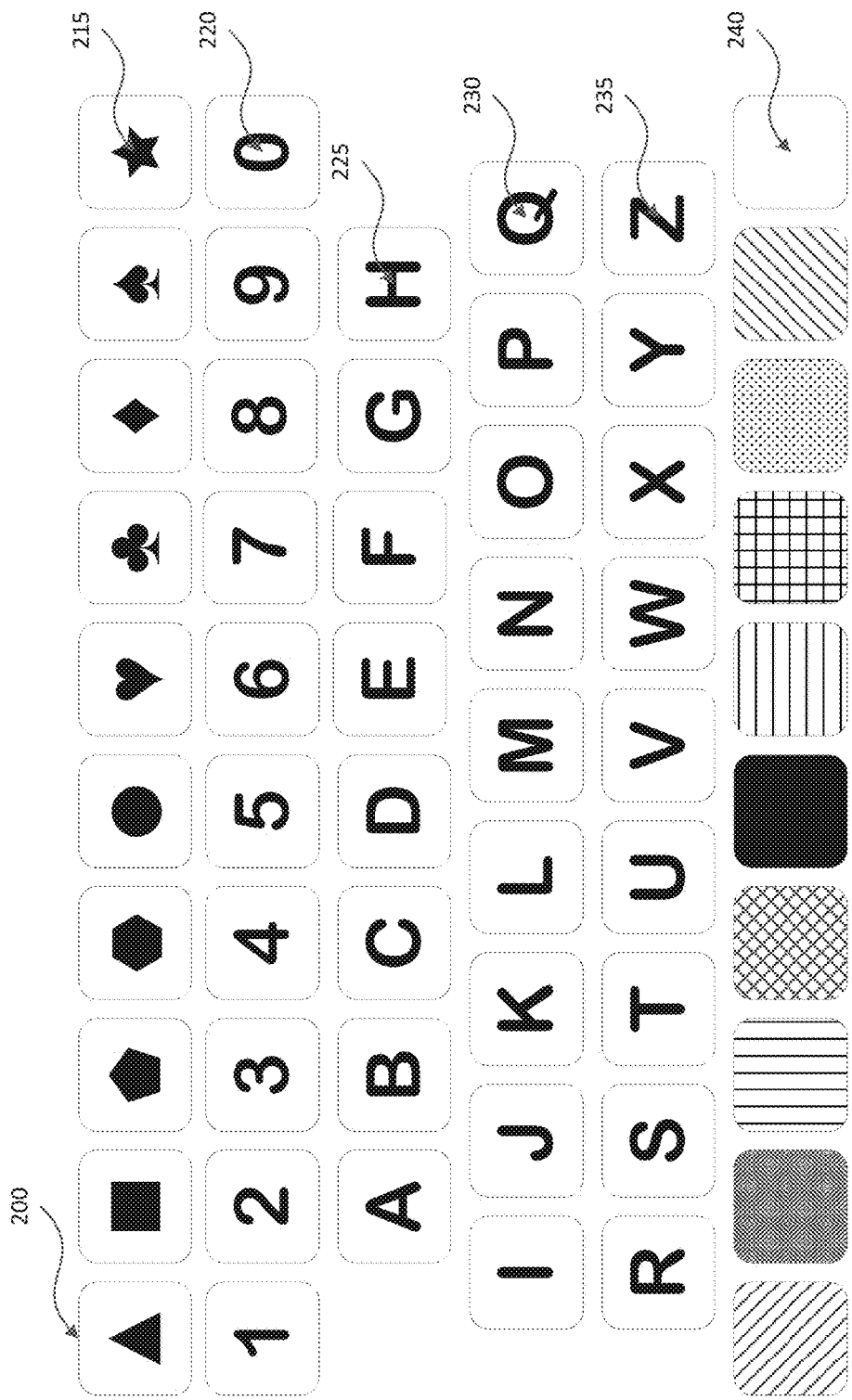
FIG. 2 illustrates an exemplary embodiment of a physical or virtual key arrangement which may be used during the process of creating a passcode for use with the passcode entry virtual key arrangement shown in FIG. 1.

FIG. 2 depicts an exemplary embodiment of the passcode creation process, in which each key is associated with a single property. In this embodiment the keys 200 can be virtual, being manifested by a device, or the keys may be physical components of a device whose purpose is to be used for passcode creation. The specific example shown in FIG. 2 utilizes a row of keys for each property set; the top row being the shape 215 property set; the second row being the number 220 property set; the property set of Latin characters A through H 225 in the third row; the property set of Latin characters I through Q 230 in the fourth row; row five being the property set of Latin characters R through Z 235; and the property set of colors 240 (represented as patterns) in the last row.

Figure 3:
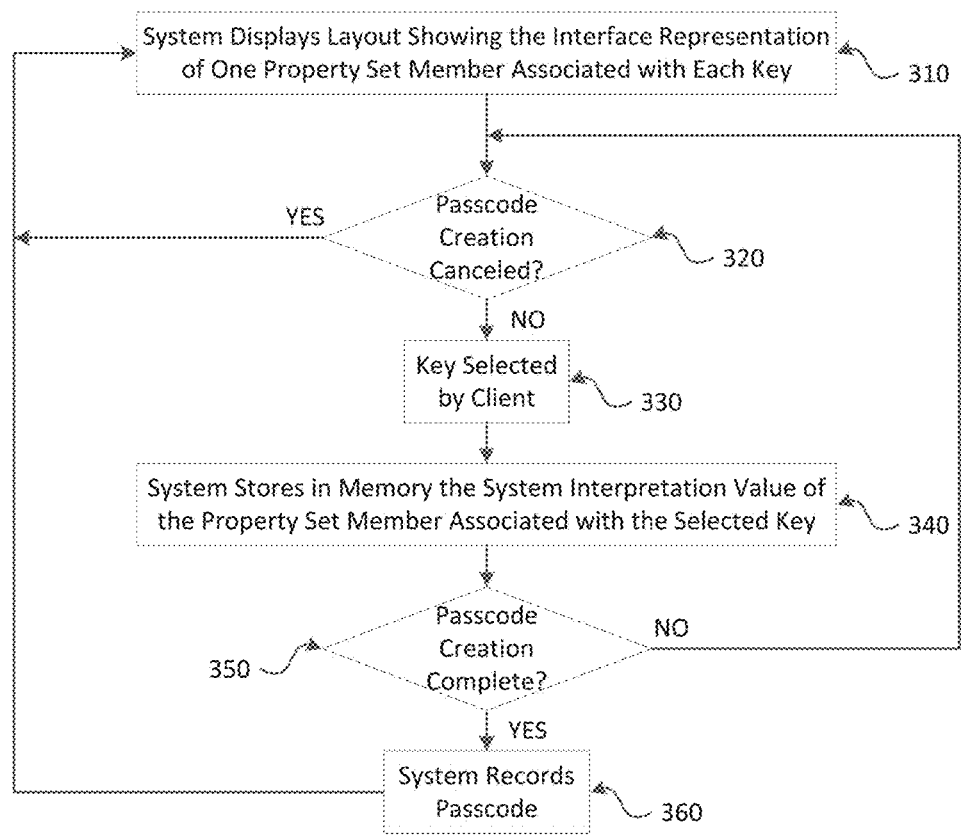
FIG. 3 illustrates a first example high-level logical process flow diagram for the creation of a passcode accompanying the use of a key arrangement similar to the one shown in FIG. 2.

The process by which this embodiment creates the passcode is outlined in FIG. 3. The system either manifests the interface 310 or the interface is built as a physical component of a device to be used for passcode creation. At any point during passcode creation, a user may choose to cancel the process 320, thereby clearing any previously selected properties and beginning the process anew. Upon the selection of one of the keys 330 the system records the interpretation value of the property associated with the selected key 340 for the present position in the passcode. This process is repeated until passcode creation is complete 350, at which time the system saves the interpretation values as a valid passcode for future use during passcode entry 360.

Figure 4:
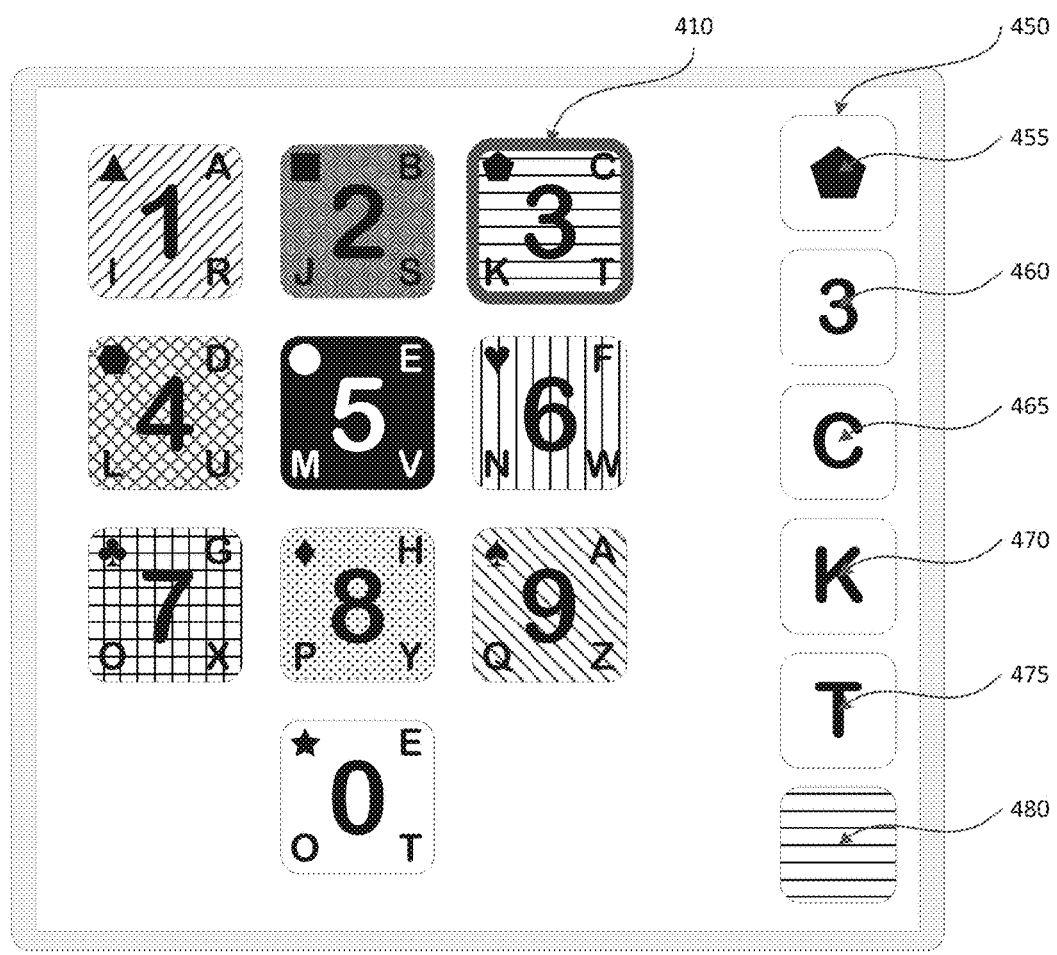
FIG. 4 illustrates a second exemplary embodiment of a virtual key arrangement utilizing property sets which can be used during the process of creating a passcode for use with the passcode entry virtual key arrangement shown in FIG. 1.

Another exemplary embodiment of passcode creation is shown in FIG. 4. In this embodiment, each virtual key is associated with a plurality of properties. Upon selection of one of the virtual keys 410, a virtual key 450 associated with each of the properties associated with the selected key is manifested 455-480. The property associated with a manifested key is added to the present position in the passcode being created when the manifested virtual key is selected.

Figure 5:
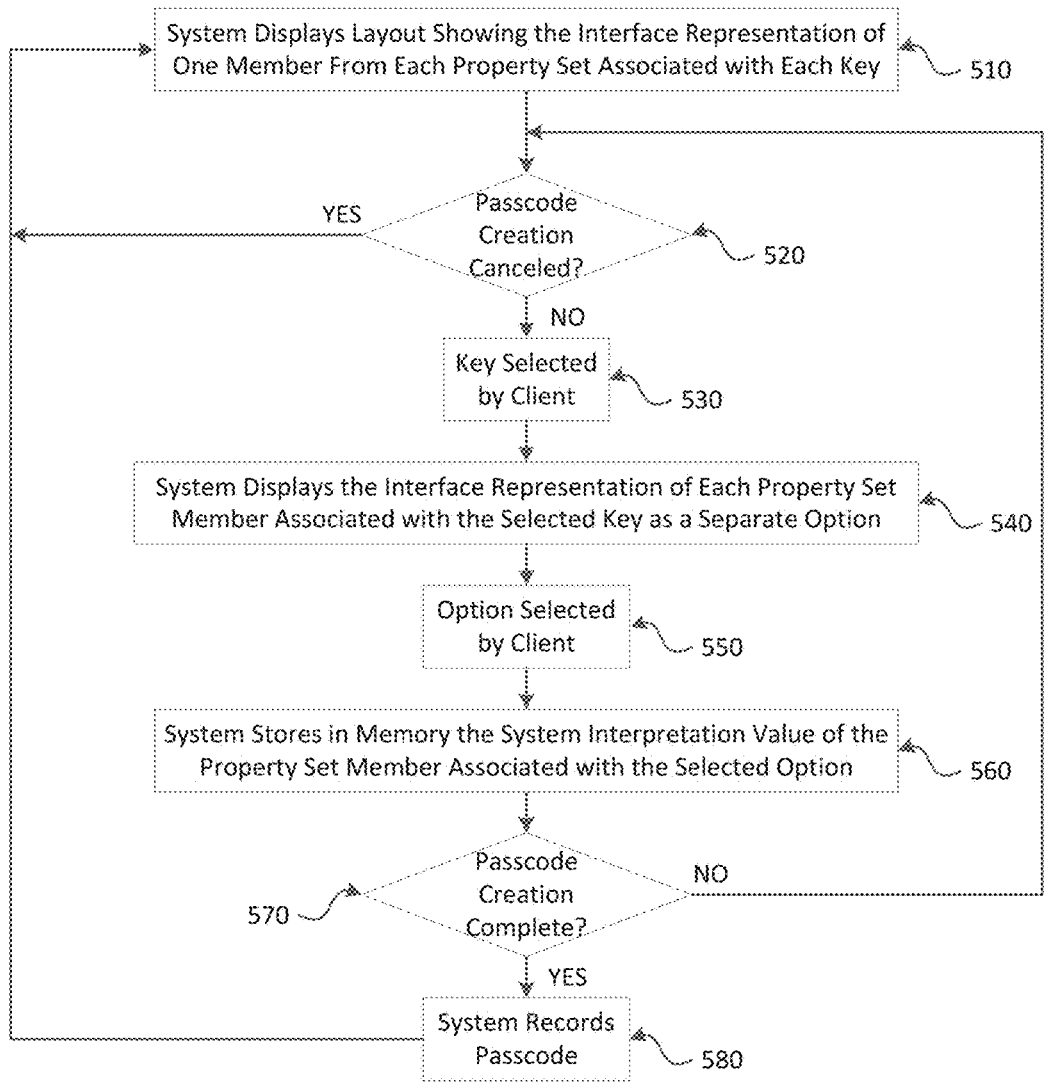
FIG. 5 illustrates a second example high-level logical process flow diagram for the creation of a passcode accompanying the use of a key arrangement similar to the one shown in FIG. 4.

The process by which the passcode is created for this embodiment is described in FIG. 5. The system either manifests the interface 510 or the interface is built as a physical component of a device to be used for passcode creation. At any point during passcode creation, a user can choose to cancel the process 520, thereby clearing any previously selected properties and beginning the process anew. Upon the selection of one of the keys 530 the system manifests a virtual key for each of the properties associated with the selected key 540. When one of the newly manifested virtual keys is selected 550, the system records 560 the interpretation value of the property associated with the selected key for the present position in the passcode. This process is repeated until passcode creation is complete 570, at which time the system saves the interpretation values as a valid passcode for future use during passcode entry 580.

Figure 6:
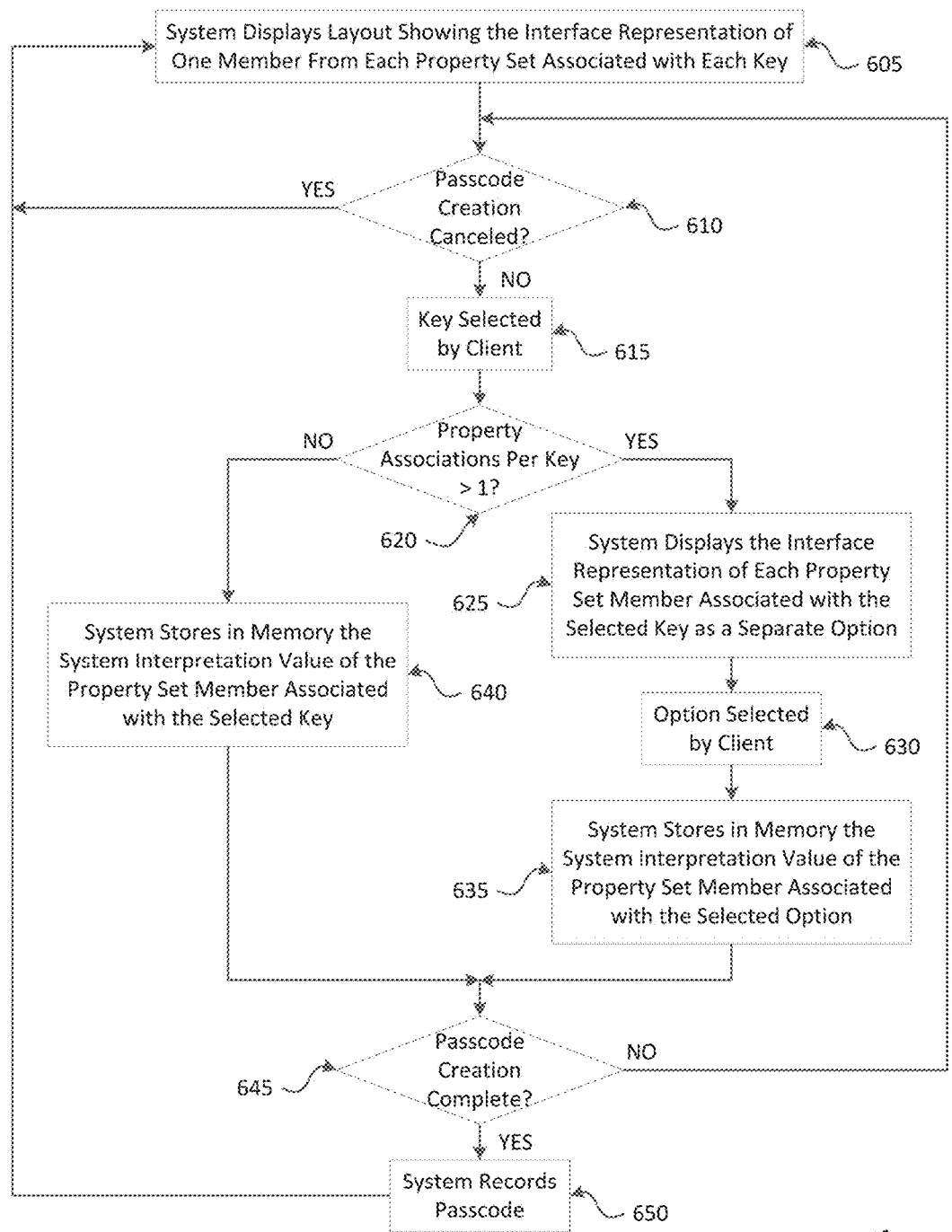
FIG. 6 illustrates a third example high-level logical process flow diagram for the creation of a passcode which accommodates the use of key arrangements similar to those shown in both FIG. 2 and FIG. 4.

FIG. 6 demonstrates an example of a process by which the exemplary embodiments depicted in FIG. 3 and FIG. 5 can be combined into a single process. The system either manifests the interface 605 or the interface is built as a physical component of a device to be used for passcode creation. At any point during passcode creation, a user can choose to cancel the process 610, thereby clearing any previously selected properties and beginning the process anew. Upon the selection of one of the keys 615 the system checks the number of properties associated with the selected virtual key 620. If the virtual key is associated with multiple properties, the system manifests a virtual key for each of the properties associated with the selected key 625; then, when one of the newly manifested virtual keys is selected 630, the system records the interpretation value of the property associated with the selected key 635 for the present position in the passcode. If the originally selected virtual key is associated with a single property, the system records 640 the interpretation value of the property associated with the selected key for the present position in the passcode. This process is repeated until passcode creation is complete 645, at which time the system saves the interpretation values as a valid passcode for future use during passcode entry 650.

Figure 47:
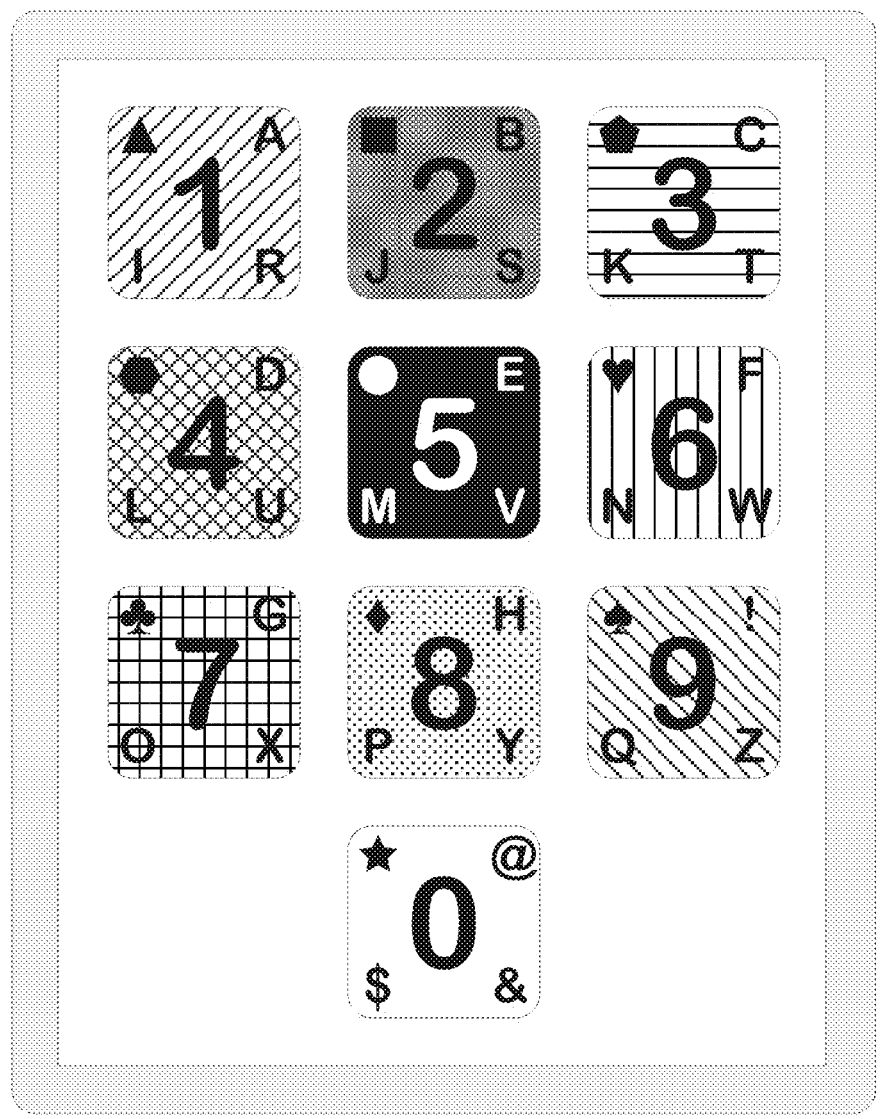
FIG. 47 illustrates an additional exemplary embodiment of a virtual key arrangement based on the property sets depicted in FIG. 44 utilizing property sets for use during the process of passcode entry and verification.
Figure 48:
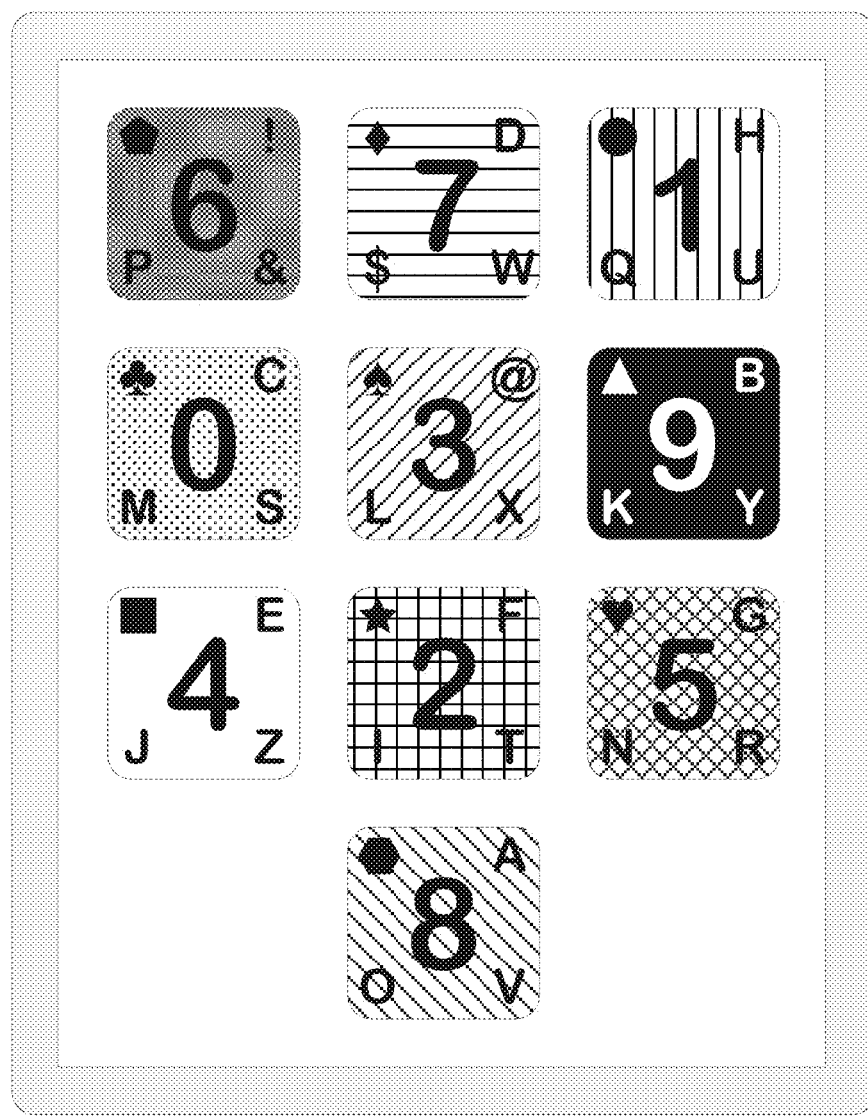
FIG. 48 illustrates an example of the virtual key arrangement utilizing property sets depicted in FIG. 44 following the execution of the property dispersion algorithm shown in FIG. 36a and FIG. 36b as applied to the virtual keys shown in FIG. 47.
Figure 49:
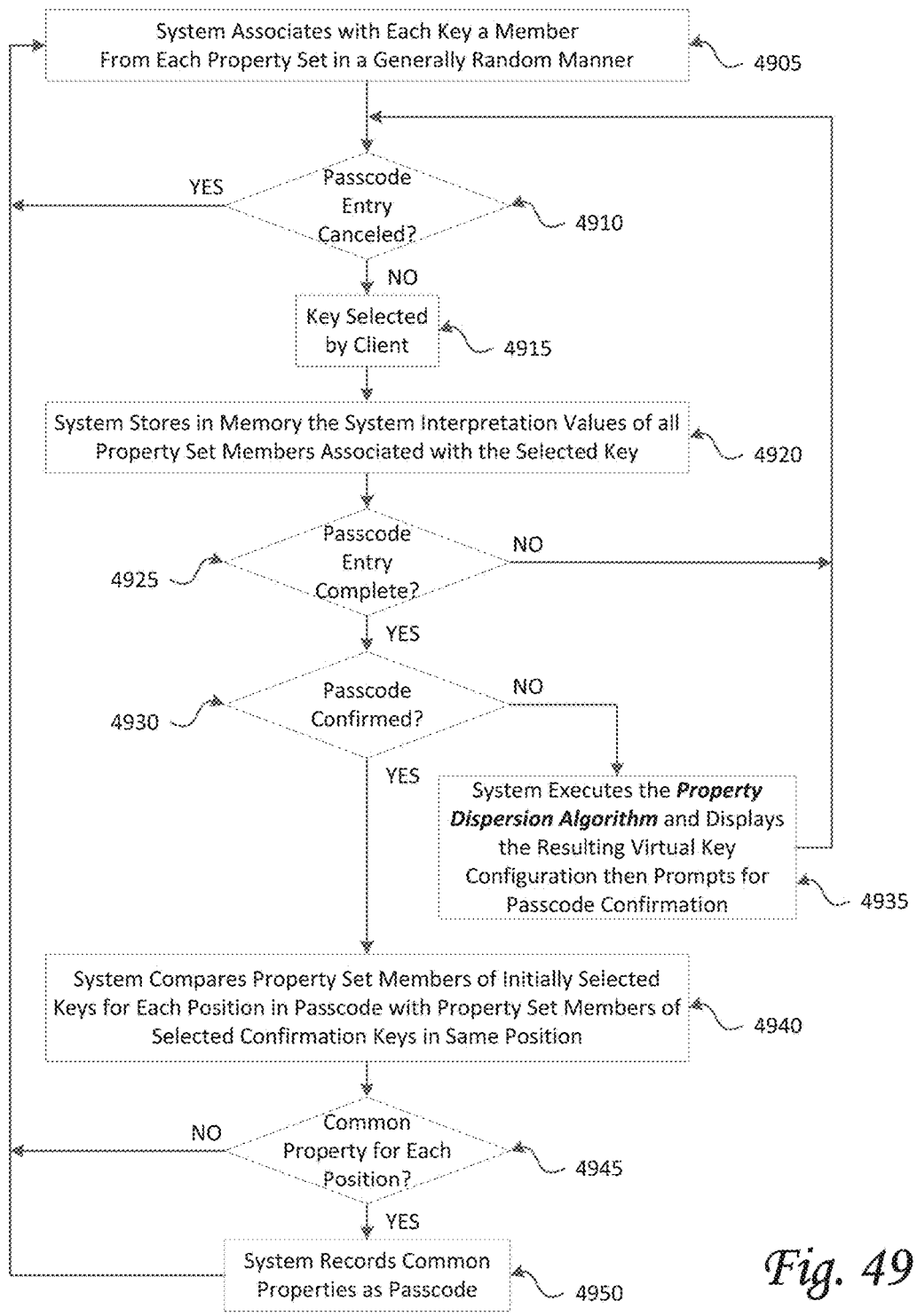
FIG. 49 illustrates an example high-level logical process flow diagram for the secure creation of a passcode accompanying the use of a key arrangement similar to those shown in FIG. 47 and FIG. 48.

Another exemplary embodiment of passcode creation provides a secure means of setting the passcode which would make it extremely difficult for an observer to determine the new passcode, even if the observer is allowed an optimal view while the passcode is being entered. FIGS. 36a-43 provide a property dispersion algorithm which will shuffle the properties associated with the virtual keys in a generally random manner such that the resulting configuration of associated properties on any virtual key will include at most a single property that was associated with a virtual key immediately prior to the execution of the algorithm. An example of the configuration shown in FIG. 48 is one possible result after the execution of the algorithm having been executed from the initial configuration shown in FIG. 47. The comparison of any virtual key in FIG. 47 with any virtual key in FIG. 48 will show that the compared virtual keys share at most a single property, including the position of the key within the interface. When a user of the system chooses to create a new passcode, a process similar to that depicted in FIG. 49 will be executed. In this embodiment, each virtual key is associated with a plurality of properties 4905. At any point during passcode creation, a user can choose to cancel the process 4910, thereby clearing any previously selected properties and beginning the process anew. Upon the selection of one of the keys 4915 the system records the interpretation value of all properties associated with the selected key 4920 for the present position in the passcode. This process is repeated until passcode entry is complete 4925, at which time the system executes the property dispersion algorithm 4935 shown in FIGS. 36a-43, after which the resulting configuration is displayed and the user is prompted to confirm the previously entered passcode. After the passcode entry process is repeated for confirmation 4390, a comparison between the properties associated with each initially selected key and the key selected during confirmation is made for each position of the entered passcode 4940. The property dispersion algorithm ensures that there can be no more than one property in common between the keys for each comparison. If the user correctly selected the keys having a common property for each position of the passcode during confirmation 4945, the system saves the interpretation values as a valid passcode for future use during passcode entry 4950. Otherwise, if the user did not select keys during confirmation having the same properties in the same sequence as during the initial passcode entry, the passcode creation process is canceled and the user must start the process again from the beginning. This embodiment is dependent upon the condition that the number of properties associated with each key is equal to or less than the total number of keys used by the interface implemented by the embodiment.

Figure 36A:
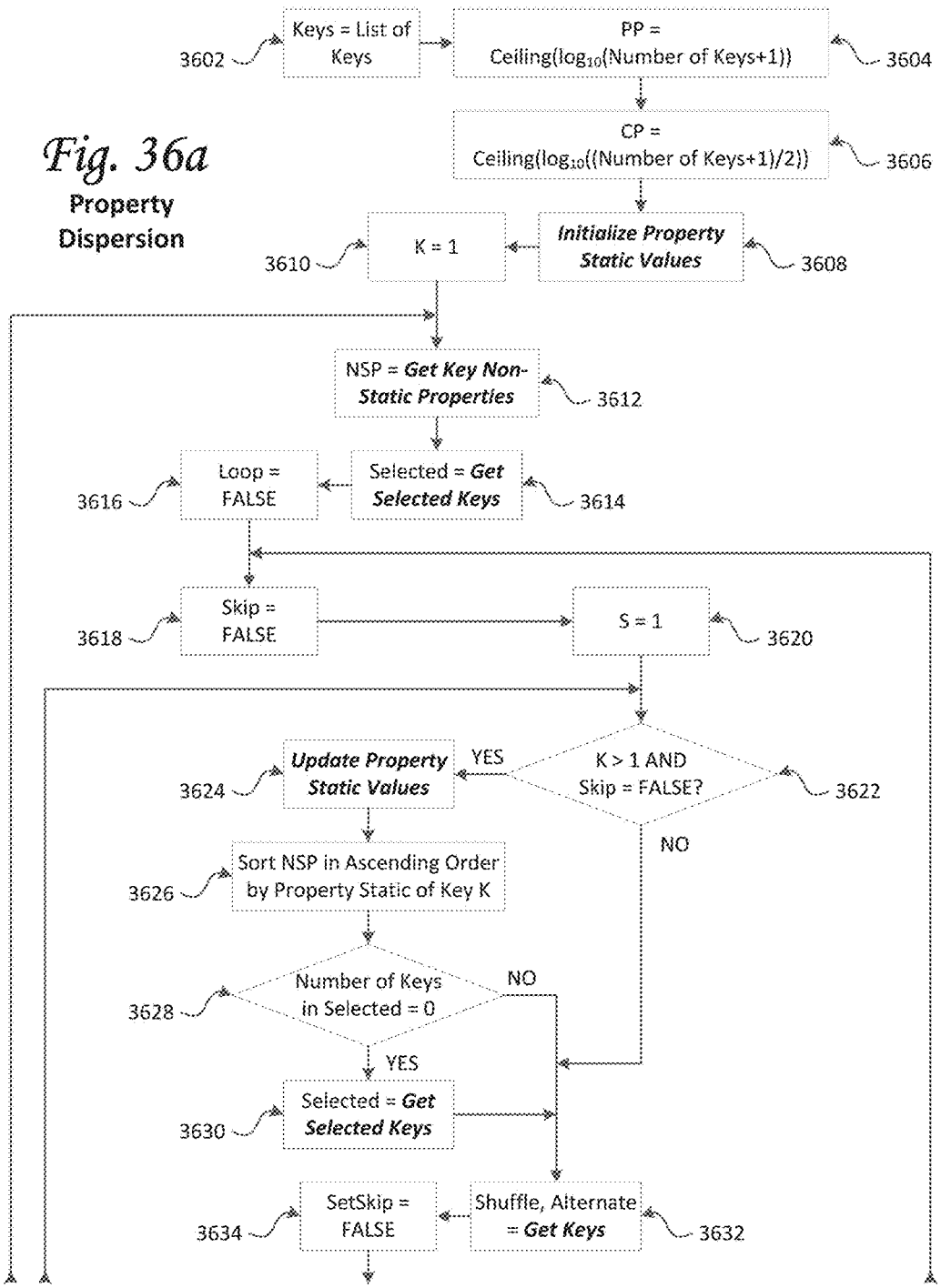
FIG. 36a partially illustrates a high-level logical process flow diagram example of a property dispersion algorithm which can be utilized in passcode system embodiments implementing a secure passcode creation method.
Figure 36B:
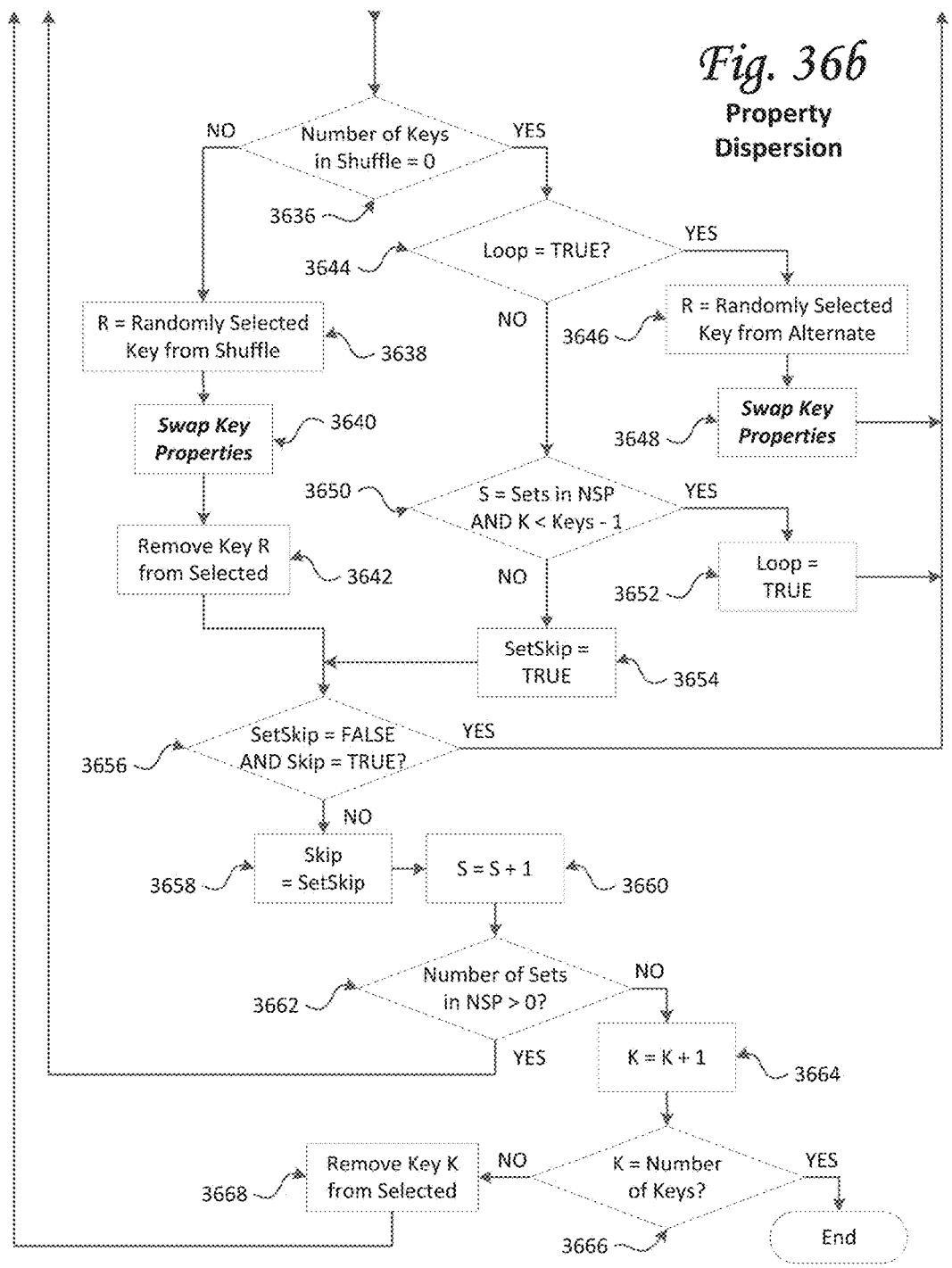

An example of a property dispersion algorithm is depicted in FIGS. 36a-36b. A list comprising all of the virtual keys is stored in system memory as variable Keys 3602, then variable PP is calculated as Ceiling($\log_{10}$(number of Keys in the list variable Keys+1)) 3604 and variable CP is calculated as Ceiling($\log_{10}$((number of Keys in the list variable Keys+ 1)/2) 3606. Property static values are then initialized 3608 following the Initialize Property Static Values process shown in FIG. 37 and the value one is assigned to variable K 3610. Variable NSP is set to a list of property sets 3612 using the Get Key Non-Static Properties process depicted in FIG. 38, and then the list of selected keys created following the Get Selected Keys process shown in FIG. 39 is assigned to variable Selected 3614. Next, variable Loop is given a Boolean value of FALSE 3616, as well as variable Skip 3618, and the value one is assigned to variable S 3620. If variable K is greater than one and Skip is equal to FALSE 3622, then property static values are updated 3624 using the Update Property Static Values process shown in FIG. 41, property set variable list NSP is sorted in ascending order based on the Static value of each property and the property set to which each property belongs of the key in the position equal to variable K in the Keys variable list 3626, and if zero is the number of keys in the variable list Selected 3628, the list created using the Get Selected Keys process depicted in FIG. 39 is assigned to the variable list Selected 3630. The list variables Shuffle and Alternate are then set 3632 to the list created following the Get Keys process shown in FIG. 42 and the Boolean value FALSE is assigned to variable SetSkip 3634.

Figure 43:
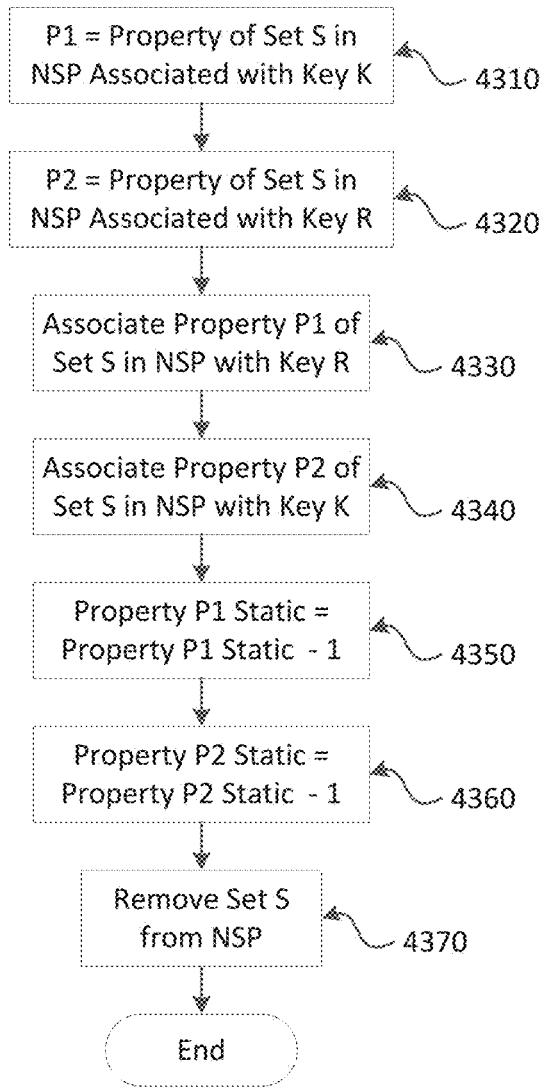
FIG. 43 illustrates a high-level logical process flow diagram example of a routine to swap key properties to be executed as a subroutine in conjunction with the property dispersion algorithm depicted in FIG. 36a and FIG. 36b.

This process continues in FIG. 36b where, if the number of keys in the variable list Shuffle is not equal to zero 3636, then variable R is set to a key which is randomly selected from the variable list Shuffle 3638, properties of keys stored in variable R and K are swapped 3640 as depicted in the Swap Keys process in FIG. 43, and the key assigned to variable R is removed from the variable list Selected 3642; otherwise, if the number of keys in the variable list Shuffle is equal to zero 3636, then, if variable Loop is not equal to TRUE 3644, and the number of property sets in list variable NSP is not equal to variable S or variable K is not less than the number of keys in list variable Keys minus one 3650, then variable SetSkip is set to the Boolean value TRUE 3654. If the variable SetSkip is equal to FALSE and variable Skip is equal to TRUE 3656, execution returns to the ninth step in the process in which the variable Skip is set to FALSE 3618 and continues from there. If, however, the value of variable Loop is TRUE 3644, then variable R is set to a key which is randomly selected from the variable list Alternate 3646 and properties of keys stored in variable R and K are swapped 3648 as depicted in the Swap Keys process in FIG. 43, or, if variable Loop is not equal to TRUE 3644, but variable S is equal to the number of property sets in list variable NSP and variable K is less than the number of keys in list variable Keys minus one 3650, then variable Loop is set to the Boolean value TRUE 3652. At this point execution also returns to the ninth step in the process in which the variable Skip is set to FALSE 3618 and continues from there. If the variable SetSkip is not equal to FALSE or the variable Skip is not equal to TRUE 3656 the variable Skip is set to the value of variable SetSkip 3658 and the variable S is incremented by one 3660. If the number of property sets in the list variable NSP is greater than zero 3662, then execution returns to the eleventh step 3622 in the process, in which the variable K is compared to the value of one and the variable Skip is compared to the Boolean value of FALSE and continues from there; otherwise, if the number of property sets in the list variable NSP is not greater than zero 3662, the variable K is incremented by one 3664. Then, if the variable K is not equal to the number of keys in the list variable Keys 3666, the key assigned to variable K is removed from the list variable Selected 3668 and execution returns to the sixth step in the process in which the variable NSP is set to a list of property sets 3612 using the Get Key Non-Static Properties process depicted in FIG. 38 and continues from there; otherwise, the process is complete and ends.

The process to Initialize Property Static Values, which is referenced by the Property Dispersion process diagram shown in FIGS. 36a-36b, is depicted in FIG. 37. Variable Odd is assigned a Boolean value of TRUE if the number of keys in list variable Keys is odd, and FALSE if the number of keys in the list variable Keys is even 3705. The list variable Selected is then assigned values equivalent to the list variable Keys 3710 and the variable P is set to the value of one 3715 as well as variable K 3720, after which the value of one is assigned to the Static value of the property at the position equal to variable P in the list of properties belonging to the key at the position equal to variable K in the list variable Keys 3725, and the variable K is incremented by one 3730. If the variable K is not greater than the number of keys in the list variable Keys 3735, then execution returns to the fifth step in the process in which the value of one is assigned to the Static value of the property at the position equal to variable P in the list of properties belonging to the key at the position equal to variable K in the list variable Keys 3725 and continues from there; otherwise, if the variable K is greater than the number of keys in the list variable Keys 3735, then, if the variable Odd is TRUE 3740, variable R is set to a key which is randomly selected from the variable list Selected 3745, the value of zero is assigned to the Static value of the property at the position equal to variable P in the list of properties belonging to the key equal to variable R 3750, and the key is removed from the list variable Selected that is equal to the key at the position equal to variable K in the list variable Keys 3755. The variable P is then incremented by one 3760. If the variable P is not greater than the number of property sets used by the keys within the interface 3765, then execution returns to the fourth step in the process in which the variable K is assigned a value of one 3720 and continues from there; otherwise, if the variable P is greater than the number of property sets used by the keys within the interface 3765, the process is completed and returns to the referencing process.

Figure 38:
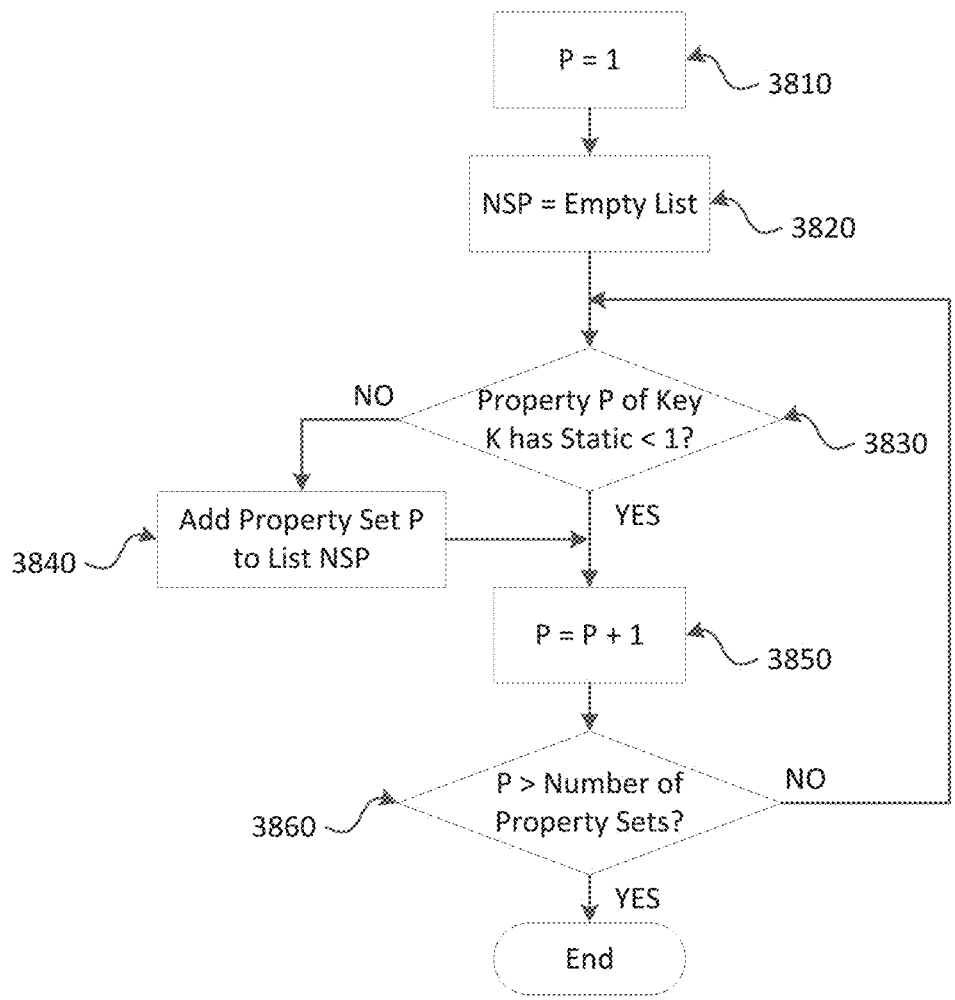
FIG. 38 illustrates a high-level logical process flow diagram example of a routine to get key non-static properties to be executed as a subroutine in conjunction with the property dispersion algorithm depicted in FIG. 36a and FIG. 36b.
Figure 39:
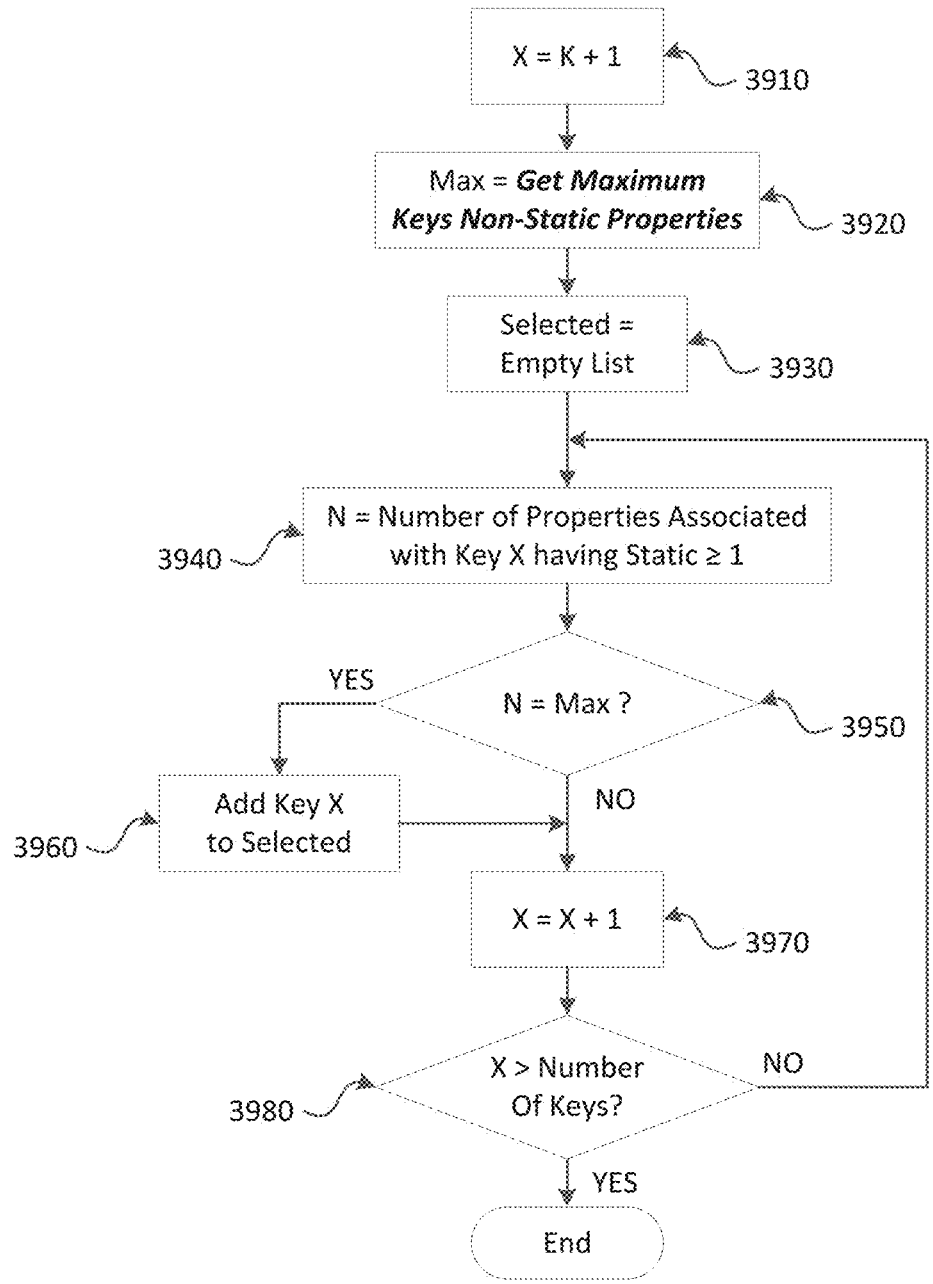
FIG. 39 illustrates a high-level logical process flow diagram example of a routine to get selected keys to be executed as a subroutine in conjunction with the property dispersion algorithm depicted in FIG. 36a and FIG. 36b.

The process to Get Key Non-Static Properties, which is referenced by the Property Dispersion process diagram shown in FIGS. 36a-36b, is depicted in FIG. 38. A value of one is assigned to the variable P 3810 and the variable list NSP is set to an empty list 3820. If the Static value of the property at the position equal to variable P in the list of properties belonging to the key at the position equal to variable K in the list variable Keys is not less than one 3830, then the property set, to which the property at the position equal to variable P in the list of properties belonging to the key at the position equal to variable K in the list variable Keys belongs, is added to the variable list NSP 3840. The variable P is then incremented by one 3850. If the variable P is not greater than the number of property sets used by the keys within the interface 3860, then execution returns to the third step in the process in which the Static value of the property at the position equal to variable P in the list of properties belonging to the key at the position equal to variable K in the list variable Keys is compared to the value of one 3830 and continues from there; otherwise, if the variable P is greater than the number of property sets used by the keys within the interface 3860, the process is completed and returns to the referencing process.

Figure 42:
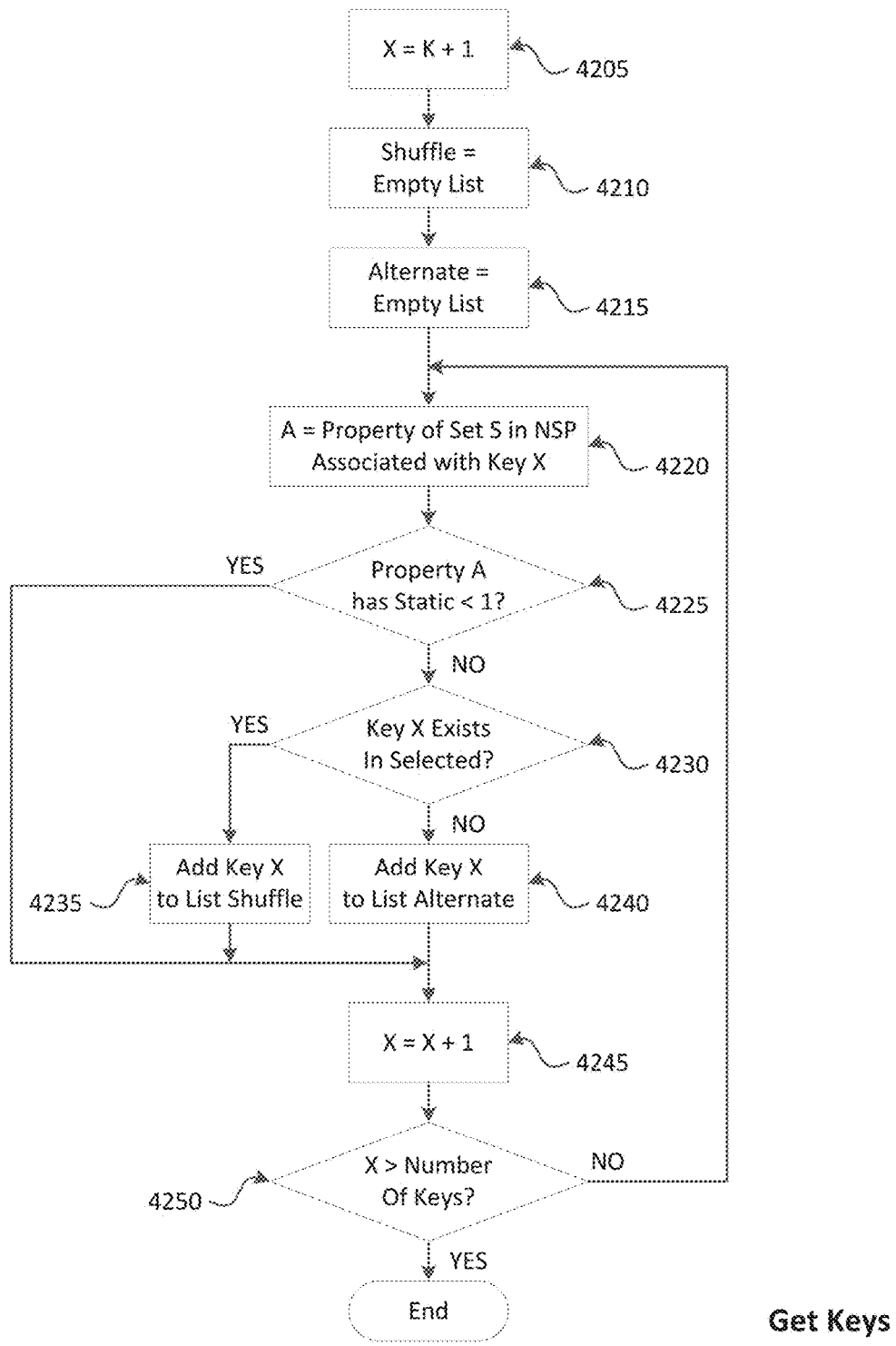
FIG. 42 illustrates a high-level logical process flow diagram example of a routine to get keys to be executed as a subroutine in conjunction with the property dispersion algorithm depicted in FIG. 36a and FIG. 36b.

The process to Get Selected Keys, which is referenced by the Property Dispersion process diagram shown in FIGS. 36a-36b, is depicted in FIG. 39. The value of variable K+1 is assigned to variable X 3910 and the variable Max is set to a value 3920 which is calculated through the Get Maximum Key Non-Static Properties process as shown in FIG. 42. Then, the variable list Selected is set to an empty list 3930 and a value equal to the number of properties associated with the key at the position equal to variable X in the list variable Keys having a static value which is greater than or equal to one is assigned to variable N 3940. If the variable N is equal to the variable Max 3950, then the key at the position equal to variable X in the list variable Keys is added to the list variable Selected 3960. The variable X is then incremented by one 3970. If the variable X is not greater than the number of keys in the list variable Keys 3980, then execution returns to the fourth step in the process in which a value equal to the number of properties associated with the key at the position equal to variable X in the list variable Keys having a static value which is greater than or equal to one is assigned to variable N 3940 and continues from there; otherwise, if the variable X is greater than the number of keys in the list variable Keys 3980, the process is completed and returns to the referencing process.

Figure 40:
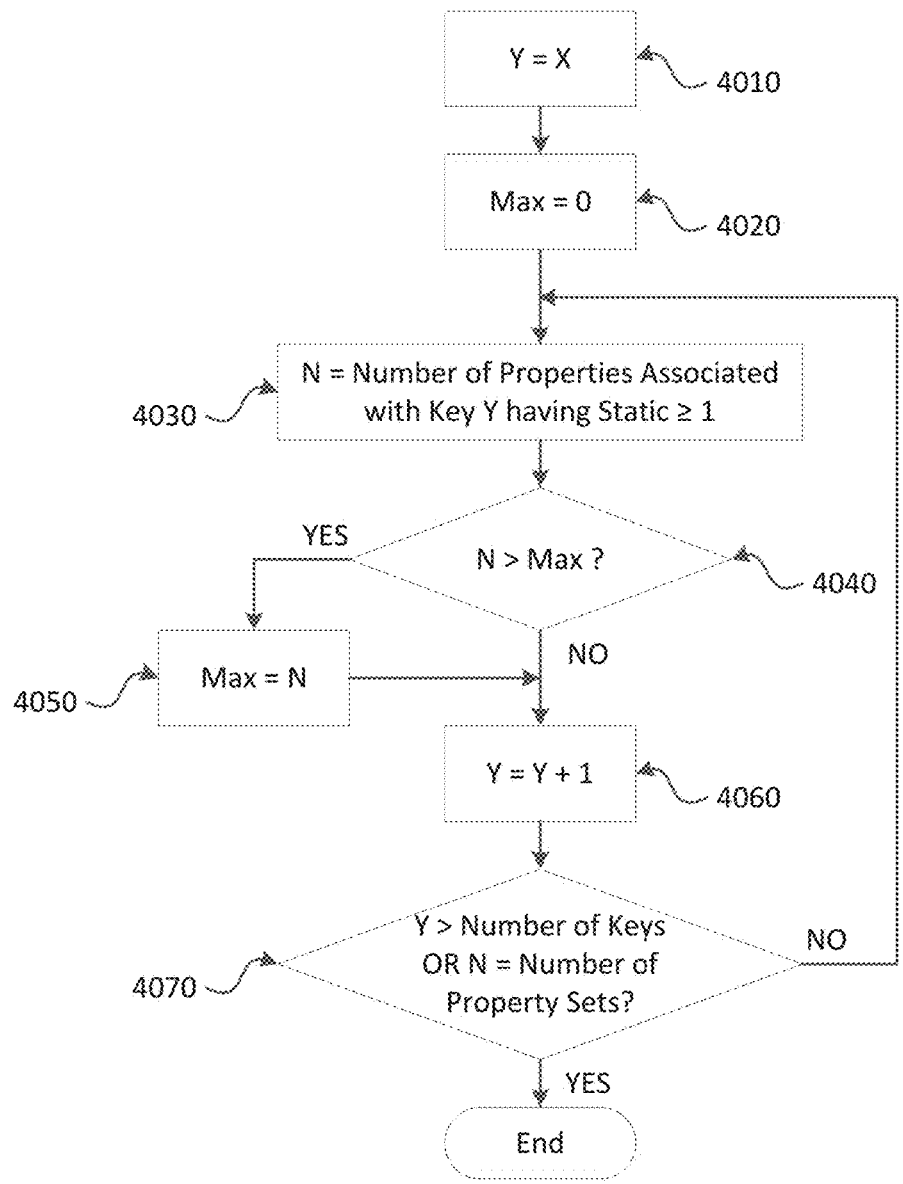
FIG. 40 illustrates a high-level logical process flow diagram example of a routine to get key maximum non-static properties to be executed as a subroutine in conjunction with the property dispersion algorithm depicted in FIG. 36a and FIG. 36b and the get selected keys routine depicted in FIG. 39.

The process to Get Maximum Key Non-Static Properties, which is referenced by the Get Selected Keys process diagram shown in FIG. 39, is depicted in FIG. 40. The variable Y is set to equal the value of variable X 4010 and a value of zero is assigned to the variable Max 4020, then a value equal to the number of properties associated with the key at the position equal to variable Y in the list variable Keys having a static value which is greater than or equal to one is assigned to variable N 4030. If the variable N is greater than the variable Max 4040, then the variable Max is set to the value of variable N 4050. The variable Y is then incremented by one 4060. If the variable Y is not greater than the number of keys in the list variable Keys, and the variable N is not equal to the number of property sets used by the keys within the interface 4070, then execution returns to the third step in the process in which a value equal to the number of properties associated with the key at the position equal to variable Y in the list variable Keys having a static value which is greater than or equal to one is assigned to variable N 4030 and continues from there; otherwise, if the variable Y is greater than the number of keys in the list variable Keys, or the variable N is equal to the number of property sets used by the keys within the interface 4070, the process is completed and returns to the referencing process.

Figure 41:
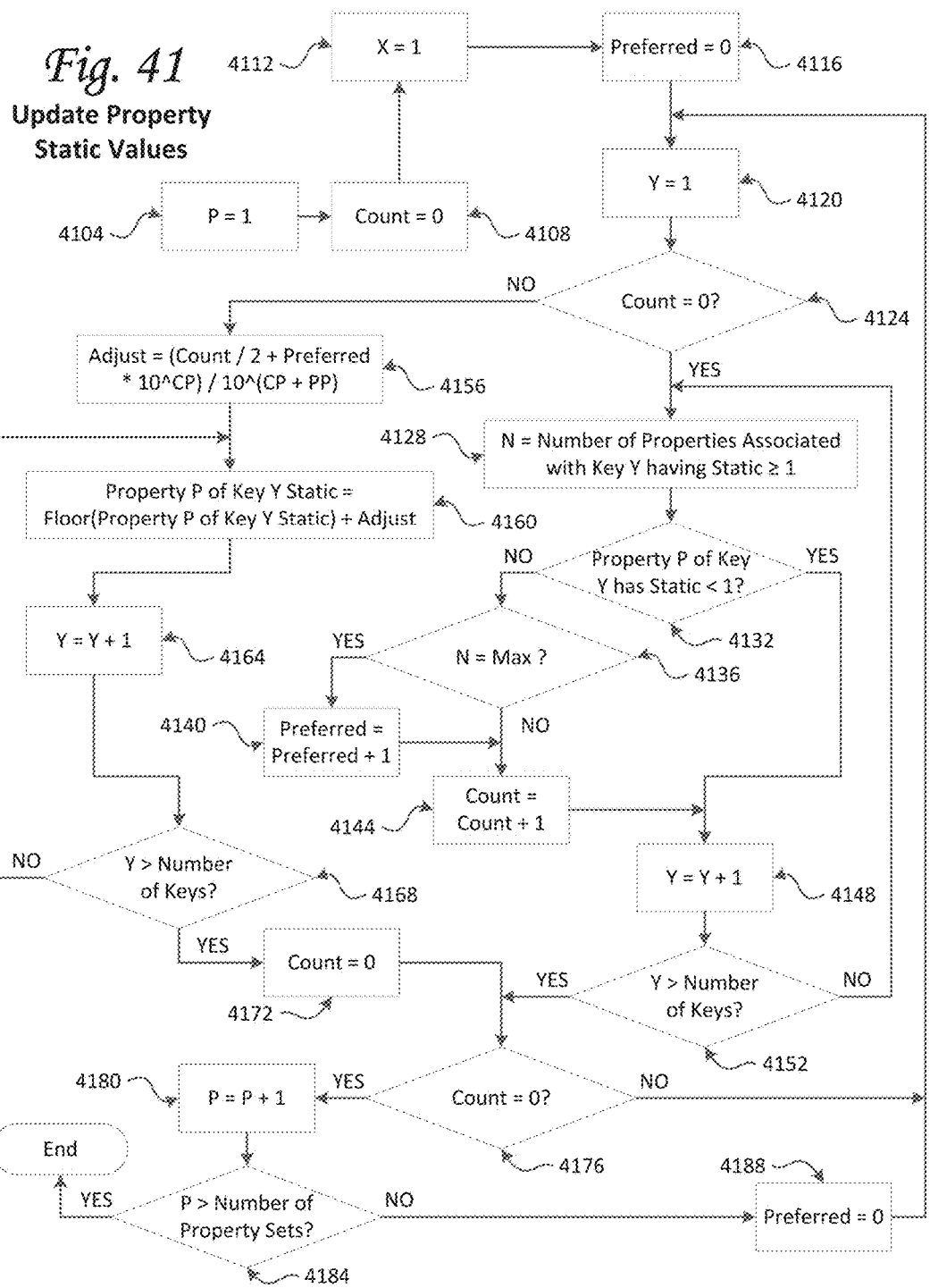
FIG. 41 illustrates a high-level logical process flow diagram example of a routine to update property static values to be executed as a subroutine in conjunction with the property dispersion algorithm depicted in FIG. 36a and FIG. 36b.

The process to Update Property Static Values, which is referenced by the Property Dispersion process diagram shown in FIGS. 36a-36b, is depicted in FIG. 41. A value of one is assigned to the variables P 4104 and X 4112, a Boolean value of TRUE is assigned to variables Count 4108 and Preferred 4116, and a value of one is assigned to variable Y 4120. If variable Count is equal to zero 4124, then a value equal to the number of properties associated with the key at the position equal to variable Y in the list variable Keys having a static value which is greater than or equal to one is assigned to variable N 4128, if the Static value of the property at the position equal to variable P in the list of properties belonging to the key at the position equal to variable Y in the list variable Keys is not less than one 4132, then if the variable N is equal to the variable Max 4136, then the variable Preferred is incremented by one 4140; irregardless of whether the value of N is equal to the variable Max, the variable Count is incremented by one 4144, and regardless of whether or not the Static value of the property at the position equal to variable P in the list of properties belonging to the key at the position equal to variable Y in the list variable Keys is less than one 4132, the variable Y is incremented by one 4148, and if the value of variable Y is not greater than the number of keys in the list variable Keys 4152, then execution returns to the seventh step in the process in which a value equal to the number of properties associated with the key at the position equal to variable Y in the list variable Keys having a static value which is greater than or equal to one is assigned to variable N 4128, and continues from there; otherwise if the value of Count is not equal to zero 4124, then the variable Adjust is assigned a value equal to (Count/2+Preferred*$10^{CP}$)/$10^{(CP+PP)}$ 4156, the Static value of the property at the position equal to variable P in the list of properties belonging to the key at the position equal to variable Y in the list variable Keys is assigned a value equal to Floor(the Static value of the property at the position equal to variable P in the list of properties belonging to the key at the position equal to variable Y in the list variable Keys)+Adjust 4160, the variable Y is incremented by one 4164, if the value of variable Y is not greater than the number of keys in the list variable Keys 4168, then execution returns to the eighth step in the process where the Static value of the property at the position equal to variable P in the list of properties belonging to the key at the position equal to variable Y in the list variable Keys is assigned a value equal to Floor(the Static value of the property at the position equal to variable P in the list of properties belonging to the key at the position equal to variable Y in the list variable Keys)+Adjust 4160 and continues from there; otherwise if the value of variable Y is greater than the number of keys in the list variable Keys 4168, then a value of zero is assigned to the variable Count 4172. In either case, whether or not the initial value of the variable Count is equal to zero 4124, if the value of variable Y is greater than the number of keys in the list variable Keys 4152, 4168, then if, at that point in the process, the value of variable Count is not equal to zero 4176, then execution returns to the fifth step in the process in which the variable Y is assigned a value of one 4120 and continues from there; otherwise if the value of variable count is equal to zero 4176, the value of variable P is incremented by one 4180, and if the variable N is not greater than the number of property sets used by the keys within the interface 4084, the variable Preferred is assigned value of zero 4188, and execution also returns to the fifth step in the process in which the variable Y is assigned a value of one 4120 and continues from there; otherwise if the variable N is greater than the number of property sets used by the keys within the interface 4084, the process is completed and returns to the referencing process.

The process to Get Keys, which is referenced by the Property Dispersion process diagram shown in FIGS. 36a-36b, is depicted in FIG. 42. A value equal to the value variable K+1 is assigned to variable X 4205, the list variables Shuffle and Alternate are assigned empty list values 4210, 4215, and the variable A is assigned the property belonging to the property set assigned to variable S within the list variable NSP which is associated with the key at the position equal to variable X in the list variable Keys 4220. If the Static value of the property assigned to the variable A is not greater than one 4225, then if the key at the position equal to variable X in the list variable Keys exists within the list variable Selected 4230, the key at the position equal to variable X in the list variable Keys is added to the list variable Shuffle 4235; otherwise, if the key at the position equal to variable X in the list variable Keys does not exist within the list variable Selected 4230, the key at the position equal to variable X in the list variable Keys is added to the list variable Alternate 4240, and regardless of whether or not the Static value of the property assigned to the variable A is greater than one 4225, the variable X is incremented by one 4245. If the value of variable X is not greater than the number of keys in the list variable Keys 4250, execution returns to the fourth step in the process in which the variable A is assigned the property belonging to the property set assigned to variable S within the list variable NSP which is associated with the key at the position equal to variable X in the list variable Keys 4120 and continues from there; otherwise if the value of variable X is greater than the number of keys in the list variable Keys 4250, the process is completed and returns to the referencing process.

The process to Swap Key Properties, which is referenced by the Property Dispersion process diagram shown in FIGS. 36a-36b, is depicted in FIG. 43. The property belonging to the property set assigned to variable S within the list variable NSP which is associated with the key at the position equal to variable K in the list variable Keys is assigned to variable P1 4310, and the property belonging to the property set assigned to variable S within the list variable NSP which is associated with the key at the position equal to variable R in the list variable Keys is assigned to variable P2 4320. Next, the property assigned to variable P1 is associated to the key at the position equal to variable R in the list variable Keys 4330, and the property assigned to variable P2 is associated to the key at the position equal to variable K in the list variable Keys 4340. Then, the Static values of the properties assigned to the variables P1 and P2 are assigned a value of negative one 4350, 4360. Finally, the property set assigned to variable S is removed from the list property NSP 4370. The process is completed and returns to the referencing process.

Several methods are possible for passcode validation. The system can iterate through each of the properties associated with each of the selected virtual keys in sequence, comparing the interpretation value of each property at each position in the entered passcode with the interpretation value of the property at the same position in the stored passcode. A match for all positions will indicate a valid passcode.

Password encryption can be implemented by identifying all possible passcode combinations based on the properties of each virtual key selected for each position in the entered passcode. Each of these combinations could then be encrypted and compared to the encrypted value of the stored passcode, which was previously encrypted at the time it was created. A successful match for any of the combinations indicates a valid passcode.

Figure 3A:
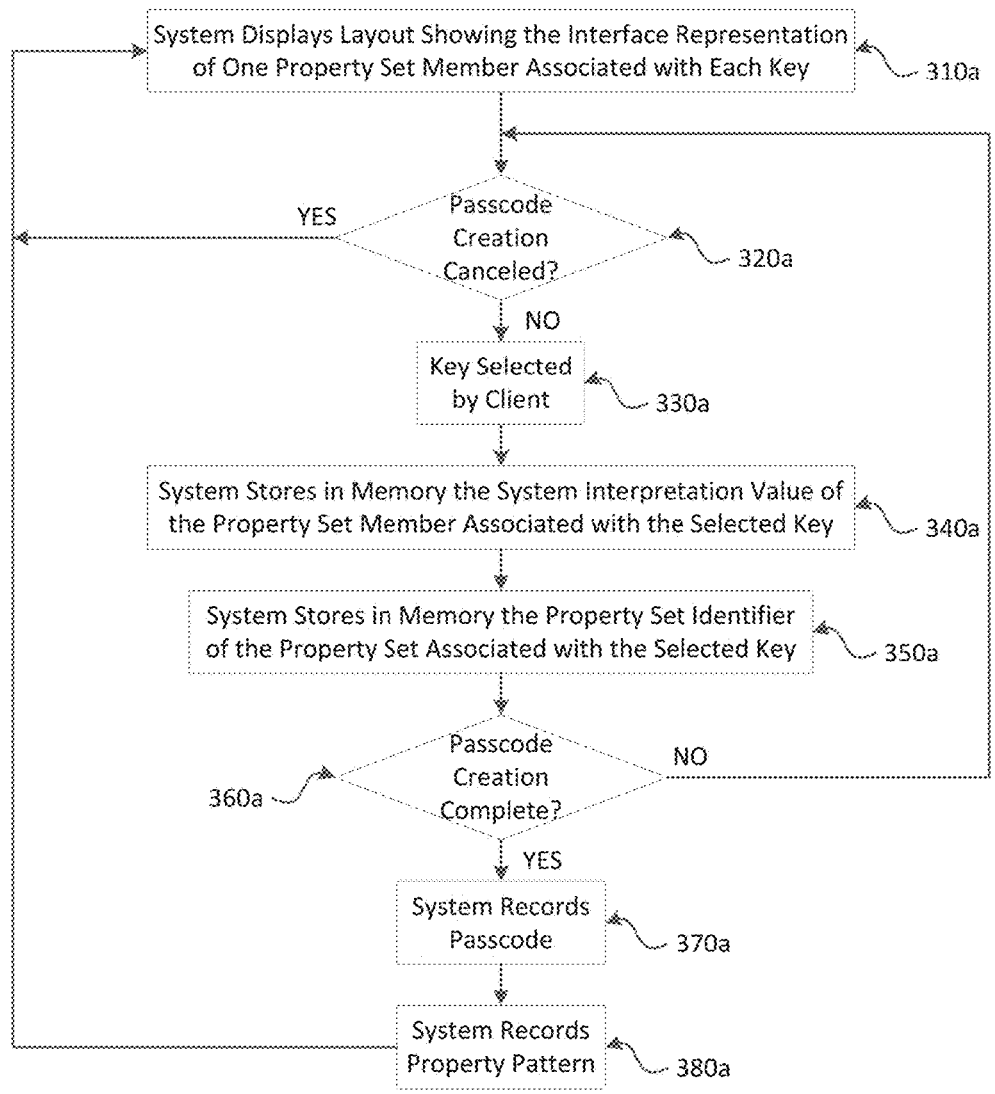
FIG. 3a illustrates an alternative high-level logical process flow diagram for the creation of a passcode and associated property pattern accompanying the use of a key arrangement similar to the one shown in FIG. 2.

The passcode validation process can be augmented by adding the use of a property pattern. FIG. 3a describes a passcode creation process embodiment which captures the property pattern in addition to the passcode. The system either manifests the interface 310a or the interface is built as a physical component of a device to be used for passcode creation. At any point during passcode creation, a user can choose to cancel the process 320a, thereby clearing any previously selected properties and beginning the process anew. Upon the selection of one of the keys 330a the system records the interpretation value of the property 340a as well as the property set identifier 350a associated with the selected key for the present position in the passcode. This process is repeated until passcode creation is complete 360a, at which time the system saves the interpretation values as a valid passcode for future use during passcode entry 370a. The system also stores the property set identifier from which each property is chosen during passcode creation as the property pattern 380a.

For example, referencing FIG. 2, a row of keys is utilized for each property set; the top row being the shape 215 property set; the second row being the number 220 property set; the property set of Latin characters A through H 225 in the third row; the property set of Latin characters I through Q 230 in the fourth row; row five being the property set of Latin characters R through Z 235; and the property set of colors 240 (represented as patterns) in the last row. During passcode creation, if a number is chosen from the second row, an identifier representing the number property set is stored in the property pattern for the current position in the passcode. This is performed for each property selected, and once passcode creation is complete, each position of the passcode will be identified by a property set identifier.

Figure 5A:
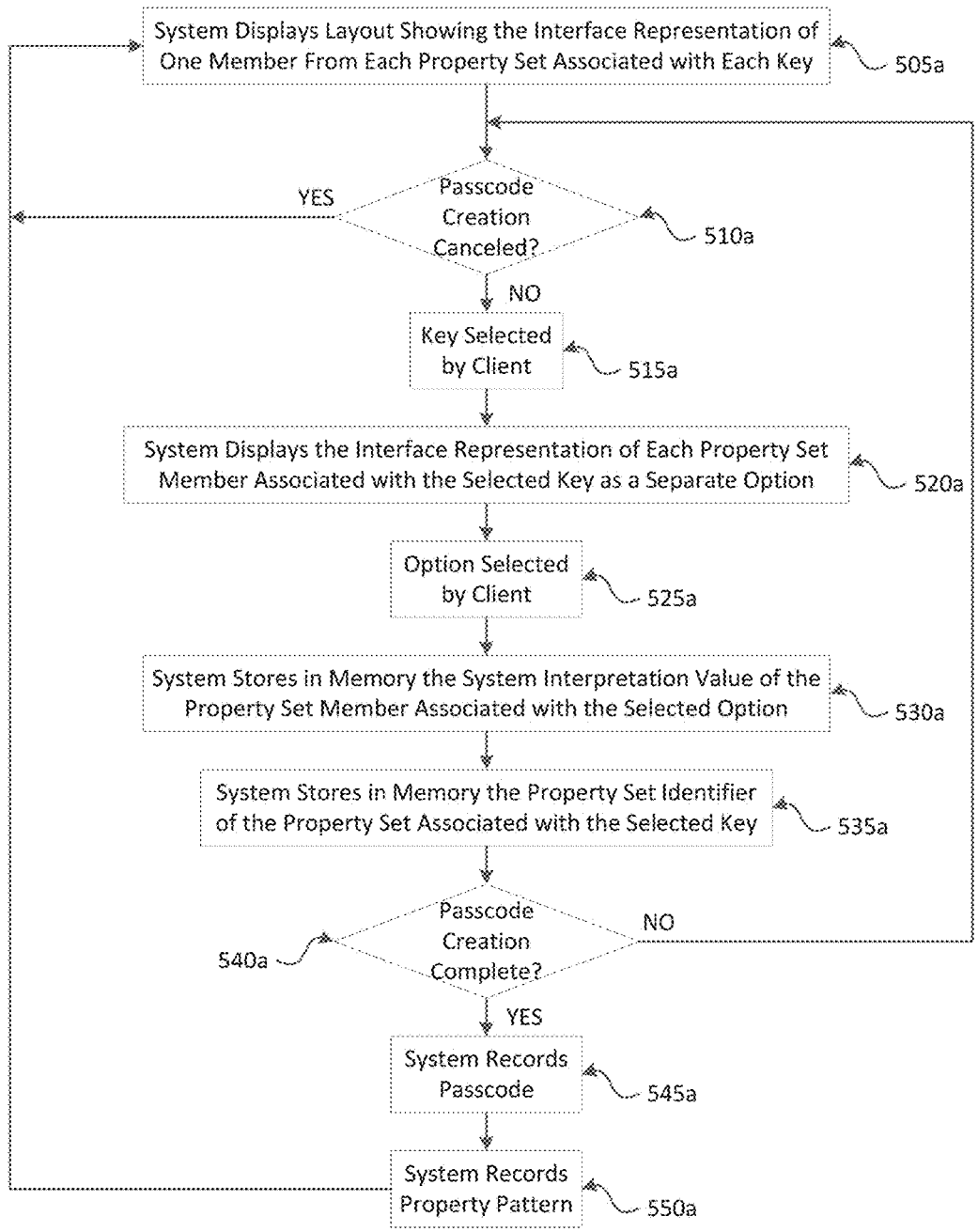
FIG. 5a illustrates an alternative high-level logical process flow diagram for the creation of a passcode and associated property pattern accompanying the use of a key arrangement similar to the one shown in FIG. 4.

FIG. 5a depicts a passcode creation process embodiment which captures the property pattern in addition to the passcode during passcode creation using virtual keys with multiple property associations. The system either manifests the interface 505a or the interface is built as a physical component of a device to be used for passcode creation. At any point during passcode creation, a user can choose to cancel the process 510a, thereby clearing any previously selected properties and beginning the process anew. Upon the selection of one of the keys 515a the system manifests a virtual key for each of the properties associated with the selected key 520a. When one of the newly manifested virtual keys is selected 525a the system records the interpretation value 530a as well as the property set identifier 535a associated with the selected key for the present position in the passcode. This process is repeated until passcode creation is complete 540*a*, at which time the system saves the interpretation values as a valid passcode for future use during passcode entry 545*a*. The system also stores the property set identifier from which each property is chosen during passcode creation as the property pattern 550*a*.

In the above example using FIG. 4 as a passcode creation interface, each of the virtual keys manifested along the right 450, upon the selection of one of the initial virtual keys 410, represents the property from each of the property sets used during passcode creation. When one of the property specific virtual keys 450 is selected, the property set identifier for the property set to which the property belongs is stored in the property pattern for the current position in the passcode. This is performed for each property selected. Once passcode creation is complete, each position of the passcode can be identified by a property set identifier.

Figure 6A:
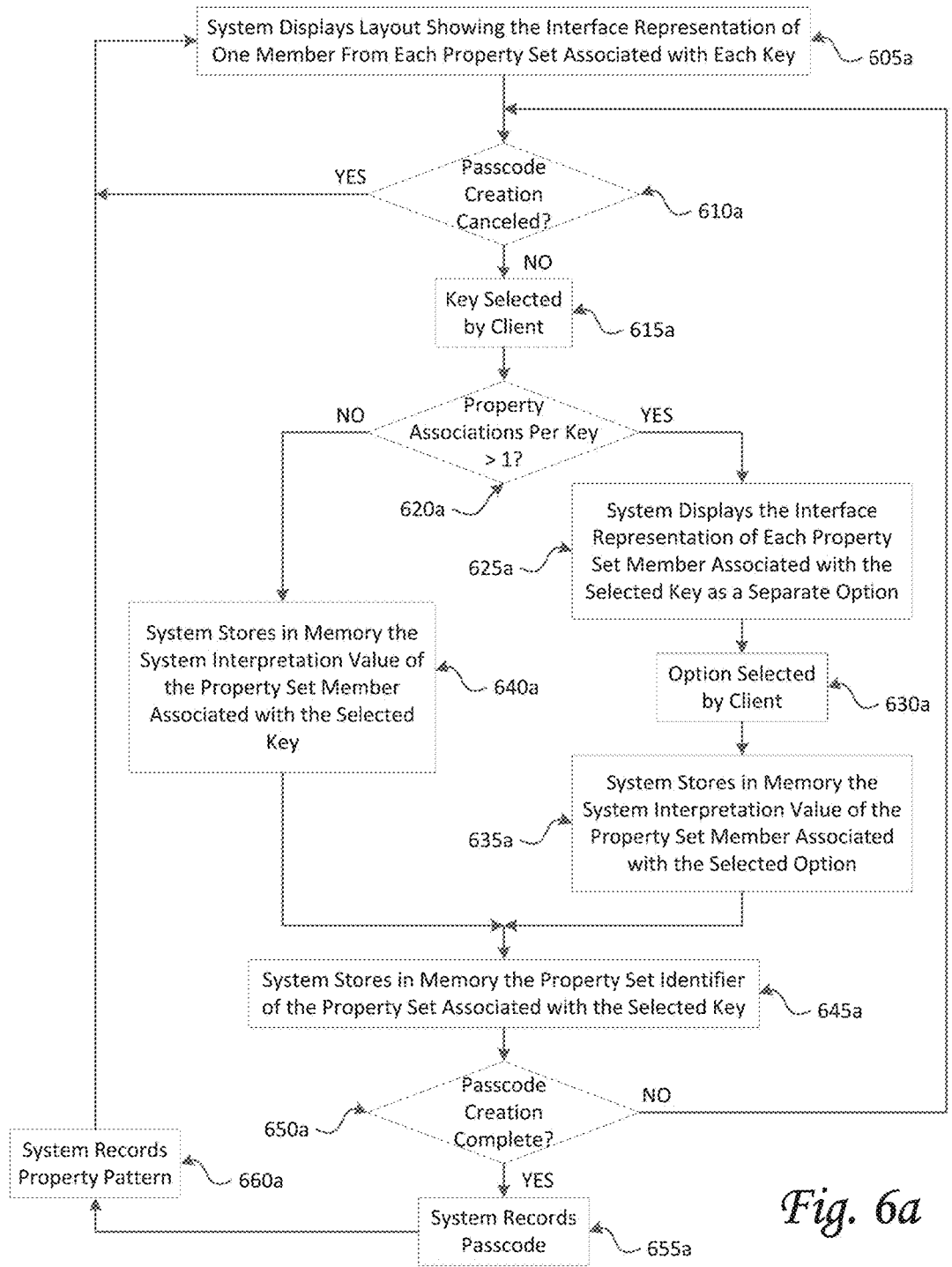
FIG. 6a illustrates an alternative high-level logical process flow diagram for the creation of a passcode and associated property pattern which accommodates the use of key arrangements similar to those shown in both FIG. 2 and FIG. 4.

The process shown in FIG. 6*a* describes a scenario in which the processes described in FIG. 3*a* and FIG. 5*a* can be combined to accommodate passcode creation regardless of the number of properties associated with each virtual key. The system either manifests the interface 605*a* or the interface is built as a physical component of a device to be used for passcode creation. At any point during passcode creation, a user can choose to cancel the process 610*a*, thereby clearing any previously selected properties and beginning the process anew. Upon the selection of one of the keys 615*a* the system checks the number of properties associated with the selected virtual key 620*a*. If the virtual key is associated with multiple properties, the system manifests a virtual key for each of the properties associated with the selected key 625*a*; then when one of the newly manifested virtual keys is selected 630*a* the system records the interpretation value of the property associated with the selected key 635*a* for the present position in the passcode. If the originally selected virtual key is associated with a single property, the system records the interpretation value 640*a*. After the interpretation value is recorded, the property set identifier 645*a* associated with the selected key is also recorded for the present position in the passcode. This process is repeated until passcode creation is complete 650*a*, at which time the system saves the interpretation values as a valid passcode for future use during passcode entry 655*a*. The system also stores the property set identifier from which each property is chosen during passcode creation as the property pattern 660*a*.

Figure 8A:
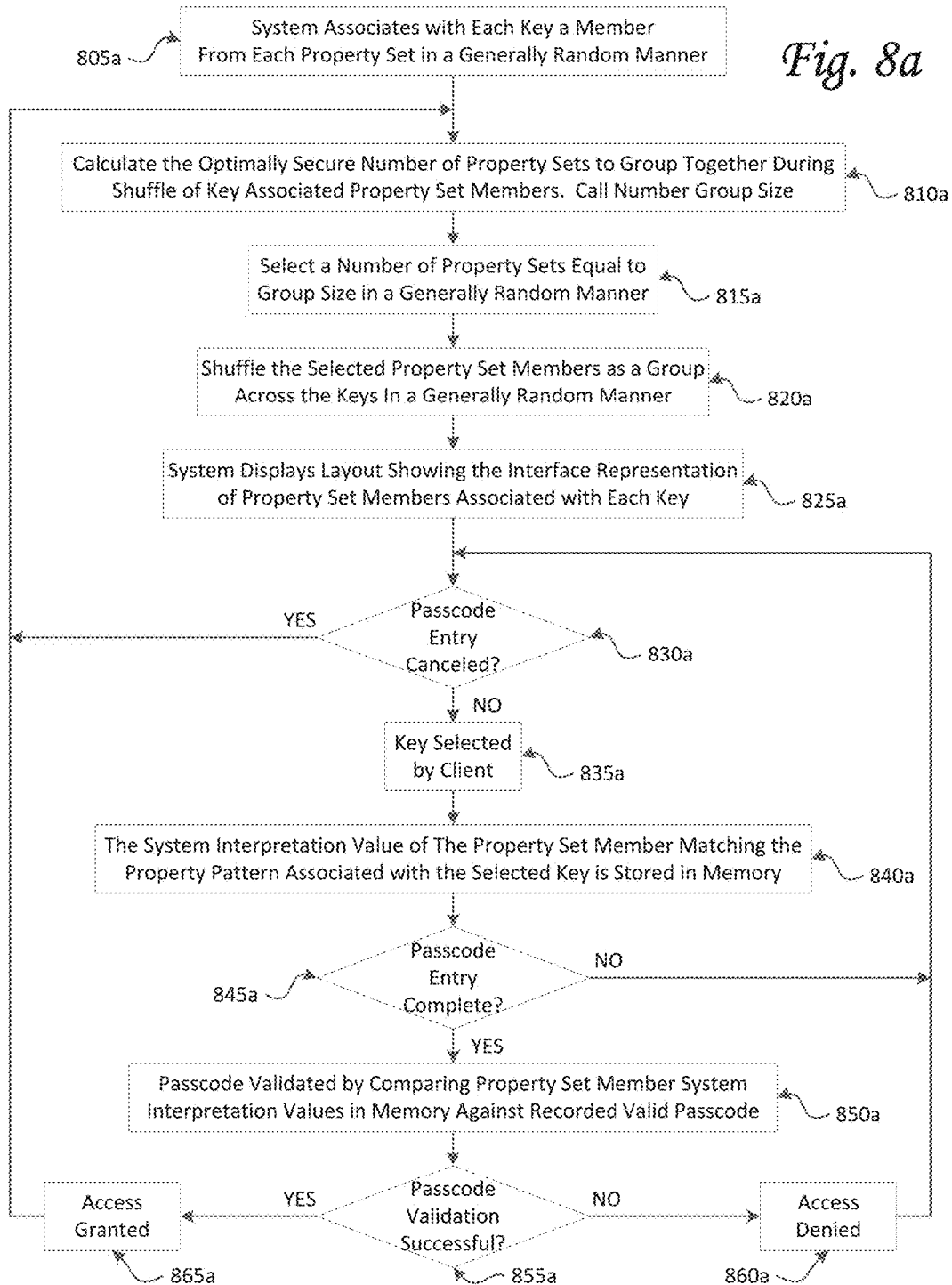
FIG. 8a illustrates an alternative high-level logical process flow diagram to that shown in FIG. 8, showing the entry and verification of a passcode for an embodiment allowing a device utilized for passcode entry to have foreknowledge of a property pattern associated with a valid passcode.

FIG. 8*a* is an example of a process by which passcode entry could utilize a property pattern. The system associates a member from each property set with each virtual key in a generally random manner 805*a* for which an example is depicted in FIG. 32. Next, an optimally secure number of property sets to group together is calculated based on the number of property sets utilized 810*a* for which an example is depicted in FIG. 35. Then, a number of property sets equal to the previously calculated value are selected in a generally random manner 815*a* for which an example is depicted in FIG. 33. The properties within the selected property sets are then re-associated collectively as a group across the plurality of virtual keys in a generally random manner 820*a* for which an example is depicted in FIG. 34. The updated interface is then manifested by the device 825*a* and is ready for passcode entry.

At any point during passcode entry, a user can choose to cancel the process 830*a*, thereby clearing any previously selected properties and beginning the process anew. Upon the selection of one of the virtual keys by a user 835*a*, it is not obvious to an observer which of the properties is being chosen, as it may be any one of the plurality of properties associated with the selected virtual key. At this time, the system records the interpretation value of the property associated with the selected virtual key matching the property set of the stored property pattern 840*a* for the present position in the passcode. This process is repeated until passcode entry is complete 845*a*, at which time the system performs a comparison between a valid passcode which was previously created and the passcode provided by the user 850*a*. If the entered passcode does not match the valid passcode 855*a*, access to the system is denied 860*a*. If the comparison is equal 855*a*, any access which the system is designed to grant is provided to the user 865*a*.

An embodiment in which the system providing the passcode entry interface is separate from the system managing and validating passcodes can use a process similar to that shown in FIG. 8*b*. The system starts by associating a member from each property set with each virtual key in a generally random manner 805*b* for which an example is depicted in FIG. 32. Next, an optimally secure number of property sets to group together is calculated based on the number of property sets utilized 810*b* for which an example is depicted in FIG. 35. Then, a number of property sets equal to the previously calculated value are selected in a generally random manner 815*b* for which an example is depicted in FIG. 33. The properties within the selected property sets are then re-associated collectively as a group across the plurality of virtual keys in a generally random manner 820*b* for which an example is depicted in FIG. 34. The updated interface is then manifested by the device 825*b* and is ready for passcode entry.

At any point during passcode entry, a user can choose to cancel the process 830*b*, thereby clearing any previously selected properties and beginning the process anew. Upon the selection of one of the virtual keys by a user 835*b*, it is not obvious to an observer which of the properties is being chosen, as it may be any one of the plurality of properties associated with the selected virtual key. At this time, the system records all of the properties associated with the selected virtual key 840*b* for the present position in the passcode. This process is repeated until passcode entry is complete 845*b*, at which time the passcode entry system contacts the passcode validation system and shares the entered passcode information. The passcode validation system then compares the property set identifier for each property selected at each position in the passcode to the property set identifier stored in the passcode pattern for the matching position, eliminating all failed matches. This elimination leaves a single value for each position, which is then compared to the valid passcode which was previously created 850*b*. If the entered passcode does not match the valid passcode 855*b*, access to the system is denied 860*b*. If the comparison is equal 855*b*, any access which the system is designed to grant is provided to the user 865*b*.

Stored passcode encryption can benefit greatly from the use of property patterns. In such cases, the interpretation values of the selected properties to use in validation can be determined by eliminating the properties for each position in the passcode which do not belong to the property set specified in the property pattern stored for the same position, leaving only a single interpretation value for each position. The resulting values would then be encrypted and compared to the previously encrypted stored passcode for validation.

Embodiments may exist in which a single passcode is used to provide access to information and/or functionality within a system or to control physical access to an area of a facility. Alternative embodiments may be implemented in which passcodes are specific to individuals or groups of individuals, requiring users to first identify themselves to the system before or during passcode entry. Further embodiments may be created in which individuals, groups, and/or points of access may utilize different property sets or interfaces through which passcodes are entered.

Figure 12:
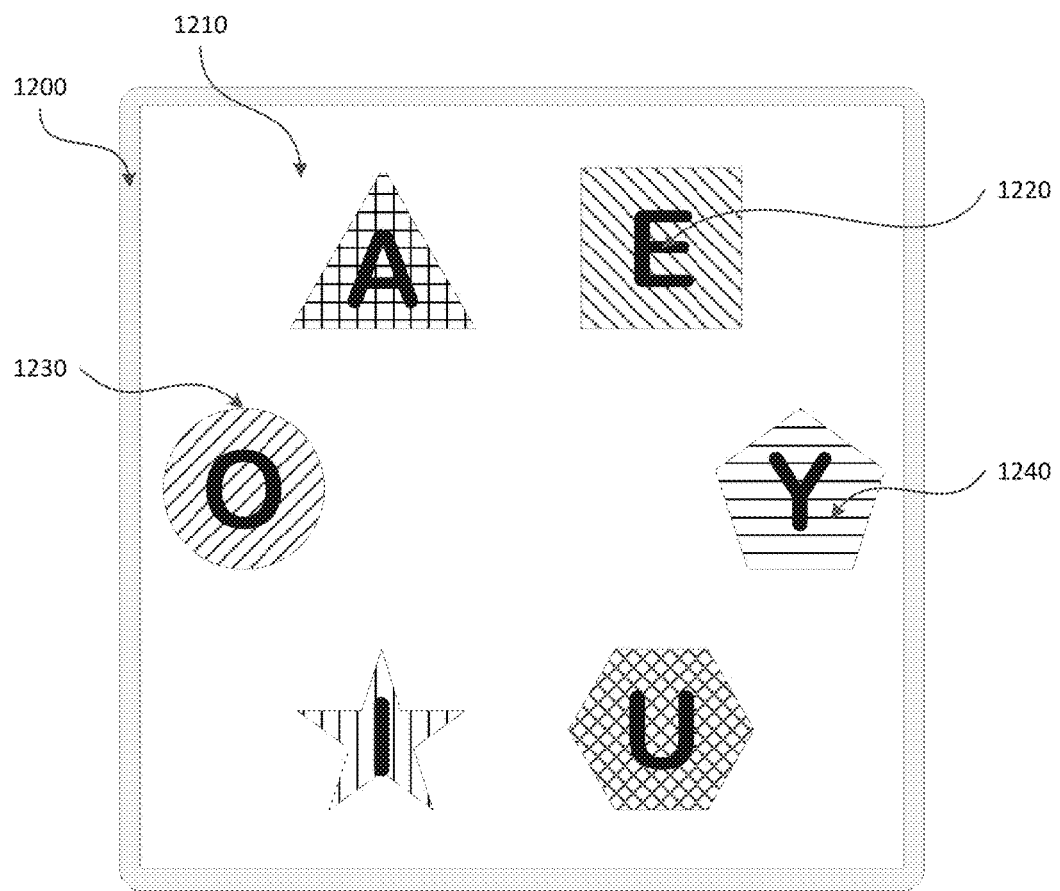
FIG. 12 illustrates a fourth alternative example of a virtual key arrangement utilizing property sets for use during the process of passcode entry and verification having the shape of the virtual keys being a property set.
Figure 13:
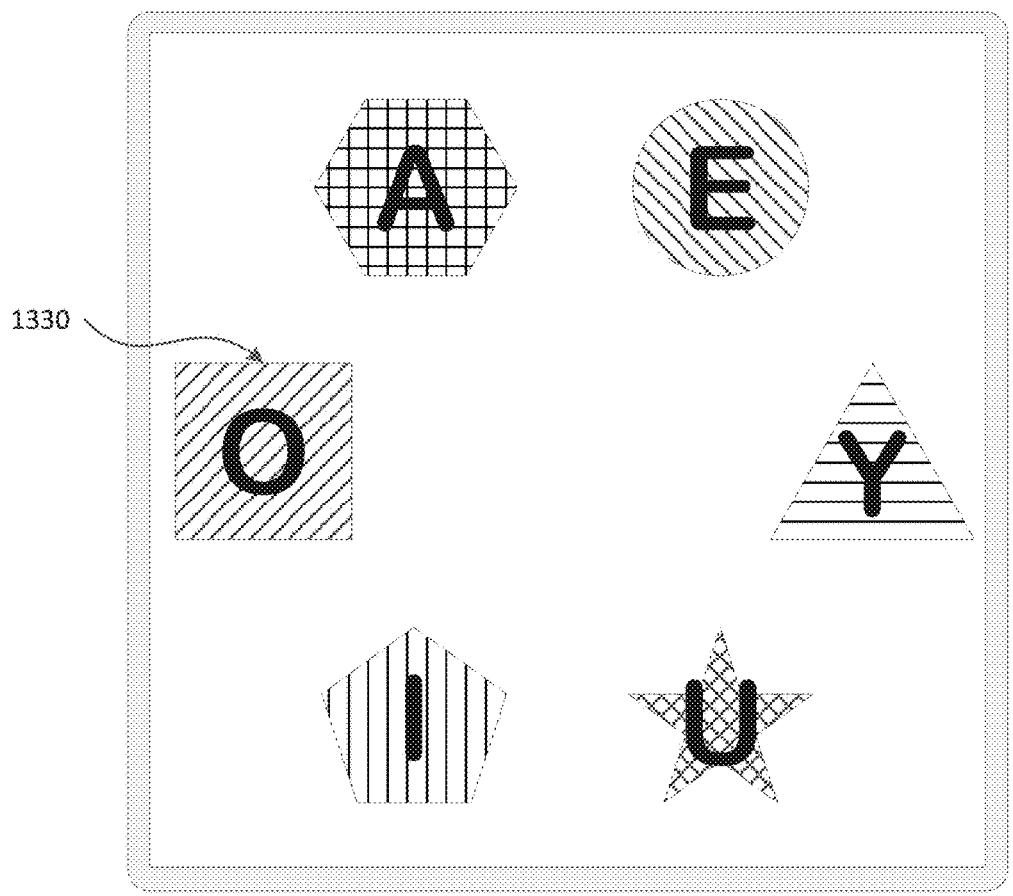
FIG. 13 illustrates a fifth alternative example of a virtual key arrangement following a re-association of the properties to the virtual keys shown in FIG. 12, utilizing property sets for use during the process of passcode entry.

FIG. 12 depicts an embodiment in which six virtual keys are utilized with three property sets on a device 1200 having a graphical touch sensitive display 1210. The property sets in this example are: Latin characters used in the English language as vowels 1220, color 1240 (or pattern), and shape 1230. In this embodiment, the interface representation of the shape property is manifested as the shape of the virtual key itself. An example of the resulting interface after having been shuffled (shape 1330 property) is shown in FIG. 13.

Figure 14:
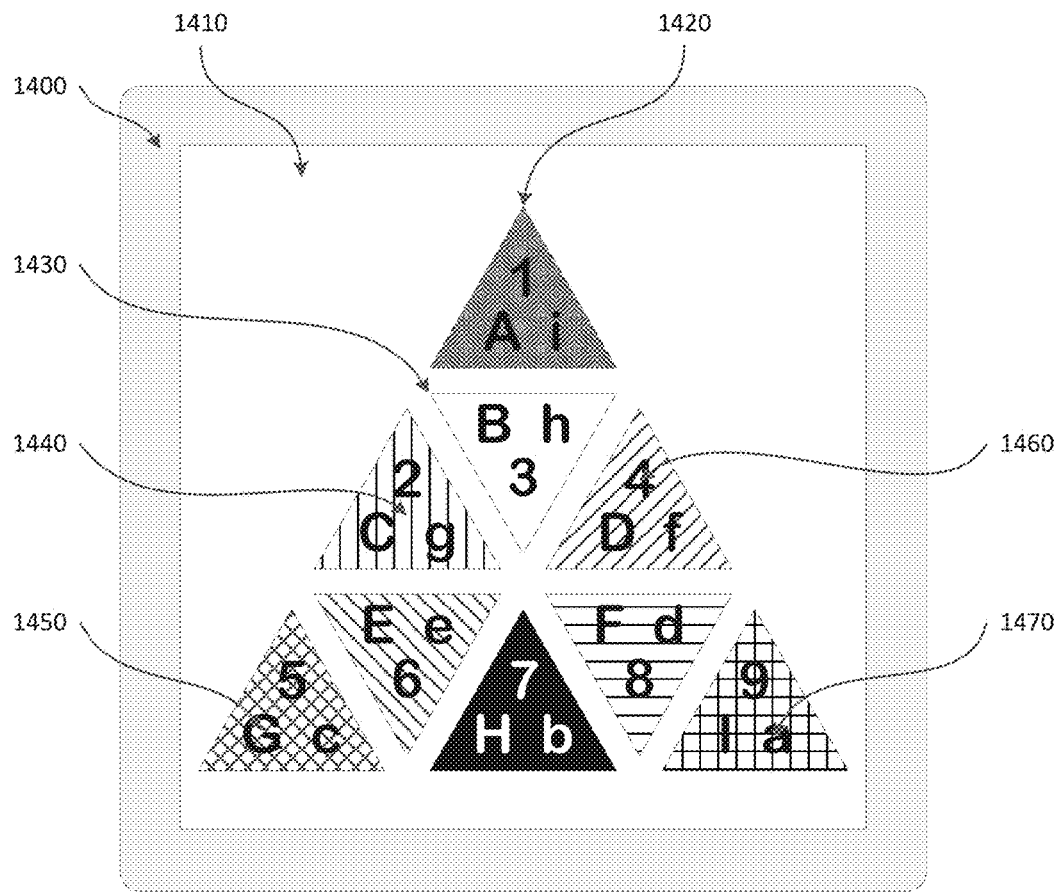
FIG. 14 illustrates a sixth alternative example of a virtual key arrangement utilizing property sets for use during the process of passcode entry and verification having the shapes of the virtual keys being oriented differently.
Figure 15:
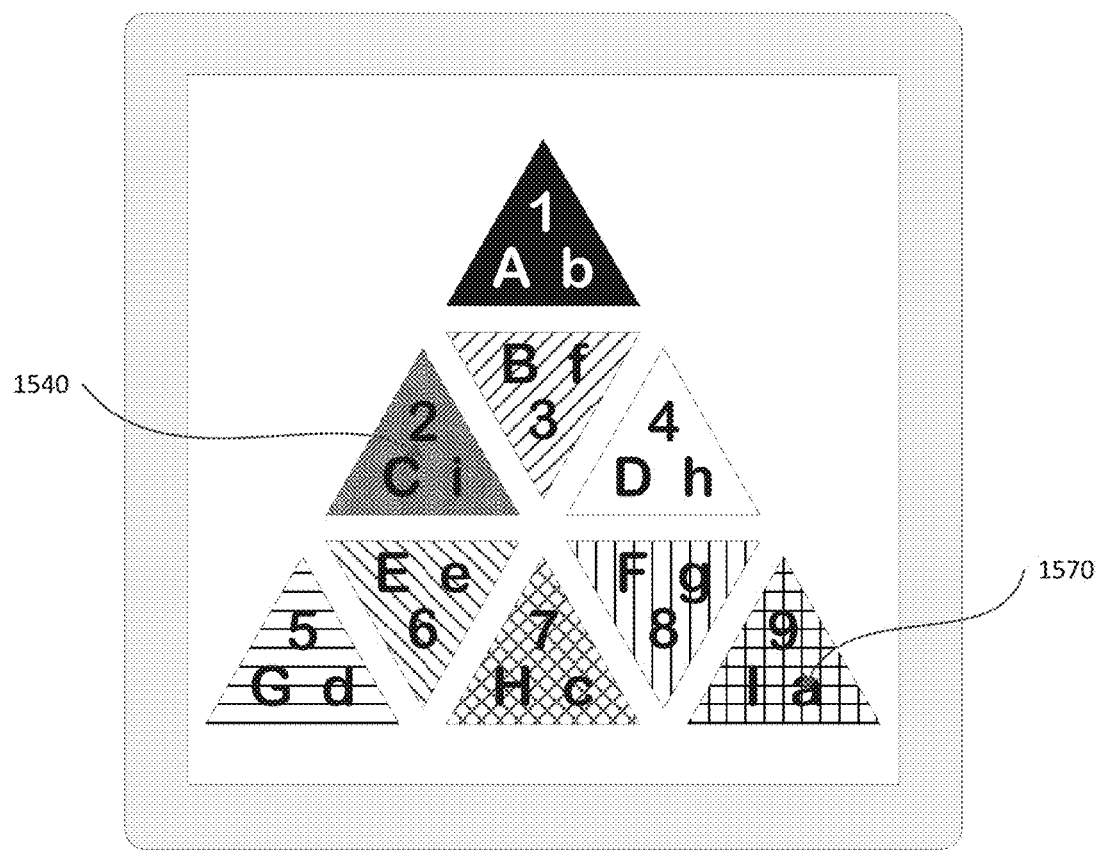
FIG. 15 illustrates a seventh alternative example of a virtual key arrangement following a re-association of the properties to the virtual keys shown in FIG. 14, utilizing property sets for use during the process of passcode entry.

Another embodiment is shown in FIG. 14. As in the previous example, a device 1400 with a graphical touch sensitive display 1410 may be employed. This embodiment shows that not all virtual keys 1420, 1430 need to have the same orientation, and that both upper case 1450 and lower case 1470 alpha characters may be utilized. In addition to these, a numeric property set 1460 and a color 1440 (or pattern) property set are used. An example of the resulting interface 1510 after having been shuffled (lower case alpha characters 1570 and color 1540 (or pattern) properties) is shown in FIG. 15.

Figure 16:
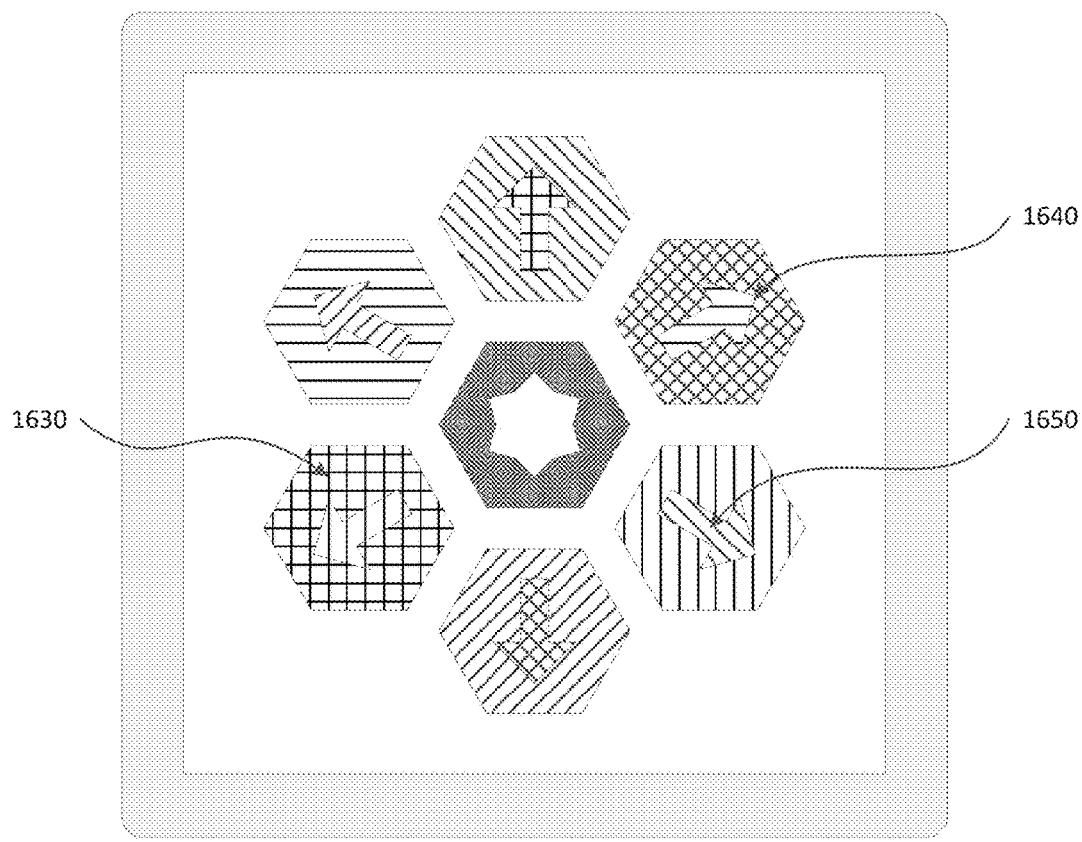
FIG. 16 illustrates an eighth alternative example of a virtual key arrangement utilizing property sets for use during the process of passcode entry and verification having language independent property sets.
Figure 17:
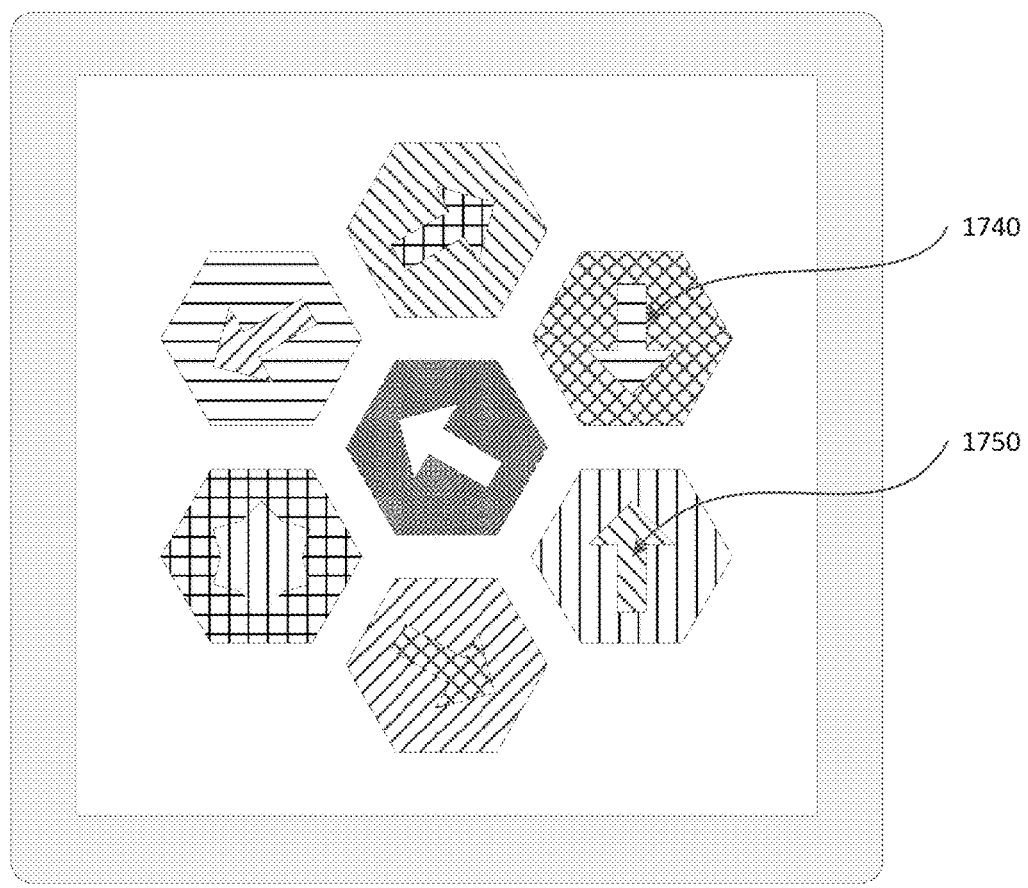
FIG. 17 illustrates a ninth alternative example of a virtual key arrangement following a re-association of the properties to the virtual keys shown in FIG. 16, utilizing property sets for use during the process of passcode entry.

An additional example of an embodiment having no alphanumeric properties is given in FIG. 16. Such an embodiment can be useful in global implementations since there are no properties which tie it specifically to any language or region. The property sets are: shape 1640, shape color 1650 (or shape pattern), and key color 1630 (or key pattern). Even though many of the shapes 1640 are similar, they are all oriented differently, thereby making them distinguishable. The use of the same type of property (color) 1650 is given as an example in this embodiment to demonstrate the diversity of the use of property sets. An example of the resulting interface after having been shuffled (shape 1740 and shape color 1750 (or shape pattern) properties) is shown in FIG. 17.

Figure 18:
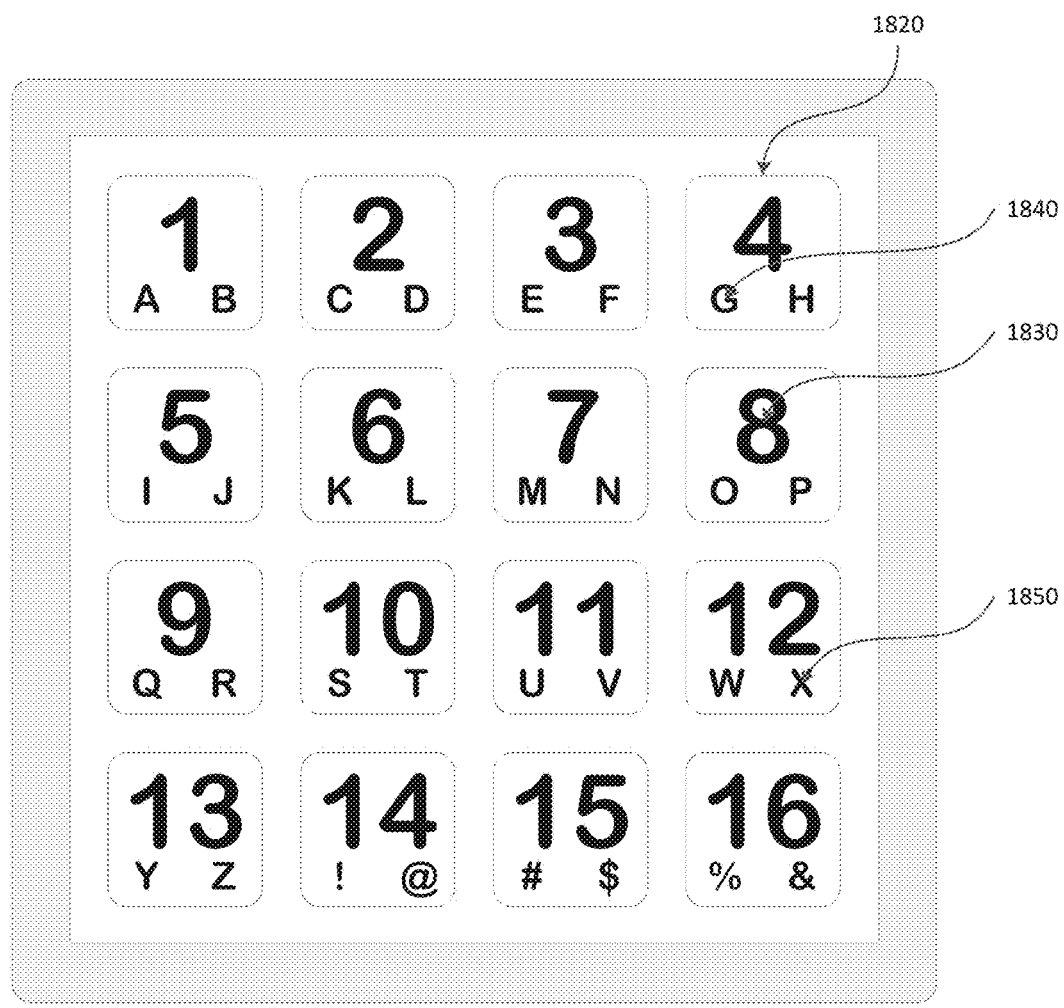
FIG. 18 illustrates a tenth alternative example of a virtual key arrangement utilizing property sets for use during the process of passcode entry and verification having a numeric property set with more than one digit.
Figure 19:
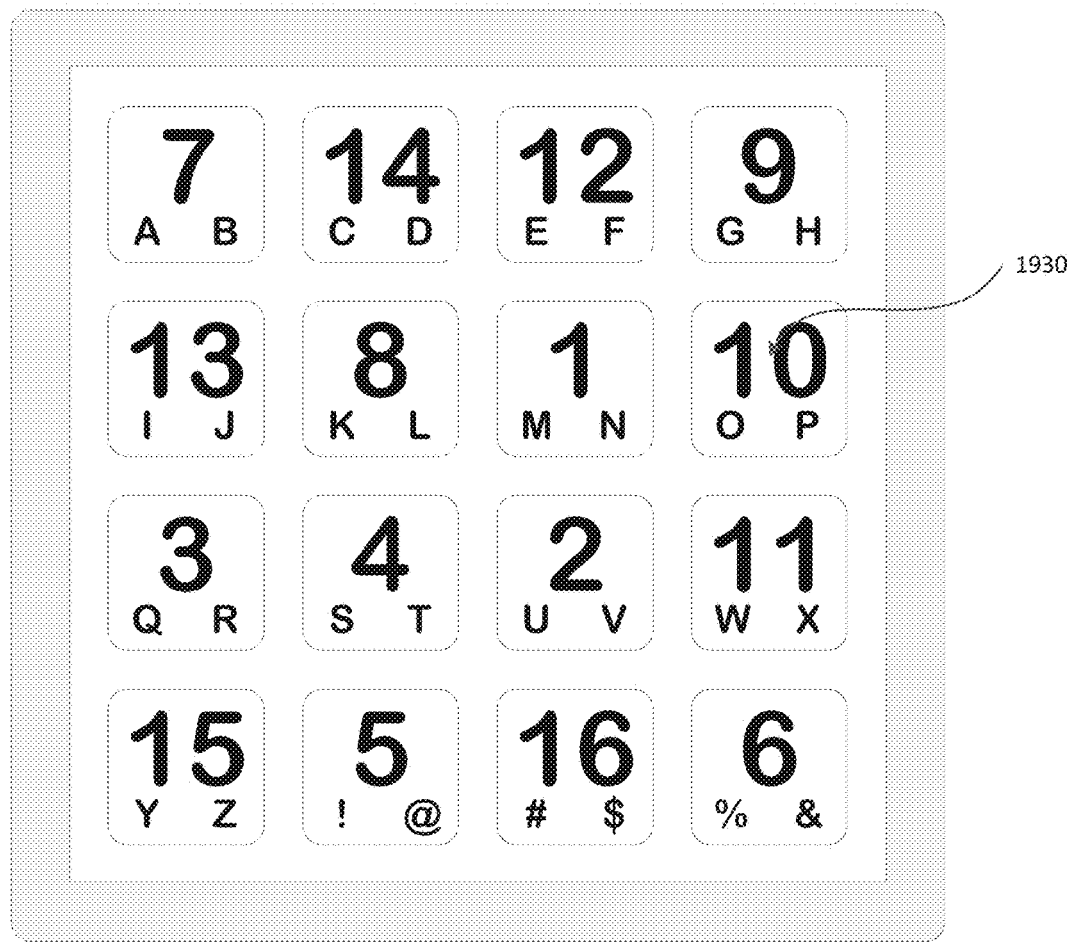
FIG. 19 illustrates an eleventh alternative example of a virtual key arrangement following a re-association of the properties to the virtual keys shown in FIG. 18, utilizing property sets for use during the process of passcode entry.

According to an alternative embodiment of the invention, alphanumeric properties are not restricted to being a single character. FIG. 18 shows an exemplary embodiment of an interface 1810 having sixteen virtual keys 1820 and three property sets. The property sets are: number 1830, alpha set one 1840, and alpha set two 1850. The number property set utilizes interface representations having both one and two digits, as an example showing that combinations of traditional passcode values may be unified into single properties through the use of the present invention. One of ordinary skill in the art can appreciate that such use of properties is not limited to numbers, but may be applied as well to other types of values, such as alpha characters. In addition to Latin characters, the two alpha property sets also employ commonly used special characters in this embodiment. An example of the resulting interface after having been shuffled (number 1930 property) is shown in FIG. 19.

Figure 20:
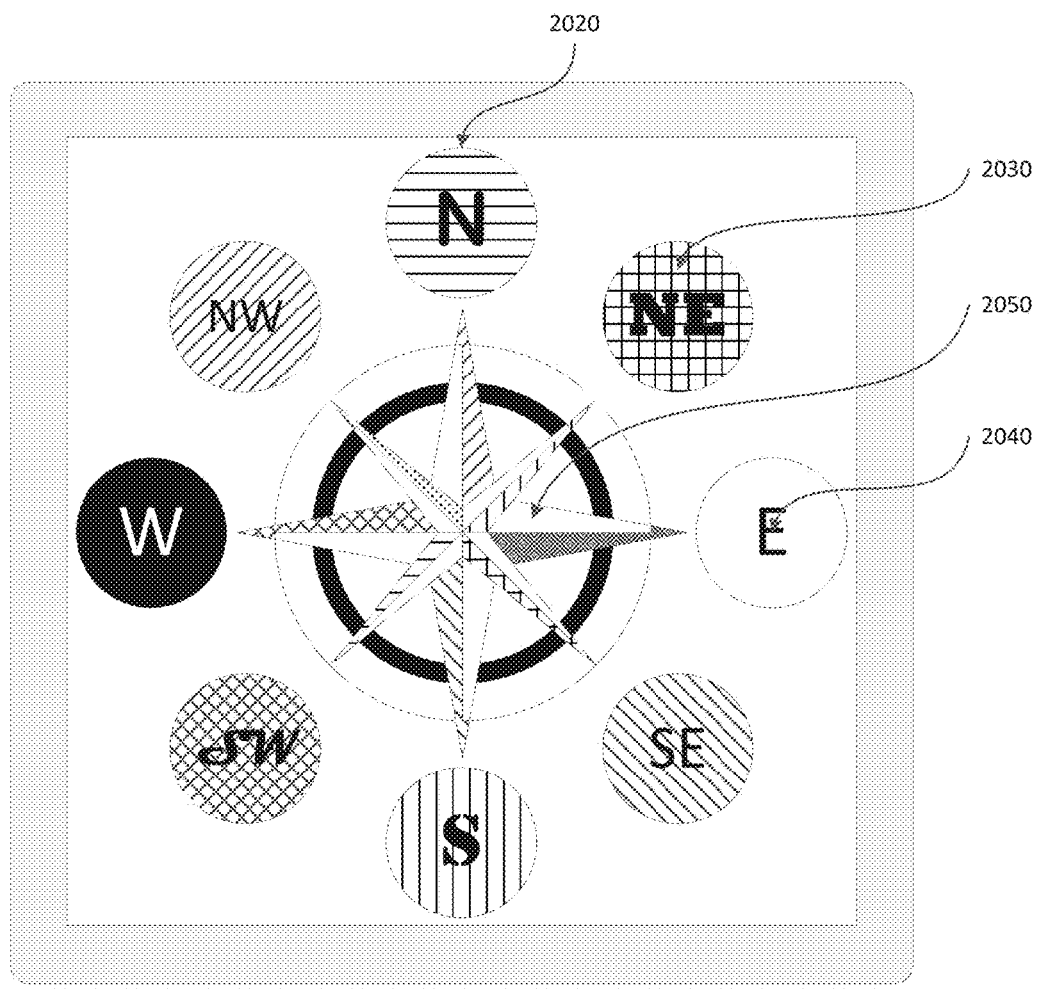
FIG. 20 illustrates a twelfth alternative example of a virtual key arrangement utilizing property sets for use during the process of passcode entry and verification having a property set being associated with key proximity rather than key identity.
Figure 21:
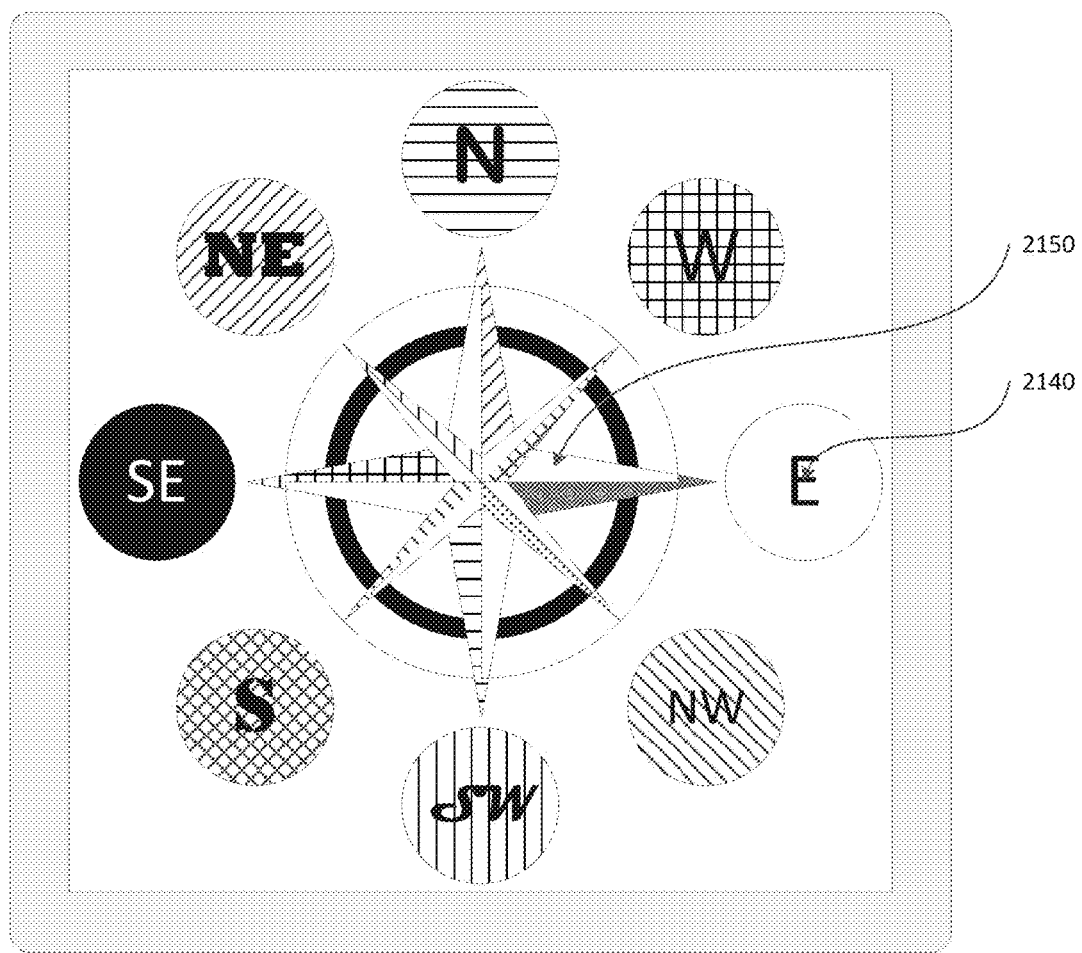
FIG. 21 illustrates a thirteenth alternative example of a virtual key arrangement following a re-association of the properties to the virtual keys shown in FIG. 20, utilizing property sets for use during the process of passcode entry.

FIG. 20 is an example of an embodiment which demonstrates the use of property sets through a more abstract association than previous embodiments. This embodiment utilizes eight virtual keys 2020 and the following property sets: cardinal direction 2040, key color 2030 (or pattern), and direction color 2050 (or pattern). The key color 2030 (or pattern) property set is associated directly with each virtual key 2020 as a component of the manifestation of the virtual key itself. The direction color 2050 (or pattern), however is more loosely associated with the virtual keys 2020 than key color 2030 (or pattern). The interface representation of the direction color 2050 (or pattern) property is manifested as a component of the compass rose at the center of the interface, imparting a color (or pattern) to each point on the design. The direction color 2050 (or pattern) of each point of the compass rose is associated with the virtual key to which it points. This embodiment also shows that the interface representation of properties must not necessarily be uniform. In this case, each of the cardinal direction properties is represented through the use of a different typeface. One of ordinary skill in the art can appreciate that the typeface may be used as an additional property set; however, its use in the present embodiment is preferably ornamental. An example of the resulting interface 2310 after having been shuffled (cardinal direction 2140 and direction color 2150 (or pattern) properties) is shown in FIG. 21.

Figure 22:
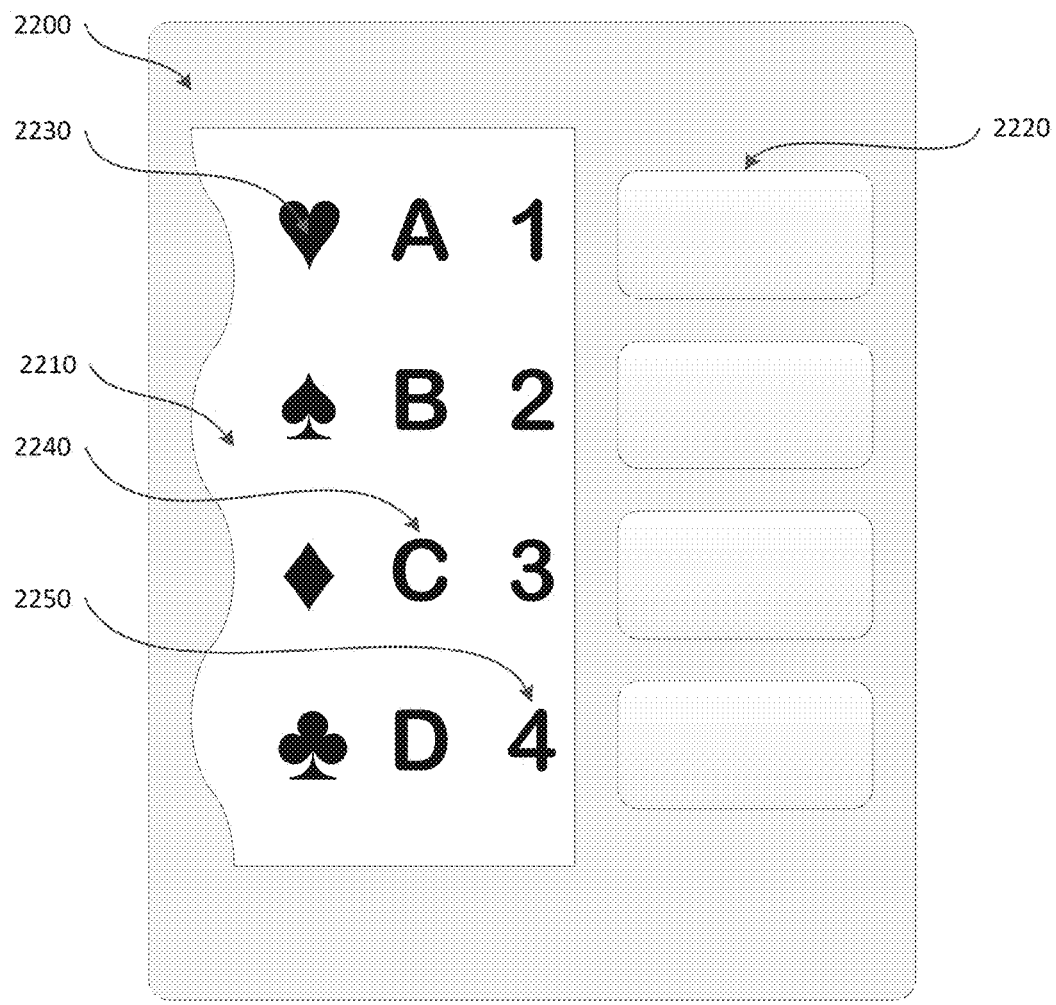
FIG. 22 illustrates a fourteenth alternative example of a virtual key arrangement utilizing property sets for use during the process of passcode entry and verification having physically-depressed keys being associated through key proximity.
Figure 23:
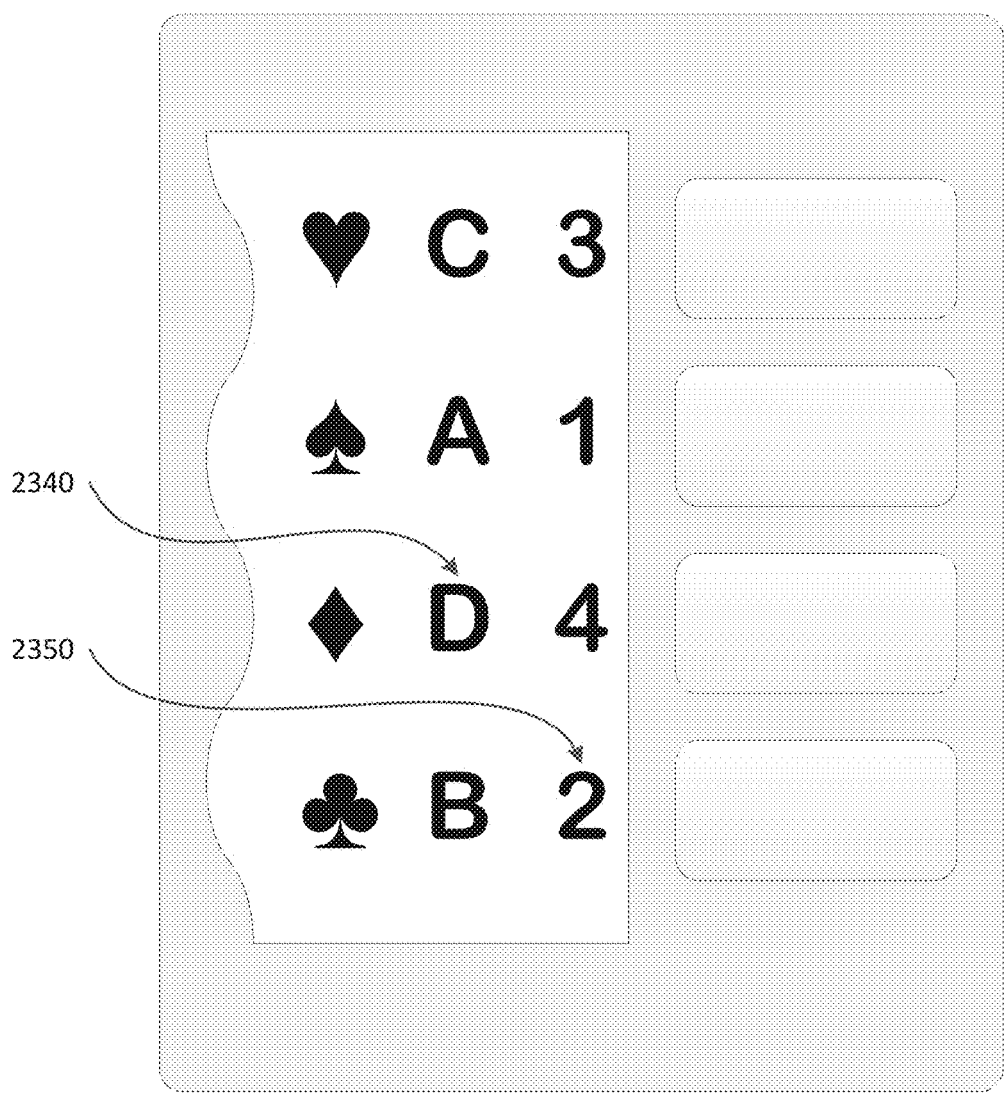
FIG. 23 illustrates a fifteenth alternative example of a virtual key arrangement following a re-association of the properties to the keys shown in FIG. 22, utilizing property sets for use during the process of passcode entry having physically-depressed keys being associated through proximity.

An additional embodiment employing a device 2200 having a graphical display 2210 and physical keys 2220 is demonstrated in FIG. 22. Each physical key 2220 is associated with three properties: shape 2230, alpha 2240, and number 2250. The properties associated with each key are those manifested in line with the key and to the left of the key. As with all previously described embodiments, the selection of a key indicates the selection of one of the properties with which it is associated without disclosing the actual property selected. This embodiment demonstrates the use of the present invention on devices and systems not having touch sensitive displays. An example of the resulting interface after having been shuffled (alpha 2340 and number 2350 properties) is shown in FIG. 23.

Figure 24:
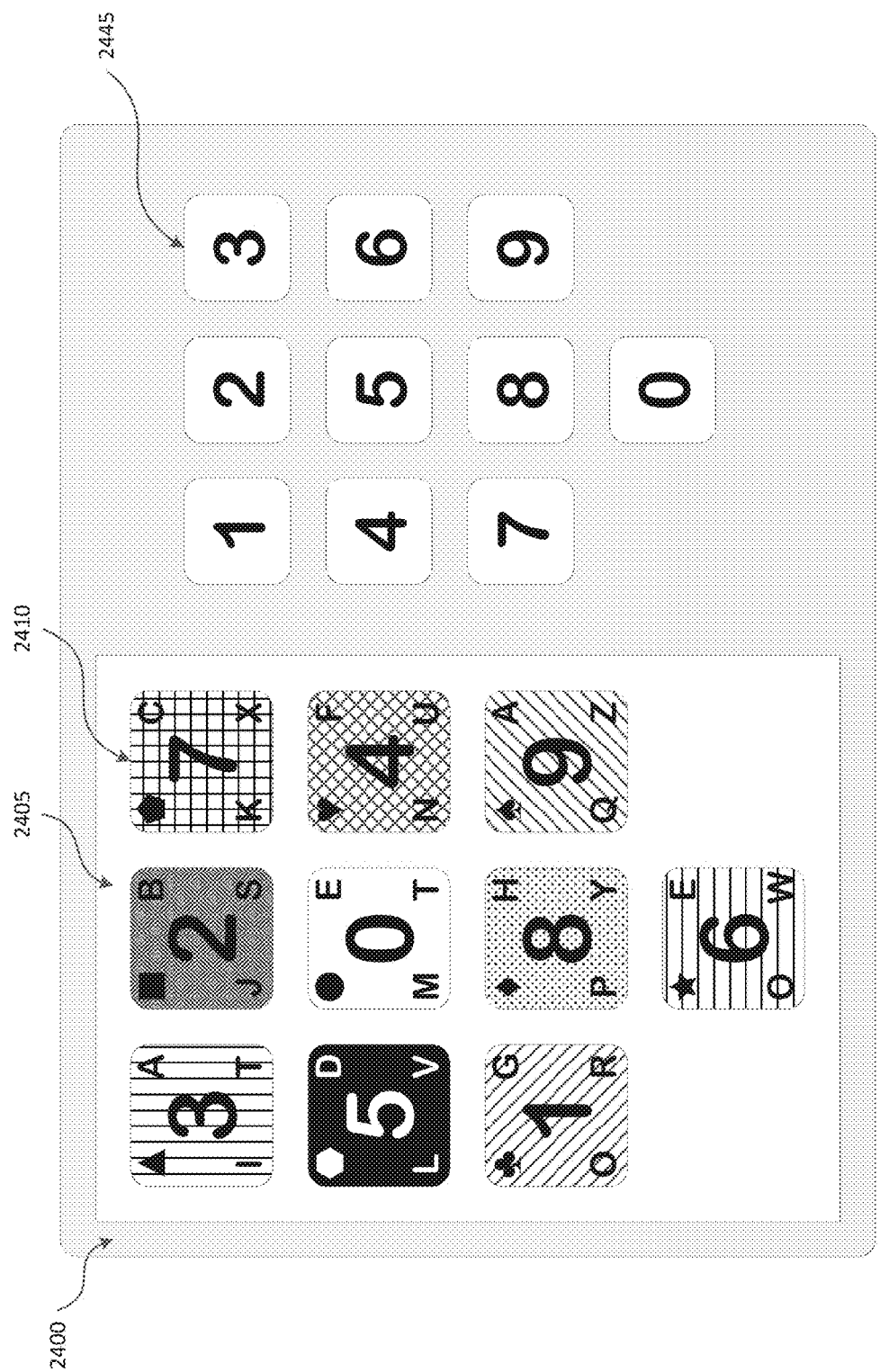
FIG. 24 illustrates a sixteenth alternative example of a virtual key arrangement utilizing property sets for use during the process of passcode entry and verification having physically-depressed keys being associated through relative positioning.

An exemplary embodiment of the present invention employing a device 2400 having a graphical display 2405 and physical keys 2445 is demonstrated in FIG. 24. This embodiment shows an interface implementation which functions with ATM and debit systems not utilizing a touch sensitive display. The virtual keys 2410 which are manifested on the graphical display 2405 are associated with the physical keys 2445 through common relative positioning. For example: The virtual key having the interface representation of the number property "3" is associated with the physical key "1", the virtual key having the interface representation of the number property "4" is associated with the physical key "6", etc. It is apparent to those of ordinary skill in the art that this type of positional association allows the use of the present invention with any physical key configuration.

Figure 25:
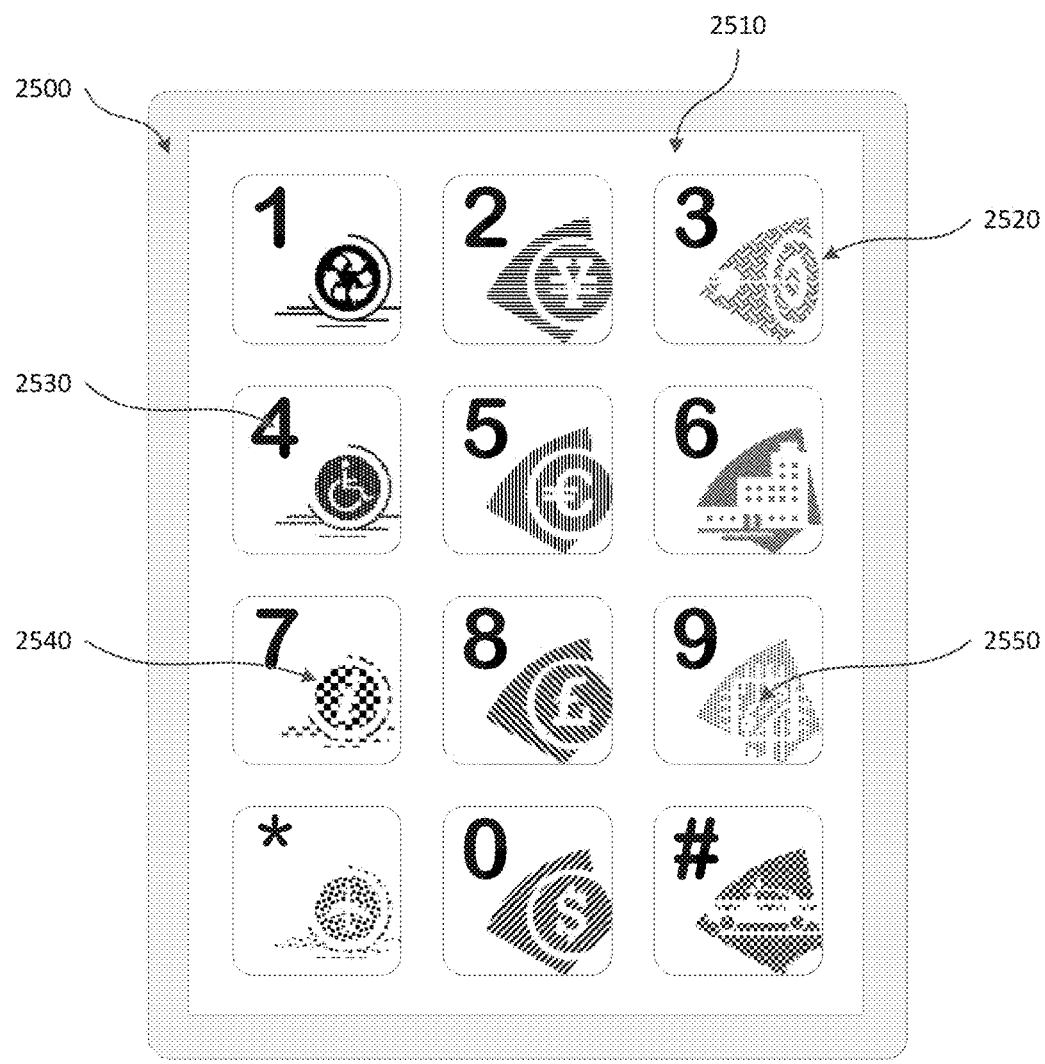
FIG. 25 illustrates a seventeenth alternative example of a virtual key arrangement utilizing property sets for use during the process of passcode entry and verification having physically-depressed keys being individually capable of altering their physical appearance.
Figure 26:
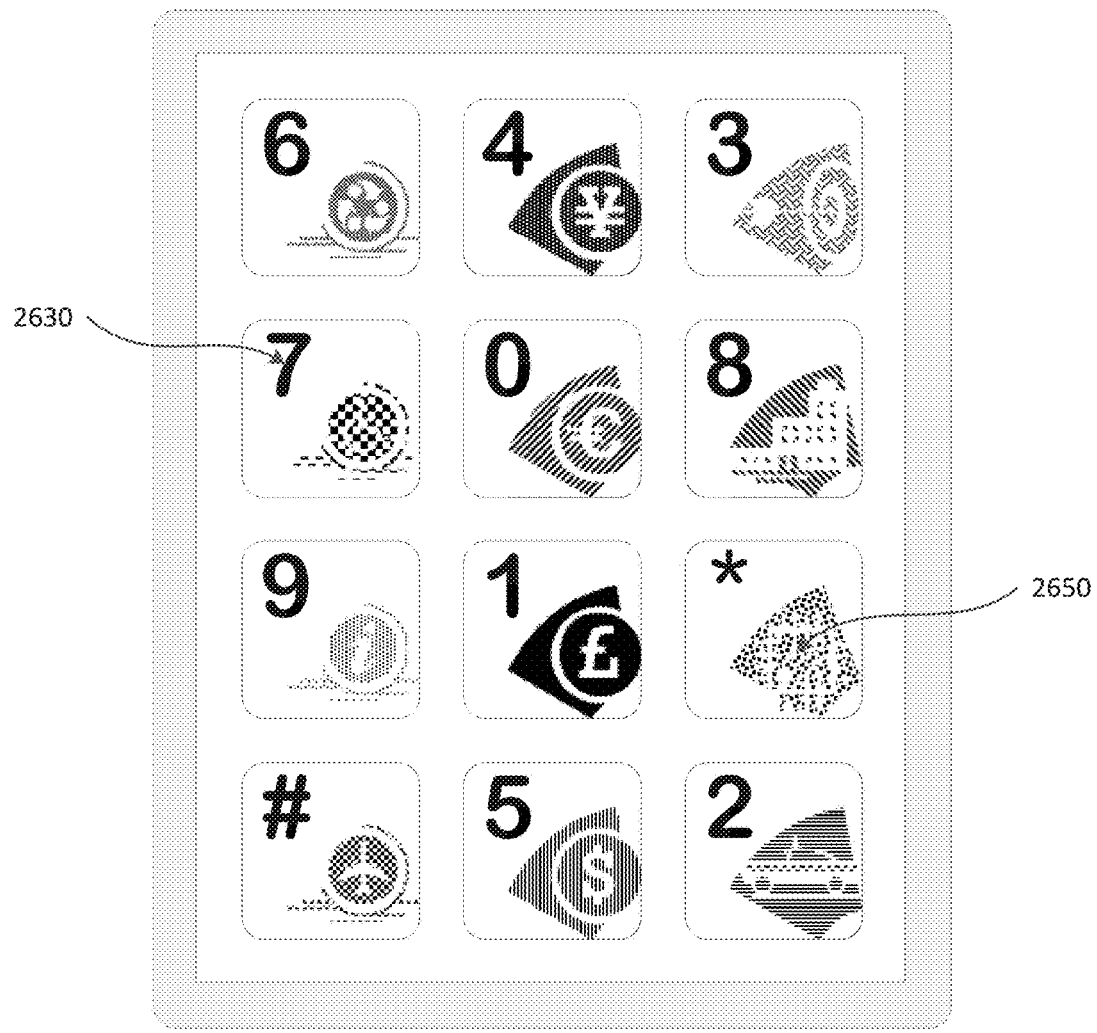
FIG. 26 illustrates an eighteenth alternative example of a virtual key arrangement following a re-association of the properties to the virtual keys shown in FIG. 25, utilizing property sets for use during the process of passcode entry having physically-depressed keys being individually capable of altering their physical appearance.

Another embodiment of the present invention utilizes a device 2500 in which each of a plurality of physical keys 2520, existing on a keyboard or keypad 2510, is capable of displaying an image directly on each key, as shown in FIG. 25. This example embodiment example employs three property sets: number 2530, image 2540, and color 2550 (or pattern). As with all previous embodiments, the selection of a key indicates the use of one of the associated properties in the present position of the passcode. The specific desired property, however, is not disclosed. An example of the resulting interface after having been shuffled (number 2630 and color 2650 (or pattern) properties) is shown in FIG. 26.

Properties are not limited to characters, numbers, colors, or patterns. Any distinguishable property within the capabilities of the device may be used. Some additional examples may include, but are not limited to, sounds, textures, or more abstract differences such as the location or orientation of a virtual key on the interface, or the relative position of a virtual key to other components of the interface.

Figure 27:
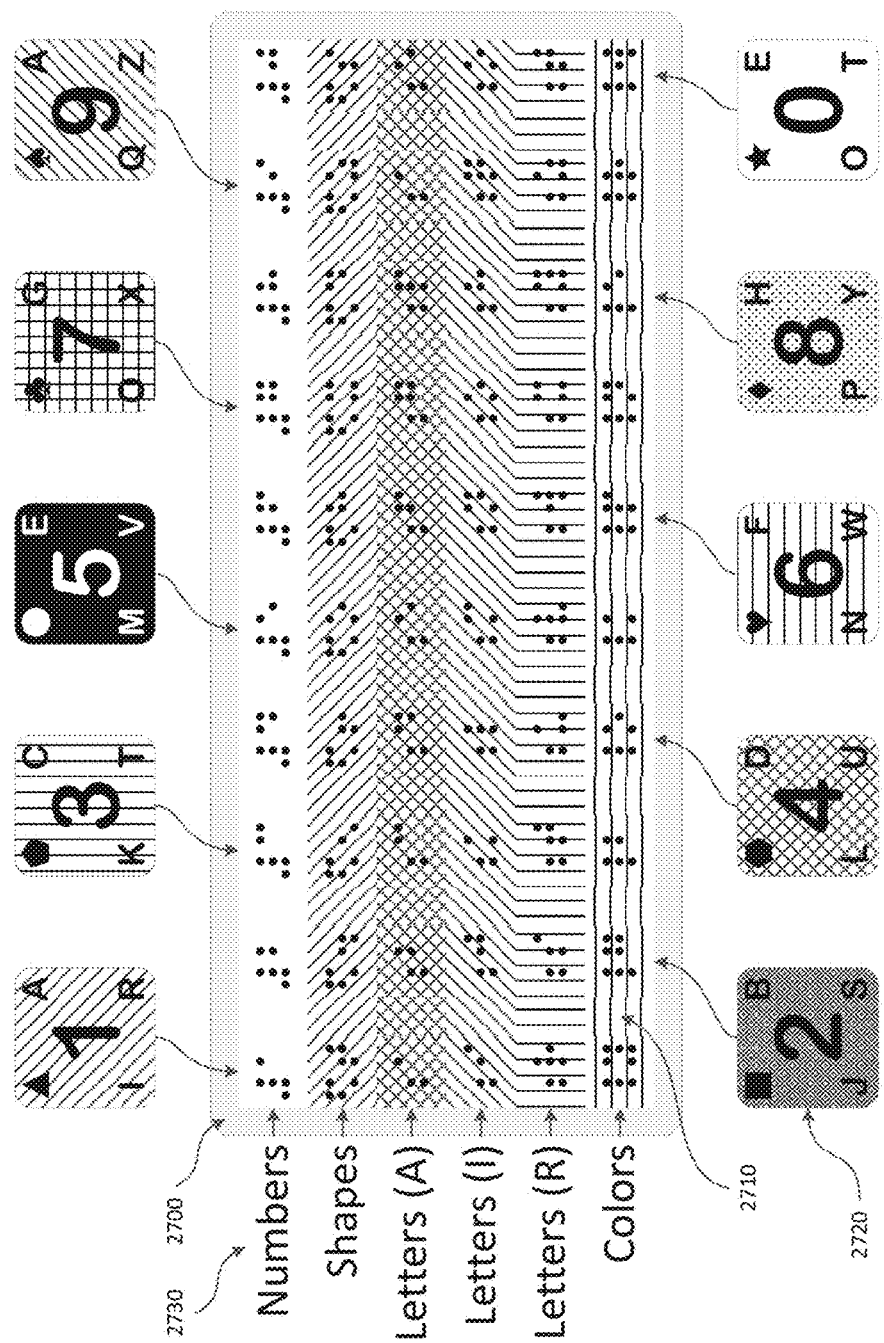
FIG. 27 illustrates a nineteenth alternative example of a virtual key arrangement utilizing property sets for use during the process of passcode entry and verification, having an interface capable of producing braille.

FIG. 27 shows the implementation of an embodiment which utilizes a device capable of dynamically modifying the topography of a surface area 2700, for example a braille display. This embodiment demonstrates the present invention implemented with an interface which can be used by the visually impaired. Each of the ten virtual keys utilized in FIG. 1 are represented through the braille display 2700. Each property set is manifested on a row 2730, and the properties associated with each virtual key are manifested in a column 2720. In this particular example, each property is represented by two characters, the first identifying the property set, and the second identifying the specific property. Because some braille characters have multiple meanings dependent upon their usage, the property set identification is necessary. Between each column is a space 2710 to provide a definite separation from one column to the next. To select a given property, the braille display may be capable of detecting pressure, in which case the user can depress the specific property desired. If the display is not pressure sensitive, a keypad providing physical keys may be employed through which the user can select the number key corresponding to the number property in the column on the braille display which contains the desired property.

Figure 28:
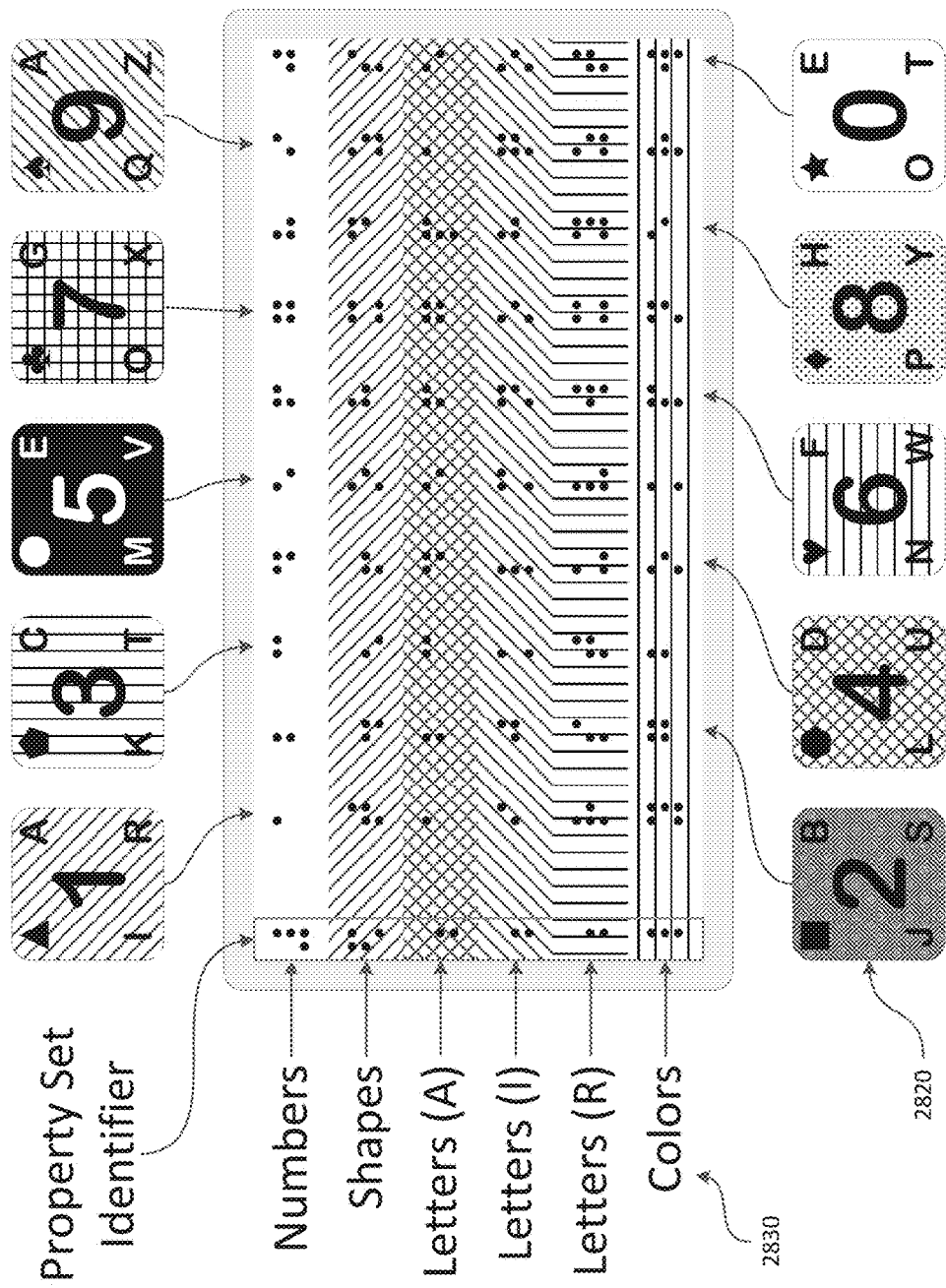
FIG. 28 illustrates a twentieth alternative example of a virtual key arrangement utilizing property sets for use during the process of passcode entry and verification, having an interface capable of producing braille.

A more condensed version of the previous embodiment is shown in FIG. 28. This embodiment is similar to the previous embodiment in that each property set is manifested on a row 2830, and the properties associated with each virtual key are manifested in a column 2820. An example difference between this embodiment and the previous is that the property set identifying braille character is not present in every column 2820. Instead, the property set identifying braille character is listed in a separate column specifically for the purpose of identifying the property set for each row 2830.

Figure 29:
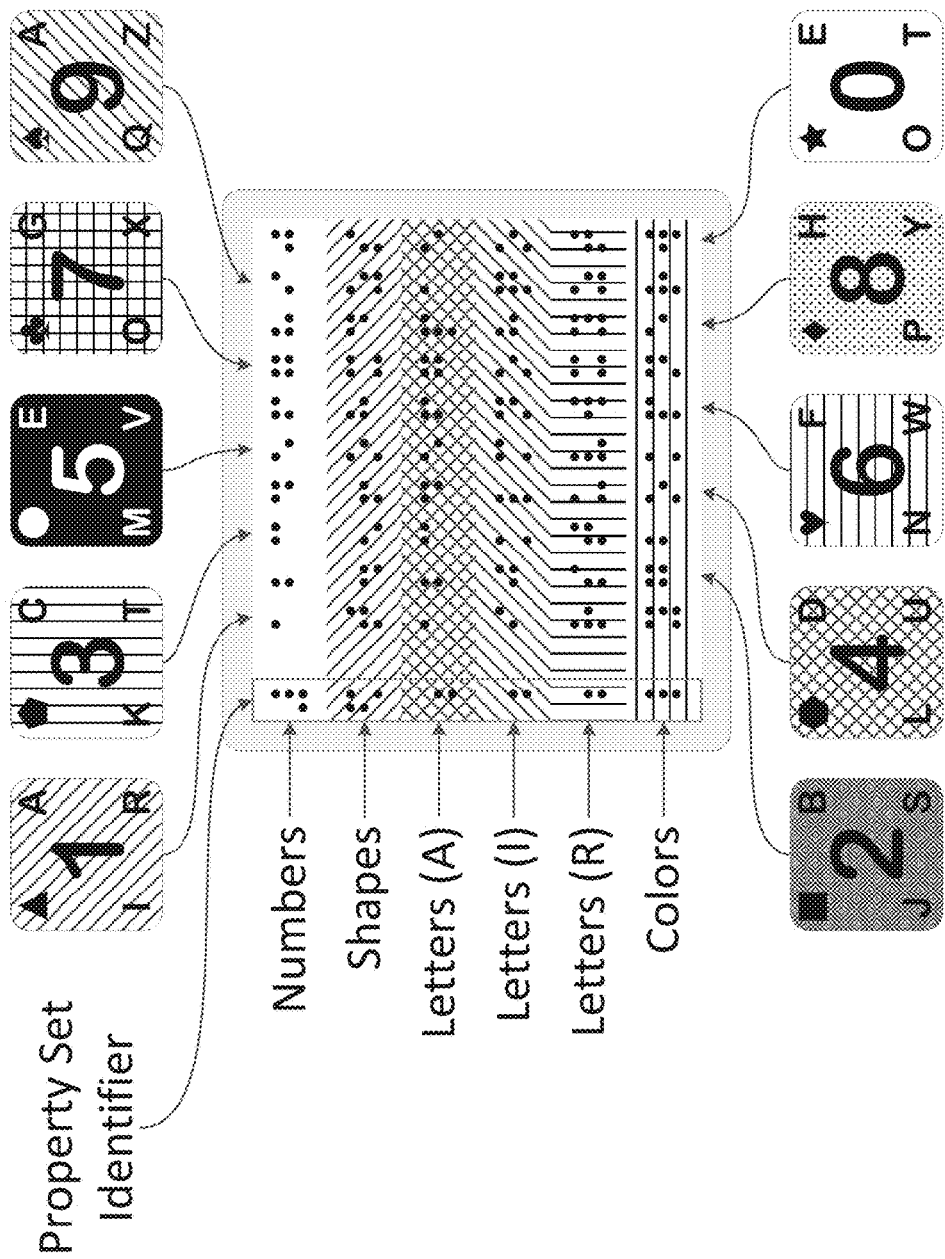
FIG. 29 illustrates a twenty-first alternative example of a virtual key arrangement utilizing property sets for use during the process of passcode entry and verification having an interface capable of producing braille.
Figure 30:
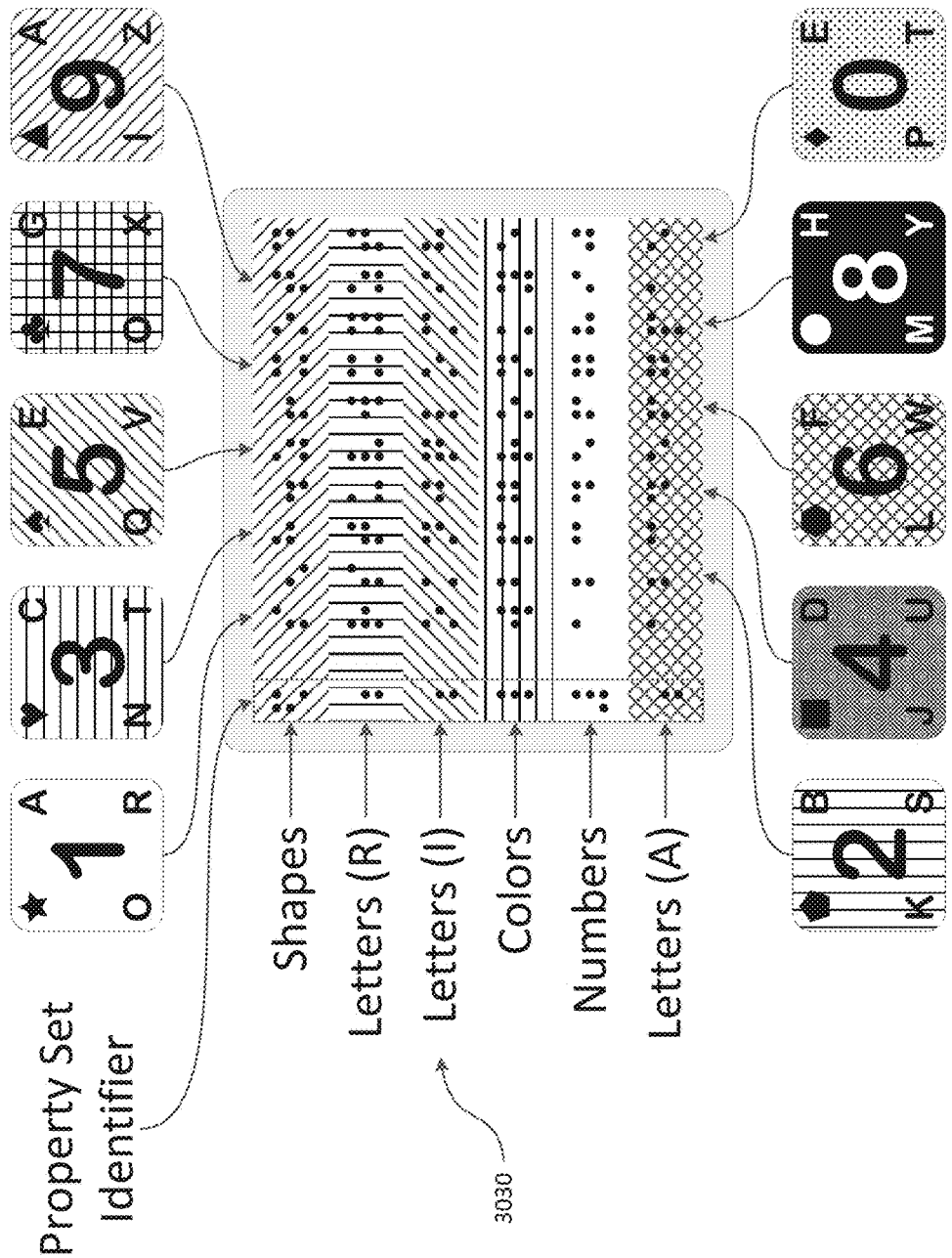
FIG. 30 illustrates a twenty-second alternative example of a virtual key arrangement following a re-association of the properties shown in FIG. 29, utilizing property sets for use during the process of passcode entry having an interface capable of producing braille.

A further condensed embodiment of the use of a braille display is depicted in FIG. 29. In this embodiment, the spaces between columns are removed with the exception of a space between the property set identifier column and the columns containing the interface representations of the columns. This provides definite separation between the identifier and the properties. An example of the resulting interface after having been shuffled (shape, number, and color properties) is shown in FIG. 30. It is not a requirement that a property set remain in the same row when shuffled 3030. It is actually preferable, for security reasons, to shuffle the property sets horizontally across the rows in a generally random manner to prevent observers from being able to determine from which property set a property is being selected.

FIG. 32 is an example of a process by which the system initially associates a member from each property set with each virtual key in a generally random manner. Variables S, Keys, and P are initialized 3205 through 3215. Second, a value is randomly generated through the use of a random number generation function provided by the development language being utilized for system development. This random number is then used to select one of the keys K 3220. Third, the randomly selected key K is associated with property P of property set S 3225. Fourth, the randomly selected key K is removed from the list of all keys K 3230. The variable P is then incremented by one 3235. If the value of variable P is not greater than the number of properties in set S, the process loops to the step in which a new key K is randomly selected; otherwise the process continues 3240. Next, the variable S is incremented by one 3245. If the value of variable S is not greater than the number of property sets, the process loops to the step in which the variable Keys is initialized; otherwise the process ends 3250.

Depicted in FIG. 33 is an example of the process through which property sets are selected to be shuffled in a generally random manner. First, the number of property sets to group is calculated and assigned to variable G 3310. Second, the variables Sets, and Selected are initialized 3320 and 3330. Third, a value is randomly generated through the use of a random number generation function provided by the development language being utilized for system development. This random number is then used to select one of the sets S 3340. Fourth, the randomly selected set S is added to the list of selected sets Selected 3350. Next, the randomly selected set S is removed from the list of all non-static property sets Sets 3360. The variable G is then decremented by one 3370. If the value of variable G is greater or less than zero, the process loops to the step in which a new set S is randomly selected; otherwise the process ends 3380.

FIG. 34 depicts an example of a process by which the system shuffles the property associations with the keys in a generally random manner. First, the property sets to shuffle are selected and set to the Selected variable 3405. Second, variable K is initialized 3410. Third, a value is randomly generated through the use of a random number generation function provided by the development language being utilized for system development. This random number is then used to select one of the keys R 3415. Fourth, variable S is initialized 3420. Fifth, the variable P is set to the property of set S which is currently associated with key R 3425. Sixth, the randomly selected key R is associated with the property of set S which is currently associated with key K 3430. Seventh, the key K is associated with the property P of set S 3435. The variable S is then incremented by one 3440. If the value of variable S is not greater than the number of property sets in the list Selected, the process loops to the step in which the variable P is set; otherwise the process continues 3445. Next, the variable K is incremented by one 3450. If the value of variable K is not greater or less than the number of keys, the process loops to the step in which a new key R is randomly selected; otherwise the process ends 3455.

An example of the calculation of the property set group size to be used during the shuffling of properties associated with keys is shown in FIG. 35. In its simplest form, the property set group size is a whole number equal to half of the number of property sets 3510. Many system factors may require alterations to this calculation dependent upon each specific implementation.

Figure 45:
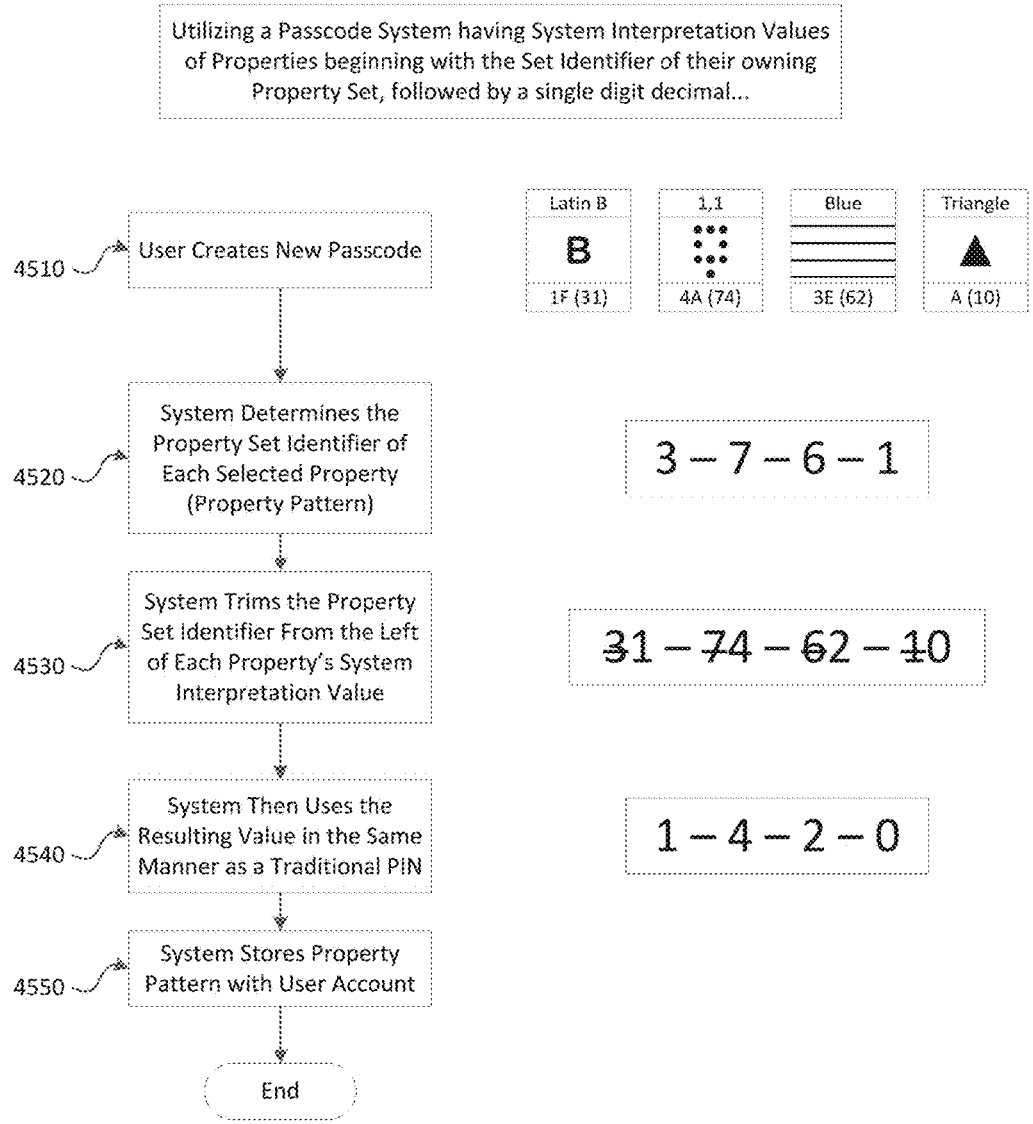
FIG. 45 illustrates a method by which a passcode can be created and converted into a traditional PIN to be utilized by a current banking system
Figure 46:
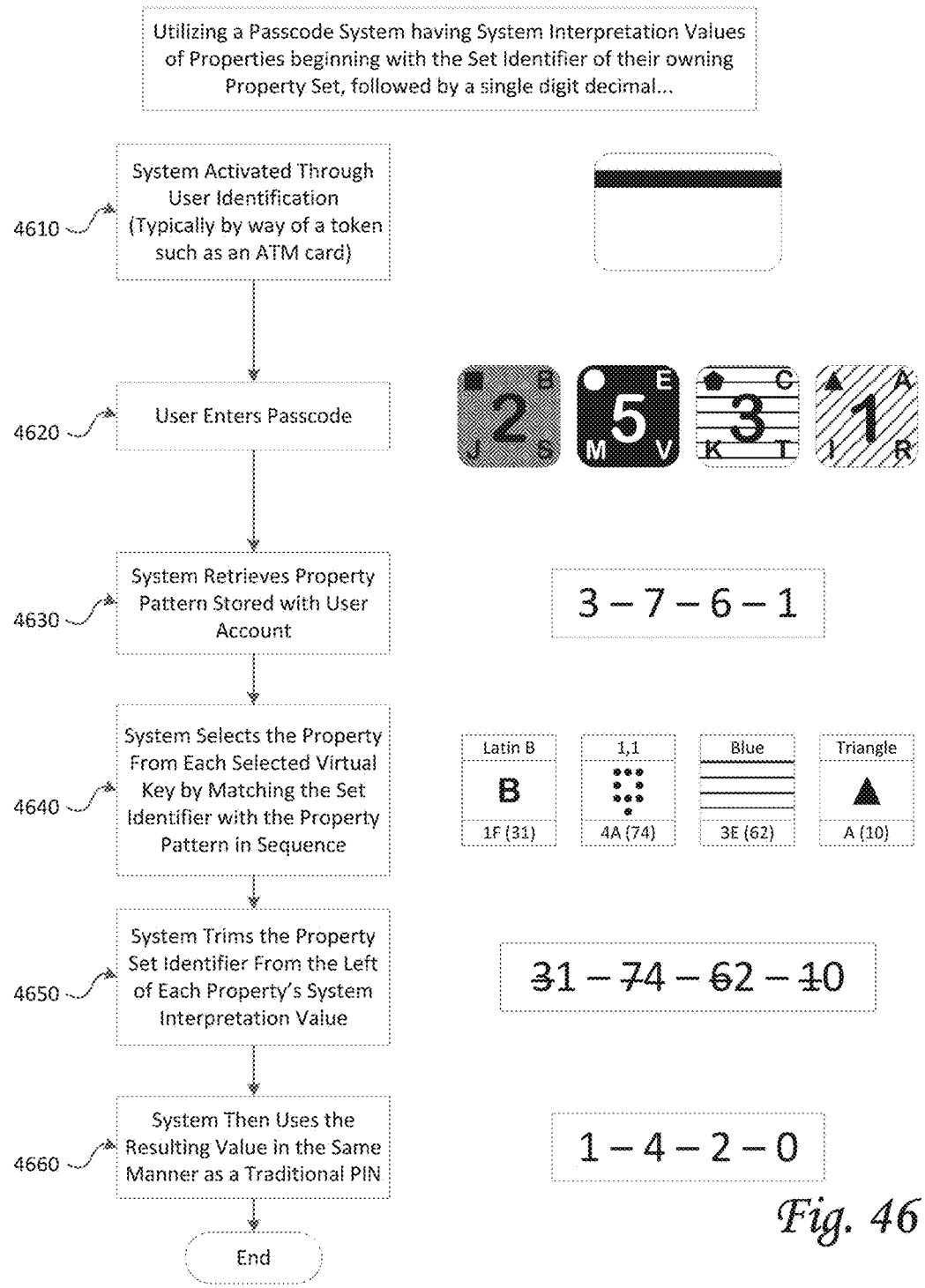
FIG. 46 illustrates a method by which a passcode can be entered for account access and converted into a traditional PIN to be utilized by a current banking system.

The integration of a passcode system such as is described above with existing banking systems may present many difficulties which must be addressed before a passcode-based banking system could be implemented. FIG. 45 and FIG. 46 describe a means by which a passcode system might be implemented which would integrate with existing banking systems requiring minimal effort. These figures provide visual examples based on the property sets defined in FIG. 44.

An embodiment having the condition that the system interpretation values of properties consist of the set identifier of the property set to which they belong followed by a single digit decimal value can be converted into a traditional PIN during passcode creation to be utilized by current banking systems following the method presented in FIG. 45. After the user creates the desired passcode 4510, the property set identifier of each selected property, also known as the property pattern, is determined 4520 by the system. The system then trims the property set identifier from the left of the system interpretation value of each property 4530. The remaining portion of each system interpretation value is a single digit, which, in a passcode system utilizing a four property passcode, yields four decimal digits that can be utilized as a traditional PIN 4540. The banking system would also store the property pattern 4550 in association with the user's other account information.

FIG. 46 provides a method by which a passcode can be converted into a traditional PIN during passcode entry and validation for use with current banking systems. As in currently utilized banking systems, the user presents to the system a means of identification, for example an ATM/debit card 4610. Next the user enters a passcode into the provided passcode interface 4620. Following the retrieval of the property pattern stored with their user account information 4630, the system selects the properties corresponding to the retrieved property pattern 4640. The system then trims the property set identifier from the left of each of the entered properties' system interpretation values 4650, resulting in a single decimal digit for each property, a four digit PIN in cases of a four property passcode, which is then utilized in the same manner as a traditional PIN 4660.

Figure 50:
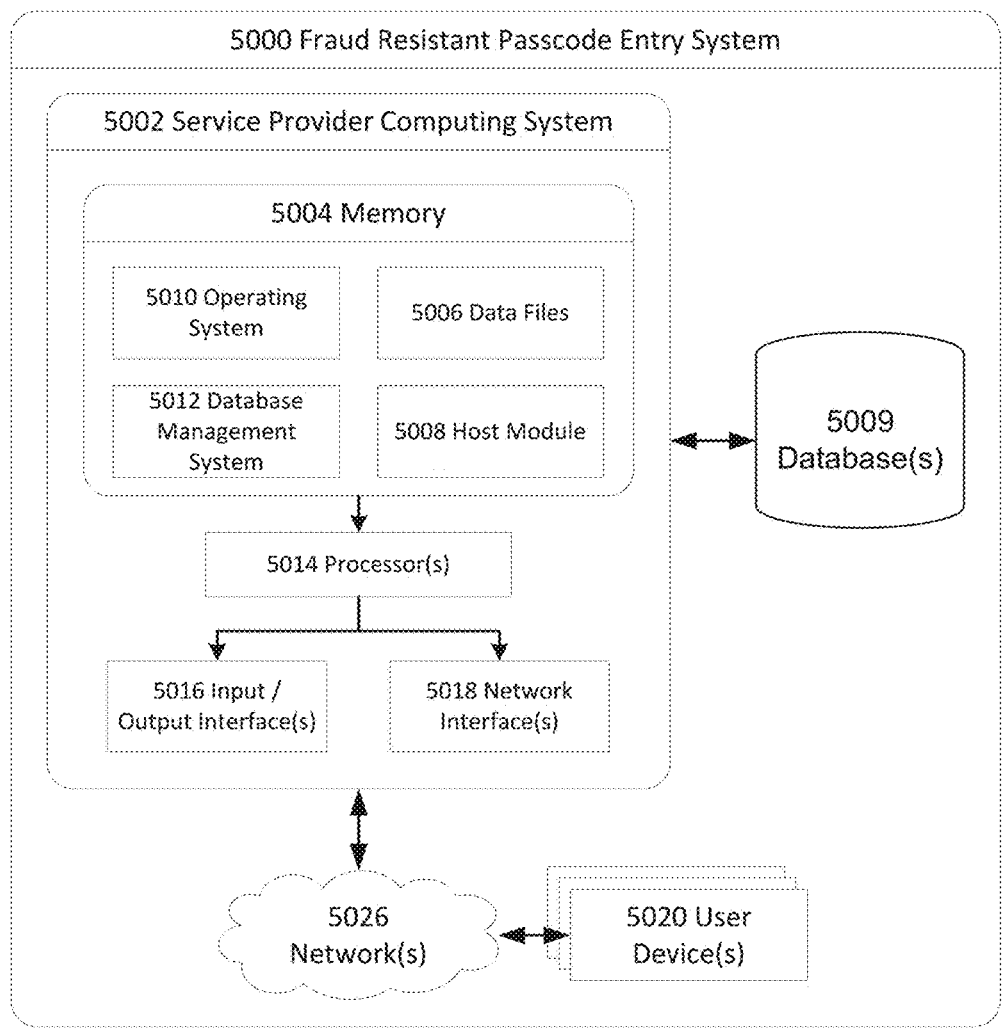
FIG. 50 is a schematic diagram of a fraud resistant passcode entry system that functions with the embodiments shown in FIGS. 1-49, according to an example embodiment.

As shown in FIG. 50, the above-described system 5000 can include a service provider computing system 5002, one or more user devices 5020 described above, all as described in more detail below. One or more of the components of the system 5000 can include one or more processing devices that can be configured for accessing and reading associated computer-readable media having data and/or computer-executable instructions stored thereon for implementing the various methods of the invention.

Example network devices and systems, including one or more of the service provider computing systems 5002, user devices 5020, can include, or otherwise be associated with, suitable hardware and/or software for transmitting and receiving data and/or computer-executable instructions over one or more communications links or networks 5026. These network-connected devices and systems 5002, 5020 can also include a predetermined number of processors for processing data and executing computer-executable instructions, as well as other internal and peripheral components. Further, these network devices and systems can include or be in communication with a predetermined number of suitable database(s) 5009 operable to store data and/or computer-executable instructions. The database 5009 can include a wide variety of different data in various embodiments, for example, user profiles and passwords, password-generation history and a bank of password icon options. By executing computer-executable instructions, each of the network devices can form a special purpose computer or particular machine. As used herein, the term "computer-readable medium" describes any suitable non-transitory memory or memory device.

The service provider computing system 5002 can be associated with a service provider that provides services to customers or users through password-protected portals. For purposes of this disclosure, the service provider computing system 5002 is generally referred to as a service provider. The service provider 5002 can be any suitable processor-driven device that facilitates the generation of a password-entry portal to an appropriate user device. For example, the service provider 5002 can be a computing device that includes server computers, mainframe computers, networked computers, desktop computers, personal computers, digital assistants, personal digital assistants, digital tablets, Internet appliances, application specific circuits, microcontrollers, minicomputers, ATM and/or any other processor-based device(s). The execution of the computer-implemented instructions by the service provider 5002 can form a special purpose computer or other particular machine that facilitates the password portal operation to a user. Additionally, in certain embodiments of the invention, the operations and/or control of the service provider 5002 can be distributed amongst several processing components.

In addition to one or more processor(s) 5014, the service provider 5002 can include one or more memory devices 5004, one or more input/output ("I/O") interfaces 5016, and one or more network interfaces 5018. The one or more memory devices 5004 can be any suitable memory devices for example, caches, read only memory devices, random access memory devices, magnetic storage devices, etc. The one or more memory devices 5004 can store data, executable instructions, and/or various program modules utilized by the service provider, for example, data files 5006, an operating system (OS) 5010, a database management system (DBMS) 5012, and/or host module 5008. The data files 5006 include a wide variety of different data in various embodiments, for example, user profiles and passwords, password-generation history and a bank of password icon options.

The operating system (OS) 5010 is a suitable software module that controls the service provider 5002. The OS 5010 can also facilitate the execution of other software modules by the one or more processors 5014. The OS 5010 can be, but is not limited to, Microsoft Windows®, Apple OSX™, Linux™, Unix™, or a mainframe operating system. The database management system ("DBMS") 5012 can facilitate the maintenance of information stored in the memory devices 5002 or one or more suitable databases 5009 associated with the service provider 5002. The host module 5008 can facilitate the receipt and/or processing of requests and/or other information that is received from a user via a suitable user device 5020. For example, the host module 5008 can include a web server or other dedicated program that is operable to receive requests and/or information from client modules, for example web browsers, associated with various user devices.

It is apparent to those of ordinary skill in the art that the depictions of the described embodiments are only meant to be taken as examples through which the present invention may be implemented, and not to limit the invention. Any conceivable interface configuration may be employed within the capabilities of any device that will successfully implement the present invention while maintaining its overall spirit and concept.

While the invention has been shown and described in exemplary forms, it will be apparent to those skilled in the art that many modifications, additions, and deletions can be made therein without departing from the spirit and scope of the invention as defined by the following claims.

What is claimed is:

1. A method for user passcode authentication by a system, the method comprising:

accessing a user information database comprising: at least one predefined passcode sequence comprising at least two user input option parameters, the at least two user input option parameters comprising at least two different variable properties of a group comprising: images, alpha-numeric characters, symbols, colors, patterns, sounds, textures, topology, location, orientation, relative position with respect to an interactive display interface, wherein each property is assigned a system interpretation value by which the property is identified by the system, wherein the properties are organized into property sets, each set comprising a distinct grouping of properties to be identifiable as a unit by the system, while also maintaining each property as individually identifiable, and each property set is assigned a set identifier to be used in referencing and identifying the property set, wherein the set identifiers of the property sets are stored as a property pattern of the passcode;

generating a random arrangement of input option parameters comprising the variable properties in the predefined passcode user input option parameters, the random arrangement of input option parameters also comprising different ones of said variable properties that are not part of the predefined passcode user input option parameters, wherein the input option parameters that are not part of the predefined passcode comprise system interpretation values, by which the property is identified by the system;

manifesting the random arrangement of input option parameters on the interactive display interface, wherein the interactive display interface presents an arrangement of at least two different virtual keys set in positions on the interactive display interface, and each virtual key presents an arrangement of at least two different input option parameters of the random arrangement of input option parameters;

receiving a selection of the interactive display interface virtual keys in the condition they were presented in the manifesting step, wherein the system receives all of the system interpretation values for all the input option parameters presented on the selected virtual keys, including the user input option parameters from the predefined passcode and the input option parameters that are not part of the predefined passcode; and comparing the system interpretation values of all of the received selection of interactive display interface virtual keys to the system interpretation values of the predefined passcode user input option parameters and eliminating all failed matches for each position in the passcode which do not belong to the property set specified in the property pattern stored for the same position in the password sequence, leaving only a single matching interpretation value for each position in the password sequence, wherein the resulting values are then encrypted and compared to the stored encrypted system interpretation values;

randomly shuffling the input options after comparing the received selection of interactive display interface virtual keys to the predefined passcode user input option parameters, wherein at least one of the property sets is static, thereby excluding it from participation in the random shuffle.

2. The method of to claim 1, wherein each property is assigned a property interface representation.

3. The method of claim 1, further comprising configuring user input option parameters to a specific user, allowing individual users to utilize input option parameters independent from or not available to other users.

4. The method of claim 1, further comprising configuring a user interface to a specific user, allowing individual users to utilize user interfaces independent from or not available to other users.

5. The method of claim 1, further comprising configuring user input option parameters and a user interface to a specific user, allowing individual users to utilize input option parameters and user interface combinations independent from or not available to other users.

6. A method for user passcode creation by a system, the method comprising:

receiving a selected passcode sequence comprising: an arrangement of inputs, wherein each input comprising at least two different properties from a group comprising images, alpha-numeric characters, symbols, colors, patterns, sounds, textures, topology, location, orientation, or relative position with respect to a user interface, the passcode being received on the user interface, wherein each property is assigned a system interpretation value by which the property is identified by the system, wherein the properties are organized into property sets, each set comprising a distinct grouping of properties to be identifiable as a unit by the system, while also maintaining each property as individually identifiable, and each property set is assigned a set identifier to be used in referencing and identifying the property set, wherein the set identifier of each property is stored as a property pattern with the passcode sequence to be later utilized along with a received selection of the system interpretation values assigned to the selected passcode sequence and system interpretation values different from those assigned to the selected passcode sequence during passcode validation after identifying a user;

encrypting the selected passcode system interpretation values; and storing the encrypted passcode and the property pattern in a user database.

7. The method of claim 6, wherein the input properties are arranged with respect to a plurality of keys, each key comprising at least two different properties from a group comprising images, alpha-numeric characters, symbol, colors, patterns, sounds, textures, topology, location, orientation, or relative position with respect to the user interface.

8. The method according to claim 7, further comprising:
re-associating the input properties such that none of the properties previously associated as a group with any key remain as a group in their new association;

receiving a second arrangement of selected properties from the re- associated keys; and comparing the selected passcode properties to the second arrangement of selected properties, wherein the system interpretation value in common between the selected passcode and the second arrangement for each position are then stored as the passcode.

9. The method of claim 6, further comprising configuring user input option parameters to a specific user, allowing individual users to utilize input option parameters independent from or not available to other users.

10. The method of claim 6, further comprising configuring a user interface to a specific user, allowing individual users to utilize user interfaces independent from or not available to other users.

11. The method of claim 6, further comprising configuring user input option parameters and a user interface to a specific user, allowing individual users to utilize input option parameters and user interface combinations independent from or not available to other users.

12. A system for passcode validation comprising:
a display;
a user interface interactively operable through the display, the user interface comprising a plurality of keys in a positioned arrangement on the display, each key being configured to visually present at least two different property options from a group comprising images, alpha-numeric characters, symbols, colors, patterns, sounds, textures, topology, location, orientation, or relative position with respect to the user interface;

a database in communication with the user interface, the database configured to receive selected property option information from the user interface keys, and the database is configured to send variable property option information to the user interface, the sent and received property option information comprising at least two predefined inputs comprising at least two different ones of the property options, wherein each one of the property options is assigned a system interpretation value by which the property option is identified by the system, wherein the property options are organized into property sets and each property set is assigned a set identifier, wherein the set identifiers of the property sets are stored as a property pattern of the passcode, the variable property option information also comprising different ones of said variable property options that are not part of the passcode, wherein the property options that are not part of the passcode comprise system interpretation values; and the database configured to receive selected property option system interpretation values from the interactive display interface.

13. The system of claim 12, wherein the database sends variable arrangements of the at least two different dynamic property options after the database has received a selected property option information from the user interface.

14. The system of claim 12, further comprising an operating system to select at least one random property option from the database and transmit the at least one random property option to the user interface.

* * * * *